US012789099B2

(12) United States Patent
Sato et al.

(10) Patent No.: US 12,789,099 B2
(45) Date of Patent: Nov. 10, 2026

(54) NON-TRANSITORY COMPUTER READABLE MEDIUM, INFORMATION PROCESSING METHOD, GAME DEVICE, AND INFORMATION PROCESSING SYSTEM

(71) Applicant: CYGAMES, INC., Tokyo (JP)

(72) Inventors: Hironori Sato, Tokyo (JP); Nichi Otsu, Tokyo (JP); Toshiki Sakamoto, Tokyo (JP); Tetsu Izawa, Tokyo (JP); Mitsuharu Isojima, Tokyo (JP); Yuka Tanaka, Tokyo (JP)

(73) Assignee: CYGAMES, INC., Tokyo (JP)

( * ) Notice: Subject to any disclaimer, the term of this patent is extended or adjusted under 35 U.S.C. 154(b) by 176 days.

(21) Appl. No.: 18/737,232

(22) Filed: Jun. 7, 2024

(65) Prior Publication Data

US 2024/0316464 A1 Sep. 26, 2024

Related U.S. Application Data

(63) Continuation of application No. PCT/JP2022/043924, filed on Nov. 29, 2022.

(30) Foreign Application Priority Data

Dec. 10, 2021 (JP) ................................ 2021-201201

(51) Int. Cl.
*A63F 13/69* (2014.01)

(52) U.S. Cl.
CPC .................................... *A63F 13/69* (2014.09)

(58) Field of Classification Search
CPC .......... A63F 13/46; A63F 13/69; A63F 13/79; A63F 13/798; A63F 13/80; A63F 2300/308; A63F 2300/5546
See application file for complete search history.

(56) References Cited

U.S. PATENT DOCUMENTS 7,713,116 B2 * 5/2010 Keam ..................... A63F 13/63 273/317.1

FOREIGN PATENT DOCUMENTS

| | | | | | |
|---|---|---|---|---|---|
| JP | 2017-064081 | A | | 4/2017 | |
| JP | 2020-120929 | A | | 8/2020 | |
| KR | 20130082652 | A | | 7/2013 | |
| KR | 20140119939 | A | * | 10/2014 | A63F 13/335 |
| KR | 20200038091 | A | * | 4/2020 | A63F 13/798 |
| WO | WO-2004088566 | A1 | * | 10/2004 | A63F 13/35 |

OTHER PUBLICATIONS

Dragon's Dogma, Dark Arisen, Weekly Famitsu, Apr. 25, 2013, vol. 28, No. 20, consecutive No. 1274, pp. 107-108 (8 pages).

* cited by examiner

*Primary Examiner* — Steven J Hylinski
(74) *Attorney, Agent, or Firm* — Osha Bergman Watanabe & Burton LLP

(57) ABSTRACT

A non-transitory computer readable medium stores a program causing a computer to execute: a process for deciding places for a plurality of ranking objects tied to player information of a plurality of players who have played a predetermined game, based on at least one result of the predetermined game; a process for allowing a second player different from a first player to organize, in a deck, a game medium tied to player information of the first player, the ranking object of the first player being in a predetermined place; and a process for executing a game on the basis of an operation made by the second player by using the deck in which the game medium is organized.

7 Claims, 55 Drawing Sheets

| CHARACTER TYPE | ABILITY PARAMETER (INITIAL VALUE) | | | | |
|---|---|---|---|---|---|
| | SPEED | STAMINA | POWER | SPIRIT | WISDOM |
| A | 90 | 65 | 60 | 102 | 105 |
| B | 102 | 63 | 73 | 105 | 100 |
| C | 92 | 98 | 109 | 100 | 101 |
| D | 80 | 72 | 110 | 112 | 64 |
| E | 100 | 102 | 62 | 65 | 71 |

FIG.6A

| CHARACTER TYPE | APTITUDE PARAMETER (INITIAL VALUE) | | | | | | | | | |
|---|---|---|---|---|---|---|---|---|---|---|
| | RACETRACK APTITUDE | | DISTANCE APTITUDE | | | | RUNNING STYLE APTITUDE | | | |
| | TURF | DIRT | SHORT | MILE | INTER-MEDIATE | LONG | PACE MAKER | FRONT RUNNER | STALKER | CLOSER |
| A | A | G | G | E | A | A | C | A | A | D |
| B | A | F | A | B | D | E | A | A | F | F |
| C | A | F | E | A | A | C | C | A | A | A |
| D | E | A | A | B | C | C | G | F | A | D |
| E | A | B | B | A | A | B | B | A | A | E |

FIG.6B

| CHARACTER TYPE | EARNED SKILL AND POSSESSED SKILL | | | | | | | | | | |
|---|---|---|---|---|---|---|---|---|---|---|---|
| | a | b | c | d | e | f | g | h | i | j | k |
| A | | | | | | ○ | ○ | ◎ | | ○ | |
| B | | | ○ | ◎ | ○ | | ○ | | ○ | | |
| C | ◎ | ○ | ○ | ○ | ○ | ○ | ○ | ○ | | | |
| D | | | | | ◎ | ○ | ○ | ○ | | ○ | |
| E | | | | | | ◎ | | | ○ | | ○ |

FIG.6C

| CHARACTER TYPE | DEDICATED EVENT | | | | | | | | | | |
|---|---|---|---|---|---|---|---|---|---|---|---|
| | a | b | c | d | e | f | g | h | i | j | k |
| A | | | | | | ○ | | ○ | | ○ | |
| B | | | ○ | | | | ○ | | | | |
| C | | | | | ○ | | | | | | |
| D | | | | | | ○ | | ○ | | ○ | |
| E | | | | | | | | | | | ○ |

FIG.6D

| SUPPORT CARD TYPE | SUPPORT CHARACTER | RARITY | LEVEL | FAVORITE TRAINING |
|---|---|---|---|---|
| A1 | CHARACTER A | SSR | 50 | SPEED |
| A2 | CHARACTER A | SR | 45 | STAMINA |
| A3 | CHARACTER A | R | 40 | WISDOM |
| B1 | CHARACTER B | SR | 1 | POWER |
| B2 | CHARACTER B | R | 15 | SPIRIT |

FIG.9A

| SUPPORT CARD TYPE | SUPPORT EFFECT | | | | | | |
|---|---|---|---|---|---|---|---|
| | TARGET a | TARGET b | TARGET c | TARGET d | TARGET e | TARGET f | TARGET g |
| A1 | +60% | | +40% | | +30% | +2pt | |
| A2 | +50% | +40% | | | | | |
| A3 | +40% | | | +25% | | +1pt | |
| B1 | +10% | | | | +5% | | +1pt |
| B2 | +15% | | | | | | +1pt |

FIG.9B

| SUPPORT CARD TYPE | POSSESSED SKILL | | | | | | | | | | |
|---|---|---|---|---|---|---|---|---|---|---|---|
| | a | b | c | d | e | f | g | h | i | j | k |
| A1 | | | ○ | | | ○ | ○ | | | ○ | ○ |
| A2 | | | | ○ | | | ○ | | ○ | | |
| A3 | | | | | ○ | | | ○ | | | |
| B1 | | | | | ○ | ○ | | | | ○ | ○ |
| B2 | | | | | | | | | ○ | | |

FIG.9C

| SUPPORT CARD TYPE | SUPPORT EVENT | | | | | | | | | | |
|---|---|---|---|---|---|---|---|---|---|---|---|
| | a | b | c | d | e | f | g | h | i | j | k |
| A1 | | | ○ | | | | ○ | | | ○ | ○ |
| A2 | | | | ○ | | ○ | ○ | | | | |
| A3 | | | | | ○ | | | | | | |
| B1 | | ○ | | | ○ | ○ | | | | | |
| B2 | | | | | | | | | ○ | | |

FIG.9D

| CHARACTER TYPE | CHARACTER IDENTIFICATION INFORMATION | | | | |
|---|---|---|---|---|---|
| | MAIN CHARACTER | SUPPORT CHARACTER | SPECIAL CHARACTER | TEAM MEMBER | SUB-MEMBER |
| CHARACTER A | | | | | ○ |
| CHARACTER B | | | | | ○ |
| CHARACTER C | ○ | | | ○ | |
| CHARACTER D | | | | | ○ |
| CHARACTER E | | ○ | | ○ | |
| CHARACTER F | | | ○ | ○ | |
| CHARACTER G | | | | | ○ |
| CHARACTER H | | | | | ○ |
| CHARACTER I | | ○ | | ○ | |
| CHARACTER J | | | ○ | ○ | |
| CHARACTER K | | | | | ○ |
| CHARACTER L | | ○ | | ○ | |
| CHARACTER M | | ○ | | ○ | |
| CHARACTER N | | | ○ | ○ | |
| CHARACTER P | | | | | ○ |
| CHARACTER Q | | ○ | | ○ | |
| CHARACTER R | | | ○ | ○ | |
| CHARACTER S | | | | | ○ |
| CHARACTER T | | ○ | | ○ | |
| CHARACTER U | | | | | ○ |
| CHARACTER V | | | | | ○ |
| CHARACTER W | | | | | ○ |
| CHARACTER X | | | | | ○ |
| CHARACTER Y | | | | | ○ |
| CHARACTER Z | | | | | ○ |

FIG.10

| CHARACTER TYPE | CHARACTER IDENTIFICATION INFORMATION | | | | |
|---|---|---|---|---|---|
| | MAIN CHARACTER | SUPPORT CHARACTER | SPECIAL CHARACTER | TEAM MEMBER | SUB-MEMBER |
| CHARACTER A | | | | | ○ |
| CHARACTER B | | | | | ○ |
| CHARACTER C | | | | | ○ |
| CHARACTER D | | | | | ○ |
| CHARACTER E | | ○ | | ○ | |
| CHARACTER F | ○ | | ○ | ○ | |
| CHARACTER G | | | | | ○ |
| CHARACTER H | | | | | ○ |
| CHARACTER I | | | | | ○ |
| CHARACTER J | | ○ | ○ | ○ | |
| CHARACTER K | | | | | ○ |
| CHARACTER L | | ○ | | ○ | |
| CHARACTER M | | ○ | | ○ | |
| CHARACTER N | | | ○ | ○ | |
| CHARACTER P | | | | | ○ |
| CHARACTER Q | | ○ | | ○ | |
| CHARACTER R | | | ○ | ○ | |
| CHARACTER S | | | | | ○ |
| CHARACTER T | | ○ | | ○ | |
| CHARACTER U | | | | | ○ |
| CHARACTER V | | | | | ○ |
| CHARACTER W | | | | | ○ |
| CHARACTER X | | | | | ○ |
| CHARACTER Y | | | | | ○ |
| CHARACTER Z | | | | | ○ |

FIG.11

| TURN No. | ELECTIVE | | | | SKILL EARNING |
|---|---|---|---|---|---|
| | Rest | Training | Going Out | Race | |
| TURN 1 | ○ | ○ | ○ | ○ | |
| TURN 2 | ○ | ○ | ○ | ○ | |
| TURN 3 | ○ | ○ | ○ | ○ | |
| TURN 4 | ○ | ○ | ○ | ○ | |
| TURN 5 | ○ | ○ | ○ | ○ | |
| TURN 6 | ○ | ○ | ○ | ○ | |
| TURN 7 | ○ | ○ | ○ | ○ | |
| TURN 8 | ○ | ○ | ○ | ○ | |
| TURN 9 | ○ | ○ | ○ | ○ | |
| TURN 10 | ○ | ○ | ○ | ○ | |
| TURN 11 | ○ | ○ | ○ | ○ | |
| TURN 12 | ○ | ○ | ○ | ○ | |
| TURN 13 | ○ | ○ | ○ | ○ | |
| TURN 14 | ○ | ○ | ○ | ○ | |
| TURN 15 | ○ | ○ | ○ | ○ | |
| TURN 16 | ○ | ○ | ○ | ○ | |
| TURN 17 | ○ | ○ | ○ | ○ | |
| TURN 18 | ○ | ○ | ○ | ○ | |
| TURN 19 | ○ | ○ | ○ | ○ | |
| TURN 20 | × | × | × | ○ | ○ |
| TURN 21 | ○ | ○ | ○ | ○ | |
| TURN 22 | ○ | ○ | ○ | ○ | |
| TURN 23 | ○ | ○ | ○ | ○ | |
| TURN 24 | ○ | ○ | ○ | ○ | |
| TURN 25 | ○ | ○ | ○ | ○ | |
| TURN 26 | ○ | ○ | ○ | ○ | |
| TURN 27 | ○ | ○ | ○ | ○ | |
| TURN 28 | ○ | ○ | ○ | ○ | |
| TURN 29 | ○ | ○ | ○ | ○ | |
| TURN 30 | × | × | × | ○ | |
| TURN 31 | ○ | ○ | ○ | ○ | |
| TURN 32 | ○ | ○ | ○ | ○ | |
| TURN 33 | ○ | ○ | ○ | ○ | |
| TURN 34 | ○ | ○ | ○ | ○ | |
| TURN 35 | × | × | × | ○ | |
| ⋮ | ⋮ | ⋮ | ⋮ | ⋮ | |
| TURN 57 | × | × | × | ○ | |
| TURN 58 | ○ | ○ | ○ | ○ | |
| TURN 59 | × | × | × | ○ | |
| TURN 60 | ○ | ○ | ○ | ○ | |

FIG.12

| CHARACTER IDENTIFICATION INFORMATION | | PLACE OR NOT | |
|---|---|---|---|
| SUPPORT CHARACTER | SPECIAL CHARACTER | PLACE | NOT PLACE |
| ○ | ○ | 80% | 20% |
| — | ○ | 60% | 40% |
| ○ | — | 40% | 60% |
| — | — | 10% | 90% |

FIG.20

| TEAM RANKING | TRAINING LEVEL | | | | |
|---|---|---|---|---|---|
| | SPEED | STAMINA | POWER | SPIRIT | WISDOM |
| ~100 | Lv.1 | Lv.1 | Lv.1 | Lv.1 | Lv.1 |
| 99~60 | Lv.2 | Lv.2 | Lv.2 | Lv.2 | Lv.2 |
| 59~30 | Lv.3 | Lv.3 | Lv.3 | Lv.3 | Lv.3 |
| 29~10 | Lv.4 | Lv.4 | Lv.4 | Lv.4 | Lv.4 |
| 9~1 | Lv.5 | Lv.5 | Lv.5 | Lv.5 | Lv.5 |

FIG.21A

| TRAINING LEVEL | INCREASE-FIXED VALUE (SPEED) | | | | |
|---|---|---|---|---|---|
| | SPEED | STAMINA | POWER | SPIRIT | WISDOM |
| Lv.1 | 8 | 0 | 6 | 0 | 0 |
| Lv.2 | 10 | 0 | 8 | 0 | 0 |
| Lv.3 | 12 | 0 | 10 | 0 | 0 |
| Lv.4 | 14 | 0 | 12 | 0 | 0 |
| Lv.5 | 20 | 0 | 18 | 0 | 0 |

FIG.21B

| TRAINING LEVEL | INCREASE-FIXED VALUE (POWER) | | | | |
|---|---|---|---|---|---|
| | SPEED | STAMINA | POWER | SPIRIT | WISDOM |
| Lv.1 | 0 | 6 | 8 | 0 | 0 |
| Lv.2 | 0 | 8 | 10 | 0 | 0 |
| Lv.3 | 0 | 10 | 12 | 0 | 0 |
| Lv.4 | 0 | 12 | 14 | 0 | 0 |
| Lv.5 | 0 | 18 | 20 | 0 | 0 |

FIG.21C

| CHARACTER IDENTIFICATION INFORMATION | | BONUS ADDITION RATE | | |
|---|---|---|---|---|
| SUPPORT CHARACTER | SPECIAL CHARACTER | NONE | 10% UP | 20% UP |
| ○ | ○ | 50% | 0% | 50% |
| ○ | — | 50% | 50% | 0% |
| — | ○ | 50% | 50% | 0% |
| — | — | 80% | 20% | 0% |

FIG.21D

| EVENT TYPE | EVENT CLASSIFICATION | | | | |
|---|---|---|---|---|---|
| | HINT | ABILITY | APTITUDE | STORY | DISCIPLINE |
| SCENARIO EVENT | ○ | ○ | ○ | ○ | — |
| DEDICATED EVENT OF MAIN CHARACTER | ○ | ○ | — | — | — |
| SUPPORT EVENT | ○ | ○ | — | — | — |
| TEAM MEMBER EVENT | — | — | — | ○ | ○ |

FIG.22

| TURN No. | SCENARIO EVENT | DEDICATED EVENT | SUPPORT EVENT | TEAM MEMBER EVENT |
|---|---|---|---|---|
| TURN 1 | 0001 | — | — | — |
| TURN 2 | — | 1001 | LOTTERY | LOTTERY |
| TURN 3 | — | LOTTERY | LOTTERY | LOTTERY |
| TURN 4 | 0002 | LOTTERY | LOTTERY | REPLACED |
| TURN 5 | 0003 | LOTTERY | LOTTERY | REPLACED |
| TURN 6 | 0004 | LOTTERY | LOTTERY | REPLACED |
| TURN 7 | 0005 | LOTTERY | LOTTERY | REPLACED |
| TURN 8 | — | 1002 | LOTTERY | LOTTERY |
| TURN 9 | — | LOTTERY | LOTTERY | LOTTERY |
| TURN 10 | 0006 | — | — | — |
| TURN 11 | — | LOTTERY | LOTTERY | LOTTERY |
| TURN 12 | LOTTERY | LOTTERY | LOTTERY | LOTTERY |
| ⋮ | ⋮ | ⋮ | ⋮ | ⋮ |

FIG.23

| VALUE OF BOND PARAMETER | EXECUTE DISCIPLINE EVENT OR NOT | |
|---|---|---|
| | EXECUTE | NOT EXECUTE |
| 0～19 | 20% | 80% |
| 20～39 | 22% | 78% |
| 40～59 | 24% | 76% |
| 60～79 | 26% | 74% |
| 80～99 | 28% | 72% |
| 100 | 30% | 70% |
FIG.25A
| | WHEN SUCCESS OCCURS | | | | | AFTER OCCUR-RENCE OF GREAT SUCCESS |
|---|---|---|---|---|---|---|
| | No. OF DISCIPLINE EVENTS EXECUTED | | | | | |
| | 0 | 1 | 2 | 3 | 4 | |
| SPECIAL ICON |  |  |  |  |  | 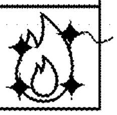 a |
FIG.25B
| INCREASED PARAMETER | 0～19 | 20～39 | 40～ |
|---|---|---|---|
| BONUS ICON | +○○ | +○○ | +○○ |
FIG.25C

| TRAINING EXECUTED | No. OF MEMBERS | BONUS FIXED VALUE (MAIN CHARACTER) | | | | | |
|---|---|---|---|---|---|---|---|
| | | SPEED | STAMINA | POWER | SPIRIT | WISDOM | SKILL P |
| SPEED | 1 | | | | | | |
| | 2 | | | | | | +5 |
| | 3 | +6 | | +2 | | | +5 |
| | 4 | +8 | | +4 | | | +7 |
| | 5 | +10 | | +6 | | | +9 |
| STAMINA | 1 | | | | | | |
| | 2 | | | | | | +5 |
| | 3 | | +6 | | +2 | | +5 |
| | 4 | | +8 | | +4 | | +7 |
| | 5 | | +10 | | +6 | | +9 |
| POWER | 1 | | | | | | |
| | 2 | | | | | | +5 |
| | 3 | | +2 | +6 | | | +5 |
| | 4 | | +4 | +8 | | | +7 |
| | 5 | | +6 | +10 | | | +9 |
| SPIRIT | 1 | | | | | | |
| | 2 | | | | | | +5 |
| | 3 | | +1 | +1 | +6 | | +5 |
| | 4 | | +2 | +2 | +8 | | +7 |
| | 5 | | +3 | +3 | +10 | | +9 |
| WISDOM | 1 | | | | | | |
| | 2 | | | | | | +5 |
| | 3 | +2 | | | | +6 | +5 |
| | 4 | +4 | | | | +8 | +7 |
| | 5 | +6 | | | | +10 | +9 |

FIG.26A

| FAVORITE TRAINING | BONUS ADDITION VALUE (MAIN CHARACTER) | | | | | |
|---|---|---|---|---|---|---|
| | SPEED | STAMINA | POWER | SPIRIT | WISDOM | SKILL P |
| SPEED | +20 | | +10 | | | |
| STAMINA | | +20 | | +10 | | |
| POWER | | +10 | +20 | | | |
| SPIRIT | +5 | | +5 | +20 | | |
| WISDOM | | | | | +20 | +10 |

FIG.26B

| TRAINING EXECUTED | FIXED INCREASE VALUE (DISCIPLINE TARGET) | | | | |
|---|---|---|---|---|---|
| | SPEED | STAMINA | POWER | SPIRIT | WISDOM |
| SPEED | +50～70 | +10～20 | +30～40 | +10～20 | +10～20 |
| STAMINA | +10～20 | +50～70 | +10～20 | +30～40 | +10～20 |
| POWER | +10～20 | +30～40 | +50～70 | +10～20 | +10～20 |
| SPIRIT | +20～30 | +10～20 | +20～30 | +50～70 | +10～20 |
| WISDOM | +30～40 | +10～20 | +10～20 | +10～20 | +50～70 |

FIG.27A

| FAVORITE TRAINING | BONUS INCREASE VALUE (DISCIPLINE TARGET) | | | | |
|---|---|---|---|---|---|
| | SPEED | STAMINA | POWER | SPIRIT | WISDOM |
| SPEED | +180 | +50 | +140 | +50 | +50 |
| STAMINA | +50 | +180 | +100 | +50 | +50 |
| POWER | +50 | +140 | +180 | +50 | +50 |
| SPIRIT | +90 | +50 | +90 | +180 | +50 |
| WISDOM | +140 | +50 | +50 | +50 | +180 |

FIG.27B

| TEST No. | TEST APTITUDE | GRADE | RELEASE CONDITION |
|---|---|---|---|
| No.1 | SHORT DISTANCE | EXCELLENT, GOOD, FAIR | ——— |
| No.2 | MILE | EXCELLENT, GOOD, FAIR | FAIR OR HIGHER IN No.1 |
| No.3 | INTERMEDIATE DISTANCE | EXCELLENT, GOOD, FAIR | FAIR OR HIGHER IN No.2 |
| No.4 | LONG DISTANCE | EXCELLENT, GOOD, FAIR | FAIR OR HIGHER IN No.3 |
| No.5 | DIRT | EXCELLENT, GOOD, FAIR | FAIR OR HIGHER IN No.4 |
| No.6 | EXTRA | EXCELLENT, GOOD, FAIR | FAIR OR HIGHER IN No.5 |
| No.7 | FREE | EXCELLENT, GOOD, FAIR | FAIR OR HIGHER IN No.6 |

FIG.29A

| TEST No. | TEST POINTS AND GRADES | | |
|---|---|---|---|
| | FAIR | GOOD | EXCELLENT |
| No.1 | 3000～3999 | 4000～4999 | 5000～ |
| No.2 | 6000～6999 | 7000～7999 | 8000～ |
| No.3 | 9000～9999 | 10000～10999 | 11000～ |
| No.4 | 12000～12999 | 13000～13999 | 14000～ |
| No.5 | 15000～16999 | 17000～18999 | 19000～ |
| No.6 | 20000～23999 | 24000～27999 | 28000～ |
| No.7 | 30000～32999 | 33000～35999 | 36000～ |

FIG.29B

NON-TRANSITORY COMPUTER READABLE MEDIUM, INFORMATION PROCESSING METHOD, GAME DEVICE, AND INFORMATION PROCESSING SYSTEM

CROSS REFERENCE TO RELATED APPLICATIONS

This application is a continuation application of International Application No. PCT/JP2022/043924, filed on Nov. 29, 2022, which claims priority to Japanese Patent Application No. 2021-201201, filed on Dec. 10, 2021, the entire contents of which are incorporated by reference herein.

BACKGROUND ART

Technical Field

The present invention relates to an information processing program, an information processing method, a game device, and an information processing system.

As shown in Patent Literature 1, there are well-known games provided with a rental function that allows players to borrow and lend game media, such as characters, among themselves. For example, in the case where a game proceeds using a deck organized with multiple game media, the player organizes the deck before the game begins. At this time, the player can rent a game medium possessed by another player and organize it in the deck.

CITATION LIST

Patent Literature

Patent Literature 1: JP 2017-64081 A

SUMMARY OF INVENTION

Technical Problem

However, such a game has a problem in that if the task of finding a game medium desired by a player among the available rental game media becomes complicated, the player cannot effectively utilize the rental function, and the disparity among players increases.

An object of the present invention is to provide an information processing program, an information processing method, a game device, and an information processing system capable of decreasing the disparity among players.

Solution to Problem

In order to solve the aforementioned problem, an information processing program causes a computer to execute:

a process for orderly arranging, on the basis of a result of a predetermined game, a ranking object tied to player information of at least one player who has played the predetermined game;

a process for allowing a second player different from a first player to organize, in a deck, a game medium tied to player information of the first player, the ranking object of the first player being in a predetermined place; and a process for executing a game on the basis of an operation made by the second player by using the deck in which the game medium is organized.

The information processing program may further cause the computer to execute:

a process for allowing the second player to organize, in the deck, the game medium extracted on the basis of player information tied to the second player, apart from the game medium extracted on the basis of the place of the ranking object.

An organization condition for organizing a game medium in the deck may be set for at least one of the game medium extracted on the basis of the place of the ranking object and the game medium extracted on the basis of the player information tied to the second player, and the game medium extracted on the basis of the place of the ranking object and the game medium extracted on the basis of the player information tied to the second player may differ from each other in terms of whether the organization condition is set or the set organization condition.

The predetermined game may be a game in which the deck is used, the process for executing a game by using the deck may include a process for proceeding with the predetermined game on the basis of a player operation and a process for generating the game medium on the basis of the end of proceeding of the predetermined game, and the ranking object may be the game medium generated in the predetermined game.

In the process for orderly arranging a ranking object, the game medium generated in the predetermined game may be orderly arranged in a predetermined time period.

In order to solve the aforementioned problem, an information processing method is a method executed by a computer and includes:

a process for orderly arranging, on the basis of a result of a predetermined game, a ranking object tied to player information of at least one player who has played the predetermined game;

a process for allowing a second player different from a first player to organize, in a deck, a game medium tied to player information of the first player, the ranking object of the first player being in a predetermined place; and a process for executing a game on the basis of an operation made by the second player by using the deck in which the game medium is organized.

In order to solve the aforementioned problem, a game device includes at least one computer that executes:

a process for orderly arranging, on the basis of a result of a predetermined game, a ranking object tied to player information of at least one player who has played the predetermined game;

a process for allowing a second player different from a first player to organize, in a deck, a game medium tied to player information of the first player, the ranking object of the first player being in a predetermined place; and a process for executing a game on the basis of an operation made by the second player by using the deck in which the game medium is organized.

In order to solve the aforementioned problem, an information processing system includes at least one computer that executes:

a process for orderly arranging, on the basis of a result of a predetermined game, a ranking object tied to player information of at least one player who has played the predetermined game;

a process for allowing a second player different from a first player to organize, in a deck, a game medium tied to player information of the first player, the ranking object of the first player being in a predetermined place; and a process for executing a game on the basis of an operation made by the second player by using the deck in which the game medium is organized.

Effects of Disclosure

According to the present invention, it is possible to decrease the disparity among players.

BRIEF DESCRIPTION OF DRAWINGS

FIG. 6A is a drawing illustrating an ability parameter (initial value) table.

FIG. 6B is a drawing illustrating an aptitude parameter (initial value) table.

FIG. 6C is a drawing illustrating a skill table.

FIG. 6D is a drawing illustrating a dedicated event table.

FIG. 9A is a drawing illustrating a support card table.

FIG. 9B is a drawing illustrating a support effect table.

FIG. 9C is a drawing illustrating a possessed skill table.

FIG. 9D is a drawing illustrating a support event table.

FIG. 10 is a first drawing illustrating a character identification information table.

FIG. 11 is a second drawing illustrating the character identification information table.

FIG. 12 is a drawing illustrating an elective table.

FIG. 20 is a drawing illustrating a placement probability table.

FIG. 21A is a drawing illustrating a training level table.

FIG. 21B is a drawing illustrating an increase-fixed value (speed) table.

FIG. 21C is a drawing illustrating an increase-fixed value table (power).

FIG. 21D is a drawing illustrating a bonus addition rate table.

FIG. 22 is a drawing illustrating event types and event classifications.

FIG. 23 is a drawing illustrating the relationship between event types and turn numbers.

FIG. 25A is a drawing illustrating a discipline event execution decision table.

FIG. 25B is a drawing illustrating a special icon decision table.

FIG. 25C is a drawing illustrating a bonus icon decision table.

FIG. 26A is a drawing illustrating a bonus fixed value (main character) table.

FIG. 26B is a drawing illustrating a bonus addition value (main character) table.

FIG. 27A is a drawing illustrating a fixed increase value (discipline target) table.

FIG. 27B is a drawing illustrating a bonus increase value (discipline target) table.

FIG. 29A is a drawing illustrating an overview of a special event.

FIG. 29B is a drawing illustrating the correspondence relationship between test points and grades.

DESCRIPTION OF EMBODIMENTS

An aspect of an embodiment of the present invention will be described below in detail with reference to the accompanying drawings. Numerical values, etc. given in this embodiment are merely examples for facilitating understanding, and do not limit the present invention unless otherwise specifically mentioned. In this description and the drawings, the same reference signs are attached to elements having substantially the same functions and configurations, omitting repeated descriptions thereof, and elements that are not directly related to the present invention are not shown.

(Overall Configuration of Information Processing System S)

Figure 1:
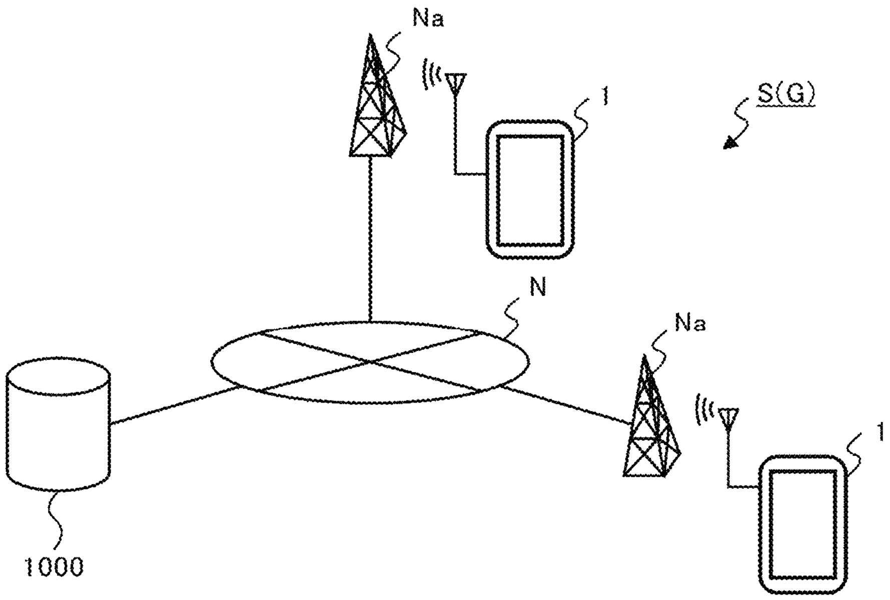
FIG. 1 is an illustration showing a schematic configuration of an information processing system.

FIG. 1 is an illustration showing a schematic configuration of an information processing system S. The information processing system S is what is called a client-server system, including player terminals 1 functioning as clients (i.e., game terminals), a server 1000, and a communication network N having communication base stations Na.

In the information processing system S according to this embodiment, the player terminals 1 and the server 1000 each function as a game device G. The player terminals 1 and the server 1000 individually have assigned thereto roles for controlling the proceeding of the game such that it is possible to proceed with the game through cooperation between the player terminals 1 and the server 1000.

Each of the player terminals 1 can establish communication with the server 1000 via the communication network N. The player terminals 1 widely include electronic appliances that can be communicatively connected to the server 1000 by wire or wirelessly. Examples of the player terminals 1 include smartphones, mobile phones, tablet devices, personal computers, and game devices. This embodiment will be described by way of an example where each of the player terminals 1 is a smartphone.

The server 1000 is communicatively connected to the plurality of player terminals 1. The server 1000 accumulates various kinds of information for each player who plays a game. Furthermore, mainly on the basis of operations input from the player terminals 1, the server 1000 executes processes, such as updating the accumulated information and causing the player terminals 1 to download images and various kinds of information.

The communication base stations Na are connected to the communication network N, and transmit information to and receive information from the player terminals 1 wirelessly. The communication network N is configured of a mobile phone network, the Internet, a local area network (LAN), a dedicated circuit, etc., and realizes wired or wireless communicative connection between the player terminals 1 and the server 1000.

(Hardware Configuration of Player Terminal 1 and Server 1000)

Figure 2A:
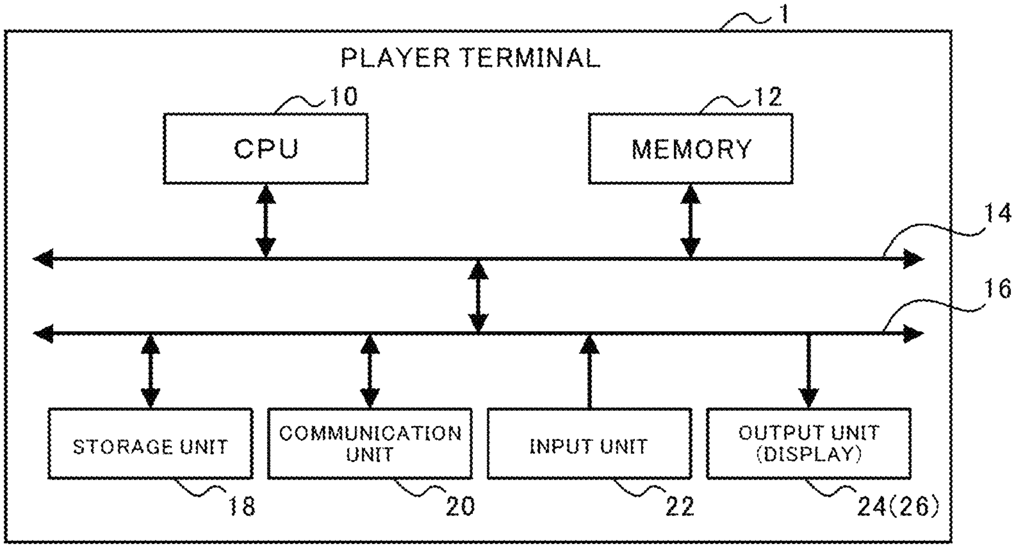
FIG. 2A is a drawing illustrating the hardware configuration of a player terminal.
Figure 2B:
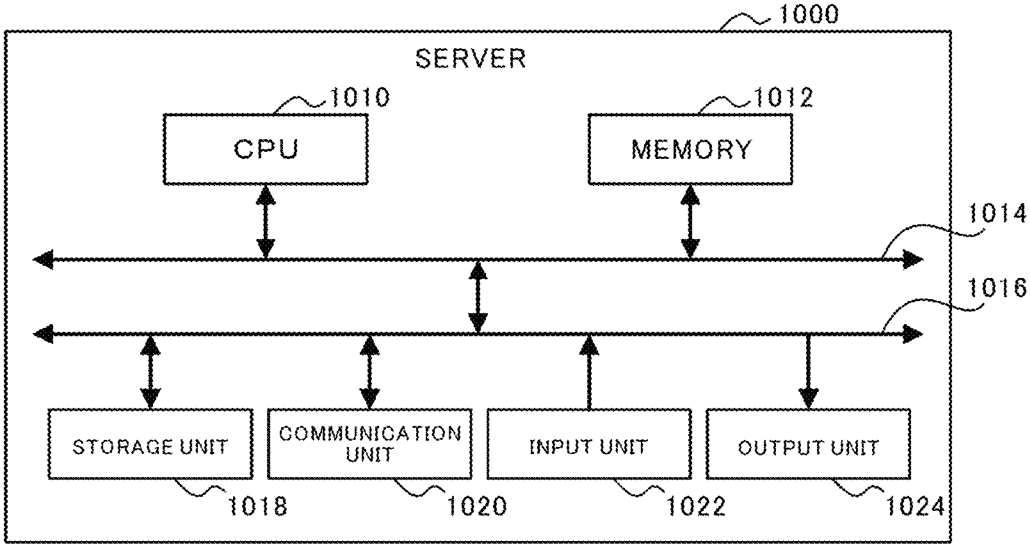
FIG. 2B is a drawing illustrating the hardware configuration of a server.

FIG. 2A is a drawing illustrating the hardware configuration of a player terminal 1. In addition, FIG. 2B is a drawing illustrating the hardware configuration of the server 1000. As shown in FIG. 2A, the player terminal 1 is configured to include a central processing unit (CPU) 10, a memory 12, a bus 14, an input/output interface 16, a storage unit 18, a communication unit 20, an input unit 22, and an output unit 24.

Furthermore, as shown in FIG. 2B, the server 1000 is configured to include a CPU 1010, a memory 1012, a bus 1014, an input/output interface 1016, a storage unit 1018, a communication unit 1020, an input unit 1022, and an output unit 1024.

Note that the configurations and functions of the CPU 1010, the memory 1012, the bus 1014, the input/output interface 1016, the storage unit 1018, the communication unit 1020, the input unit 1022, and the output unit 1024 of the server 1000 are substantially the same as those of the CPU 10, the memory 12, the bus 14, the input/output interface 16, the storage unit 18, the communication unit 20, the input unit 22, and the output unit 24, respectively, of the player terminal 1. Thus, a description of the hardware configuration of the player terminal 1 will be given below, and a description of the server 1000 will be omitted.

The CPU 10 runs programs stored in the memory 12 to control the proceeding of the game. The memory 12 is configured of a read only memory (ROM) or a random access memory (RAM), and stores the programs and various kinds of data needed for controlling the proceeding of the game. The memory 12 is connected to the CPU 10 via the bus 14.

The input/output interface 16 is connected to the bus 14. The storage unit 18, the communication unit 20, the input unit 22, and the output unit 24 are connected to the input/output interface 16.

The storage unit 18 is configured of a semiconductor memory, such as a dynamic random access memory (DRAM), and stores various kinds of programs and data. At the player terminal 1, the programs and data stored in the storage unit 18 are loaded into the memory 12 (RAM) by the CPU 10.

The communication unit 20 is communicatively connected to a communication base station Na wirelessly, and transmits/receives information, such as various kinds of data and programs, to/from the server 1000 via the communication network N. At the player terminal 1, the programs, etc. received from the server 1000 are stored in the memory 12 or the storage unit 18.

The input unit 22 is configured of, for example, a touchscreen, buttons, a keyboard, a mouse, a cross key, or an analog controller with which player operations are input (operations are accepted). Alternatively, the input unit 22 may be a special controller provided in the player terminal 1 or connected (externally attached) to the player terminal 1. Alternatively, the input unit 22 may be configured of an acceleration sensor that detects tilting or movement of the player terminal 1 or a microphone that detects speech of the player. That is, the input unit 22 widely includes devices that enable the player to input his or her intents in distinguishable manners.

The output unit 24 is configured to include a display device and a speaker. The output unit 24 may be a device connected (externally attached) to the player terminal 1. In this embodiment, the player terminal 1 is provided with a display 26 as the output unit 24 and is provided with a touchscreen as the input unit 22, wherein the touchscreen is overlaid on the display 26.

(Game Content)

Next, a game provided by the information processing system S and a game device G according to this embodiment will be described. A player can possess characters earned by lottery, which is a so-called gacha, and characters distributed by the game administrator. Furthermore, the player can possess support cards earned by lottery and support cards distributed by the game administrator.

Although described below in detail, a nurturing game is provided in the game according to this embodiment. In the nurturing game, the player can nurture a character possessed by the player. In addition, the nurturing game according to this embodiment has gameplay in which the player nurtures a character by having the character run in a race simulating a horse race.

Figure 3A:
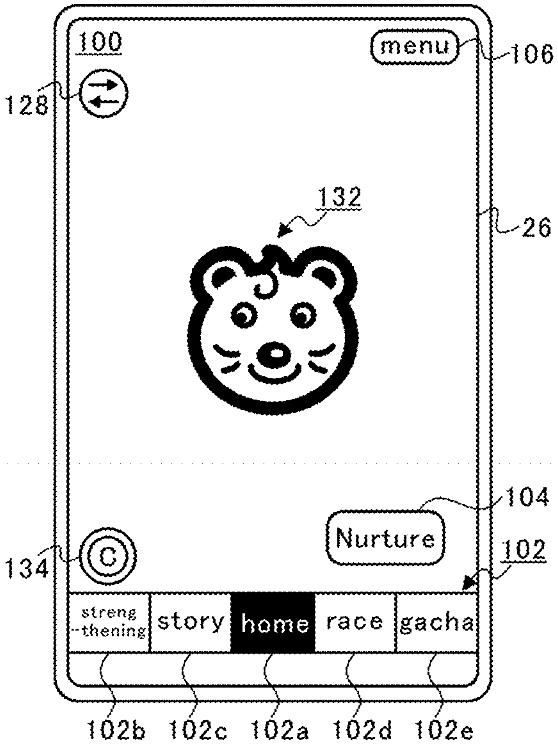
FIG. 3A is a drawing illustrating an example of a home screen.

FIG. 3A is a drawing illustrating an example of a home screen 100. When the game application is started at the player terminal 1, the home screen 100 is displayed on the display 26. In the lower section of the home screen 100, a menu bar 102 is displayed. A plurality of operation sections that can be operated (tapped) by the player are provided in the menu bar 102.

Here, a home screen selection operation section 102*a*, a strengthening screen selection operation section 102*b*, a story screen selection operation section 102*c*, a team stadium screen selection operation section 102*d*, and a gacha screen selection operation section 102*e* are provided in the menu bar 102. Note that in the menu bar 102, the operation section corresponding to the screen being displayed on the display 26 is highlighted so that the screen being displayed can be identified.

When the home screen selection operation section 102*a* is tapped, the home screen 100 shown in FIG. 3A is displayed on the display 26.

When the strengthening screen selection operation section 102*b* is tapped, a strengthening screen (not shown in the figure) is displayed. On the strengthening screen, it is possible to strengthen characters and support cards possessed by the player. The player can enhance the levels set for characters and support cards by strengthening the characters and the support cards. Characters and support cards have various kinds of parameters set therefor, so that the parameters increase as the levels increase. As a result of parameters of a character and a support card increasing, the player can nurture a character having a more powerful status in the nurturing game.

When the story screen selection operation section 102*c* is tapped, a story screen (not shown in the figure) is displayed. Here, a story image is provided for each of the characters appearing in the game. The player can select and view a character and a story image on the story screen.

When the team stadium screen selection operation section 102*d* is tapped, a team stadium screen (not shown in the figure) is displayed. On the team stadium screen, the player can play a team competition game in which a team organized by the player himself/herself is made to compete against a team organized by another player selected by the computer. The team competition game has gameplay in which the player competes against other players for rankings.

When the gacha screen selection operation section 102*e* is tapped, a gacha screen (not shown in the figure) is displayed. On the gacha screen, the player can draw a so-called gacha lottery, in which a character and a support card can be earned by lottery by consuming in-game currencies.

In addition, on the home screen 100, a nurturing game operation section 104 is provided above the menu bar 102. When the nurturing game operation section 104 is tapped, a nurturing game screen is displayed, whereby a nurturing game (described below) is started. The nurturing game is roughly classified into a preparatory stage and a nurturing stage, and the player first selects one of the characters possessed by himself/herself in the preparatory stage to set the selected character as a main character serving as a character to be nurtured. In the preparatory stage, the player also sets a deck to be used when nurturing the main character. A deck is organized with a plurality of inheritance characters and a plurality of support cards (described below in detail). Therefore, in the nurturing game, the inheritance characters and the support cards organized in the deck are used.

When setting the main character and the deck (inheritance characters and support cards) is completed, the preparatory stage transitions to the nurturing stage, whereby a game for nurturing the main character is started. The player can possess the character nurtured in the nurturing game as a nurtured character. As described above, the player can organize nurtured characters possessed by himself/herself into a team for use in a team competition game.

Thus, main objects of the game according to this embodiment are to nurture a nurtured character in a nurturing game and increase the ranking in a team competition game by using nurtured characters.

In addition, in this embodiment, a function for sharing a nurtured character or a support card among players and a function for sharing information among a plurality of players are provided. The player can set a nurtured character and a support card that can be used by other players in nurturing games. More specifically, as shown in FIG. 3A, a setting operation section 106 is provided in the upper right section of the home screen 100. When the setting operation section 106 is tapped, an option setting screen 110 is displayed.

Figure 3B:
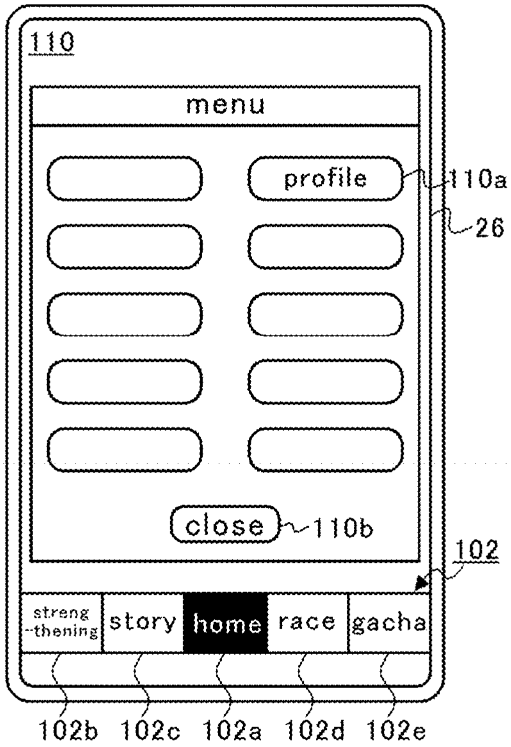
FIG. 3B is a drawing illustrating an example of an option setting screen.

FIG. 3B is a drawing illustrating an example of the option setting screen 110. The option setting screen 110 is a screen that allows various kinds of information to be confirmed and set. A plurality of operation sections are provided on the option setting screen 110, so that when an operation section is tapped, information corresponding to the operation section can be confirmed and set.

The operation sections on the option setting screen 110 include a profile setting operation section 110*a* and a close operation section 110*b*. When the close operation section 110*b* is tapped, the option setting screen 110 is closed, and the home screen 100 is displayed. When the profile setting operation section 110*a* is tapped, a profile setting screen 120 is displayed.

Figure 3C:
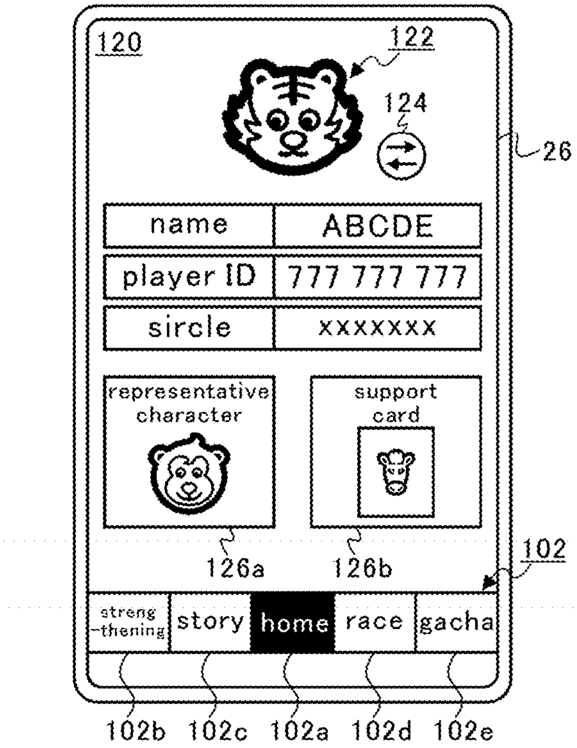
FIG. 3C is a drawing illustrating an example of a profile setting screen.

FIG. 3C is a drawing illustrating an example of the profile setting screen 120. On the profile setting screen 120, the player can confirm and set his/her own profile information. The profile information includes a profile character, a player name, a player ID, a circle to which the player belongs, a representative character, and a rental card.

The profile character functions as a character that is displayed when information concerning the player is viewed by another player. For example, the profile character is displayed when a circle function, which is a place for sharing information with other players, is used. On the profile setting screen 120, a currently set profile character image 122 is displayed. A change button 124 is provided near the profile character image 122. When the change button 124 is tapped, a profile character change screen (not shown in the figure) is displayed. On the profile character change screen, the player can change the profile character.

The player name set by the player, the player ID assigned to the player, and the name of the circle to which the player belongs are also displayed on the profile setting screen 120. In addition, a representative character setting operation section 126*a* and a rental card setting operation section 126*b* are provided on the profile setting screen 120.

When the representative character setting operation section 126*a* is tapped, a representative character setting screen (not shown in the figure) is displayed. On the representative character setting screen, the player can set, as a representative character, any one of the nurtured characters nurtured by himself/herself. In the representative character setting operation section 126*a*, an icon image indicating the currently set representative character is displayed. Although described below in detail, the representative character can be organized as an inheritance character in a deck in a nurturing game played by another player.

When the rental card setting operation section 126*b* is tapped, a rental card setting screen (not shown in the figure) is displayed. On the rental card setting screen, the player can set, as a rental card, any one of the support cards possessed by himself/herself. In the rental card setting operation section 126*b*, an icon image indicating the currently set rental card is displayed. Note that, as described above, the support card set as a rental card can be organized by another player in a deck and is used in a nurturing game played by the other player.

Although not described in detail, when a setting of the profile information is changed on the profile setting screen 120, setting change information is transmitted to the server 1000. In the server 1000, profile information for each player is saved.

As shown in FIG. 3A, a setting icon 128 is displayed on the home screen 100. When the setting icon 128 is tapped, a home setting screen 130 is displayed.

Figure 3D:
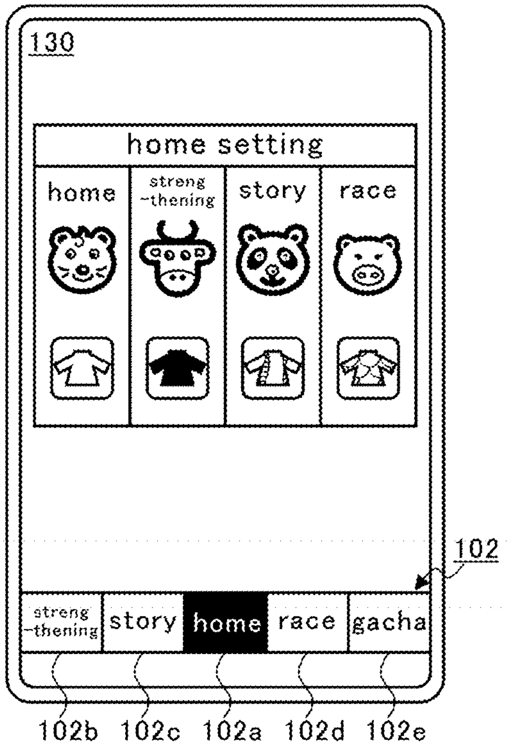
FIG. 3D is a drawing illustrating an example of a home setting screen.

FIG. 3D is a drawing illustrating an example of the home setting screen 130. On the home setting screen 130, the player can set home screen setting characters 132 to be displayed on the home screen 100. The player can set four home screen setting characters 132 to be displayed on the home screen 100.

Although not shown in the figure, when a leftward/rightward flick operation is input on the home screen 100, the screen displayed on the display 26, i.e., the display of the home screen 100 is switched. The currently set four home screen setting characters 132 are displayed on the home screen 100. The home screen setting characters 132 are assigned functions as respective operation sections displayed in the menu bar 102. Therefore, when a home screen setting character 132 displayed on the home screen 100 is tapped, the screen is switched in the same manner as when an operation section in the menu bar 102 is tapped.

On the home setting screen 130, character images corresponding to the four respective home screen setting characters 132 that are currently set, as well as corresponding operation sections, are displayed so as to be identifiable. When a character image displayed on the home setting screen 130 is tapped, a character selection screen (not shown in the figure) is displayed. The player can select a home screen setting character 132 on the character selection screen. Also, the player can set costumes for the home screen setting characters 132 on the home setting screen 130.

As shown in FIG. 3A, a circle icon 134 is displayed on the home screen 100. When the circle icon 134 is tapped, a circle screen is displayed. On the circle screen, the player can exchange information with other players belonging to the same circle.

When the nurturing game operation section 104 is tapped on the home screen 100, the nurturing game screen is displayed, whereby a nurturing game is started. The nurturing game will be described below in detail.

(Nurturing Game)

Figure 4:
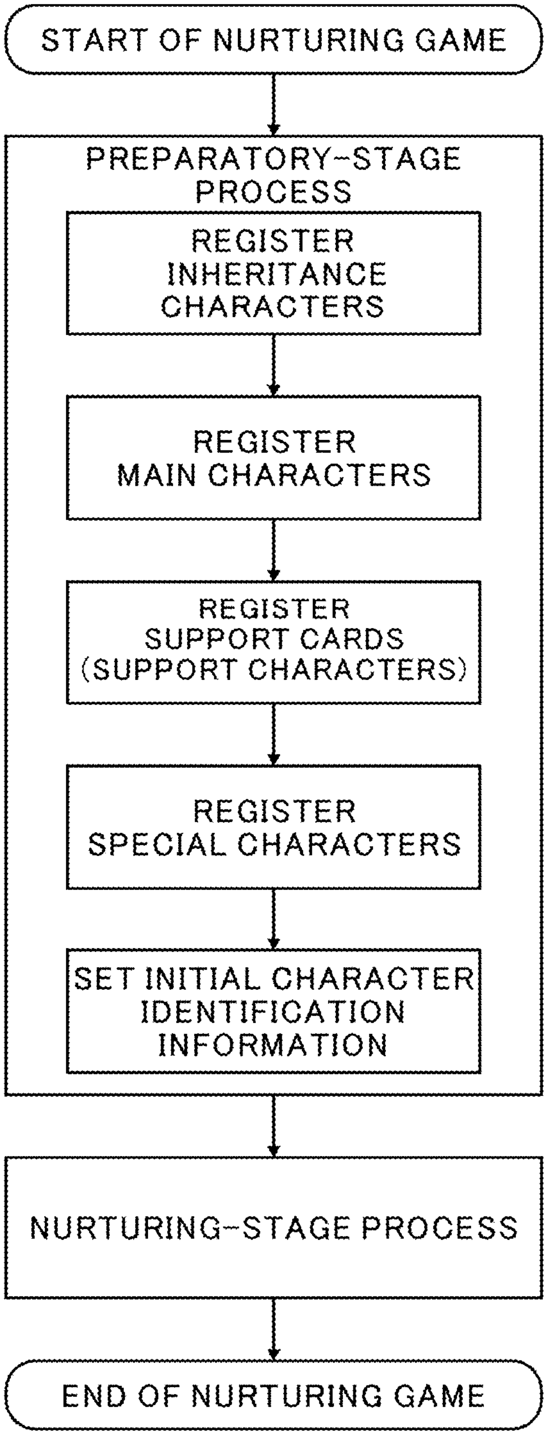
FIG. 4 is a drawing illustrating a general flow of a nurturing game.

FIG. 4 is a drawing illustrating a general flow of the nurturing game. The nurturing game is roughly classified into a setting game and a nurturing main game. Although described below in detail, the nurturing main game is a game in which one main character selected from among the characters possessed by the player is nurtured as a character to be nurtured.

In addition, the setting game is a game in which the player registers a main character and a deck (inheritance characters and support cards) and corresponds to the preparatory stage of the nurturing game. Hereafter, the process executed in the setting game is called a preparatory-stage process, and the process executed in the nurturing main game is called a nurturing-stage process. Here, for the sake of ease of understanding, the general flow of the preparatory-stage process and the nurturing-stage process will be described first.

<Preparatory-Stage Process>

Main tasks in the preparatory-stage process include registration of a main character, registration of a deck (inheritance characters and support cards), registration of special characters, and setting of initial character identification information. Note that support cards are used to assist in nurturing the main character. Each of the support cards always has one character tied thereto, and the characters tied to the support cards that have been registered in the preparatory-stage process assist in nurturing the main character. Hereafter, the character tied to a support card is referred to as a support character.

<Registration of Main Character>

When the nurturing game operation section 104 is tapped by the player on the home screen 100, a scenario selection screen (not shown in the figure) is displayed. In this embodiment, a plurality of scenarios for the nurturing main game are provided. In each of the scenarios for the nurturing main game, a final goal, goals in the middle of the game, etc. are set, and the player needs to clear the set goals one after another. Each of the scenarios has different goals and different time periods in which those goals are to be achieved. The player can select one of the plurality of scenarios on the scenario selection screen. Here, a case where a predetermined scenario is selected will be described.

Figure 5A:
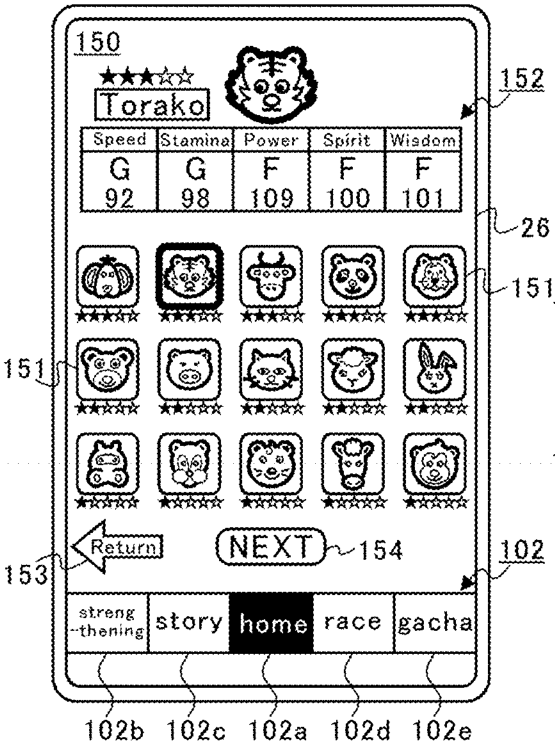
FIG. 5A is a drawing illustrating a main character selection screen.

FIG. 5A is a drawing illustrating a main character selection screen 150. In the center of the main character selection screen 150, a plurality of character icons 151 are displayed, showing a list of the characters possessed by the player. In addition, in the upper section of the main character selection screen 150, a parameter display section 152 is displayed. A return operation section 153 captioned "Return" and a next operation section 154 captioned "NEXT" are also displayed in the lower section of the main character selection screen 150.

In this embodiment, initial values of ability parameters are set for each character, and the initial values of the ability parameters of the character corresponding to the character icon 151 selected by the player are displayed in numerical values in the parameter display section 152. In this embodiment, the larger the numerical value of an ability parameter, the higher the ability.

FIG. 6A is a drawing illustrating an ability parameter (initial value) table. In this embodiment, as shown in FIG. 6A, the initial values of the ability parameters for each character are stored in the ability parameter (initial value) table. Also, on the basis of the initial values of the ability parameters stored in the ability parameter (initial value) table, the initial values of the ability parameters are displayed in the parameter display section 152.

In this embodiment, the initial values of a plurality of kinds of ability parameters indicating the respective abilities are set for each character. More specifically, the ability parameters include: a speed ability parameter captioned "Speed" in the parameter display section 152; a stamina ability parameter captioned "Stamina" in the parameter display section 152; a power ability parameter captioned "Power" in the parameter display section 152; a spirit ability parameter captioned "Spirit" in the parameter display section 152; and a wisdom ability parameter captioned "Wisdom" in the parameter display section 152.

Note that the initial values of the ability parameters for each character may be increased via a player operation, etc. For example, each character may have five levels, so that the player may be able to increase the level of the character by consuming in-game currencies or predetermined items. In this case, it is a good idea to increase the initial values of the ability parameters as the level of the character increases. Note that the player can increase the values of ability parameters in the nurturing main game. Namely, an object of the nurturing main game is to nurture a character with larger values of the ability parameters.

In addition, aptitude parameters (initial values) are set for each character in this embodiment. FIG. 6B is a drawing illustrating an aptitude parameter (initial value) table. In this embodiment, the initial values of the aptitude parameters for each character are stored in the aptitude parameter (initial value) table, as shown in FIG. 6B. The initial value of each of the aptitude parameters is set as one of seven stages from letter A to letter G. Note that the aptitude parameter A indicates the highest aptitude, and the aptitude parameter G indicates the lowest aptitude. Note that the initial values of the aptitude parameters may be displayed in the parameter display section 152 on the basis of the initial values of the aptitude parameters stored in the aptitude parameter (initial value) table.

In this embodiment, the initial values of aptitude parameters in each of a plurality of kinds of aptitudes are set for each character. More specifically, the aptitude parameters include: aptitude parameters related to a racetrack aptitude (turf track and dirt track); aptitude parameters related to a distance aptitude (short distance, mile, intermediate distance, and long distance); and aptitude parameters related to a running style aptitude (pace maker, front runner, stalker, and closer).

It is also acceptable that the initial values of the aptitude parameters for each character can be increased by consuming in-game currencies. In addition, the value of an aptitude parameter may change in the nurturing main game. Note that an aptitude parameter may be set as S, which indicates a higher aptitude than A, in the nurturing main game.

Figure 5B:
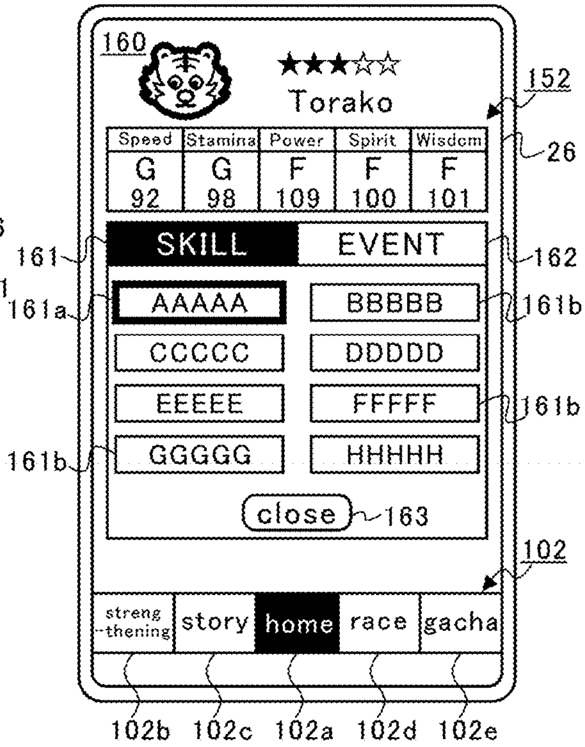
FIG. 5B is a first drawing illustrating a character details screen.
Figure 5C:
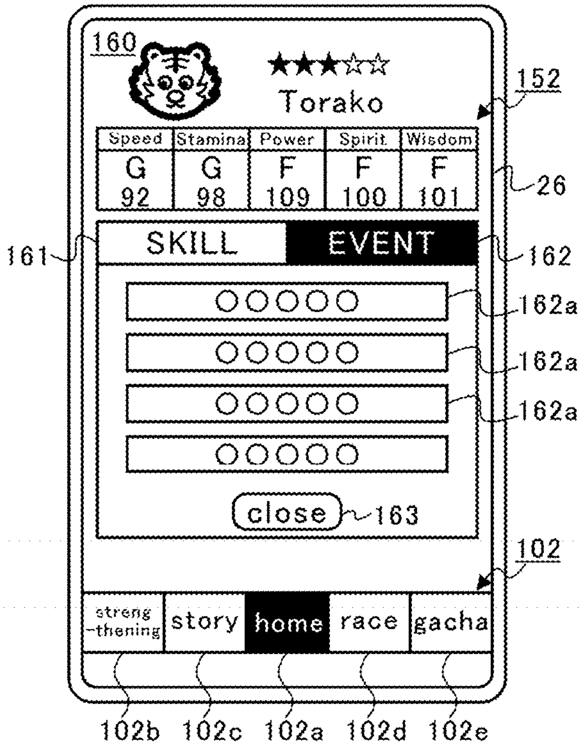
FIG. 5C is a second drawing illustrating the character details screen.

FIG. 5B is a first drawing illustrating a character details screen 160. In addition, FIG. 5C is a second drawing illustrating the character details screen 160. When a character icon 151 on the main character selection screen 150 is pressed and held, the character details screen 160 is displayed on the display 26. On the character details screen 160, details of the abilities of the character corresponding to the character icon 151 that was pressed and held on the main character selection screen 150 are displayed.

In the center of the character details screen 160, a skill operation section 161 and an event operation section 162 are displayed. As shown in FIG. 5B, when the character details screen 160 is displayed, the skill operation section 161 is initially highlighted, and skills provided for the character are displayed. A skill is an ability that may be invoked when a predetermined condition is satisfied while an individual race and a team race are being executed, as described below. When a skill is invoked, the race proceeds in a manner advantageous to each character.

FIG. 6C is a drawing illustrating a skill table. As shown in FIG. 6C, skills for each of the characters possessed by the player are stored in the skill table. Also, skills are displayed on the character details screen 160, as shown in FIG. 5B, on the basis of the skills stored in the skill table. Note that merely possessing a skill does not allow the skill to be invoked; a skill can be invoked only after it has been earned. Hereinafter, a skill that is ready to be invoked by a character is referred to as an earned skill.

One earned skill 161*a* is set for a character from the beginning of the nurturing main game. In addition, a plurality of possessed skills 161*b* are set for the character, besides the one earned skill 161*a*. A possessed skill 161*b* is a skill that can be earned after the start of the nurturing main game by consuming skill points, as described below. That is, a possessed skill 161*b* can become an earned skill 161*a* in exchange for skill points.

In this embodiment, the skill indicated with a double circle in the skill table shown in FIG. 6C is displayed as the earned skill 161*a* on the character details screen 160 in FIG. 5B. In addition, the skills indicated with a circle in the skill table shown in FIG. 6C are displayed as the possessed skills 161*b* on the character details screen 160 in FIG. 5B. In this embodiment, the earned skill 161*a* is highlighted so that it can be easily distinguished from the possessed skills 161*b*, as shown on the character details screen 160 in FIG. 5B.

Although this embodiment is described by way of an example where one earned skill 161*a* and seven possessed skills 161*b* are displayed in FIG. 5B as skills provided for each character, the present invention is not limited to this example. For example, the number of earned skills 161*a* and the number of possessed skills 161*b* may differ for each character. Also, for example, the number of earned skills 161*a* or possessed skills 161*b* for each character may increase with an increase in the level of the character, consumption of in-game currencies or items, etc.

In addition, when the player taps the event operation section 162 on the character details screen 160, the content of the character details screen 160 is switched to display dedicated events 162*a* provided for the character, as shown in FIG. 5C. In this case, the event operation section 162 is highlighted, as shown in FIG. 5C. A dedicated event 162*a* occurs when a predetermined condition is satisfied in the nurturing main game, and displays a story related to a character appearing in the nurturing game or changes the value of an ability parameter.

FIG. 6D is a drawing illustrating a dedicated event table. As shown in FIG. 6D, dedicated events 162*a* for each of the characters possessed by the player are stored in the dedicated event table. Also, on the basis of the dedicated events 162*a* stored in the dedicated event table, the dedicated events 162*a* are displayed on the character details screen 160, as shown in FIG. 5C. Note that the dedicated events 162*a* may include a hint event that enables possession or earning of a skill, an ability event that increases or decreases the numerical values of ability parameters of a character, etc.

Regarding the dedicated events 162*a* displayed on the character details screen 160 shown in FIG. 5C, all of the dedicated events 162*a* may be allowed to occur during execution of the nurturing main game, at least some of the dedicated events 162*a* may be allowed to occur during execution of the nurturing main game, or none of the dedicated events 162*a* may be allowed to occur during execution of the nurturing main game if the predetermined condition is not satisfied. Also, for example, the number of dedicated events 162*a* provided for each character may increase with an increase in the level of the character, consumption of in-game currencies or items, etc. It may also be acceptable that when a predetermined condition is satisfied, a dedicated event 162*a* that is not displayed as a dedicated event 162*a* is allowed to occur during the nurturing main game.

In addition, as shown in FIGS. 5B and 5C, a close operation section 163 captioned “close” is displayed in the lower section of the character details screen 160. When the close operation section 163 on the character details screen 160 is tapped, the character details screen 160 disappears, and the main character selection screen 150 is displayed on the display 26.

In addition, when the return operation section 153 is tapped on the main character selection screen 150 shown in FIG. 5A, the home screen 100 shown in FIG. 3A is displayed on the display 26. In addition, when the next operation section 154 is tapped on the main character selection screen 150 shown in FIG. 5A, the currently selected character is set as a main character, and an inheritance character selection screen 170 is displayed on the display 26.

<Registration of Inheritance Characters>

Figure 7A:
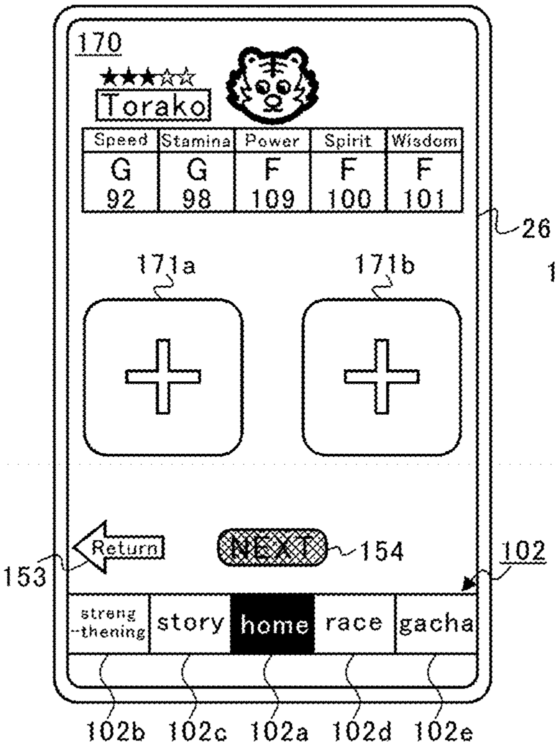
FIG. 7A is a first drawing illustrating an inheritance character selection screen.
Figure 7B:
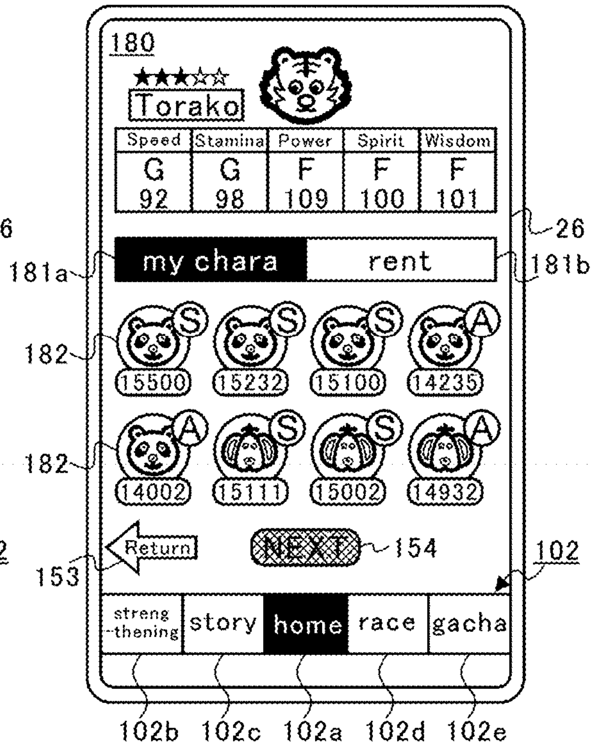
FIG. 7B is a first drawing illustrating a nurtured character list screen.
Figure 7C:
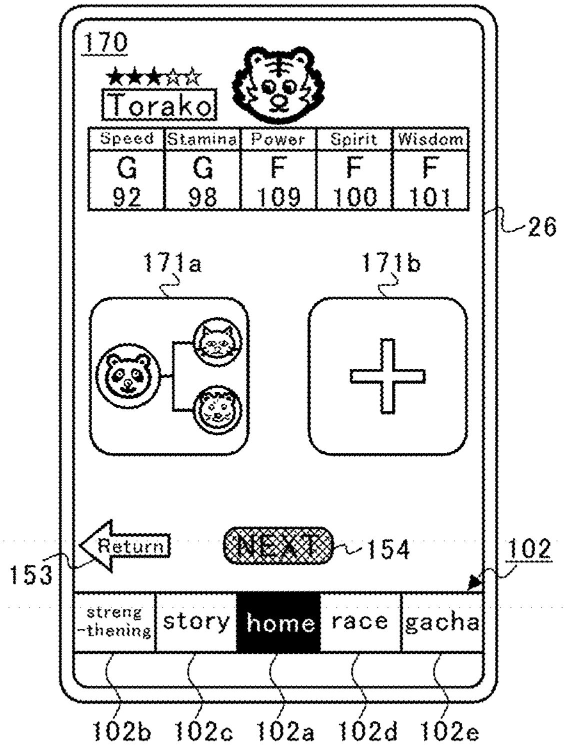
FIG. 7C is a second drawing illustrating the inheritance character selection screen.
Figure 7D:
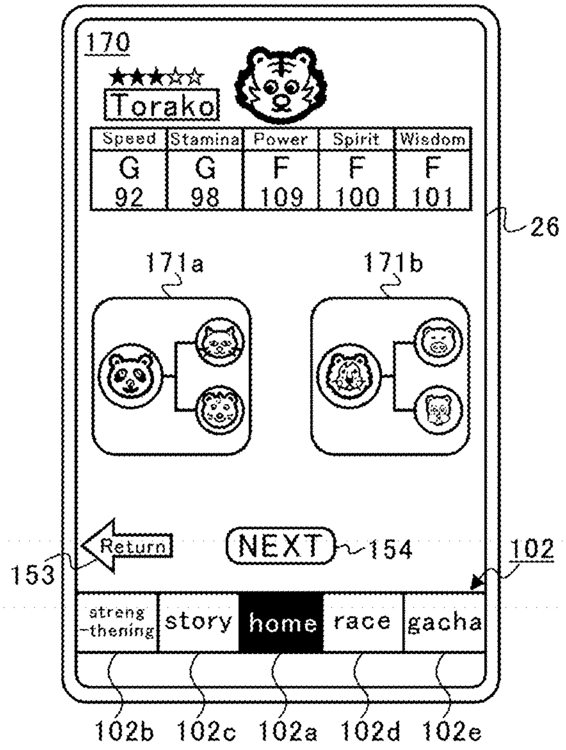
FIG. 7D is a third drawing illustrating the inheritance character selection screen.

FIG. 7A is a first drawing illustrating the inheritance character selection screen 170. FIG. 7B is a first drawing illustrating a nurtured character list screen 180. FIG. 7C is a second drawing illustrating the inheritance character selection screen 170. FIG. 7D is a third drawing illustrating the inheritance character selection screen 170. The inheritance character selection screen 170 is a screen for the player to register inheritance characters. An inheritance character is a character from whom the main character inherits ability values, skills, etc. The player can select two inheritance characters from the nurtured characters possessed by himself/herself, as well as from the representative characters of other players extracted according to a predetermined extraction condition, such as the representative characters of friends typified by followers, thereby organizing and registering the selected inheritance characters in a deck. Note that the representative character of another player can be organized as an inheritance character in the deck only once in one nurturing game.

A first inheritance character selection region 171*a* and a second inheritance character selection region 171*b* are provided on the inheritance character selection screen 170. When the screen transitions from the main character selection screen 150 to the inheritance character selection screen 170, the first inheritance character selection region 171*a* and the second inheritance character selection region 171*b* are displayed blank, as shown in FIG. 7A.

When the first inheritance character selection region 171*a* or the second inheritance character selection region 171*b* is tapped, the nurtured character list screen 180 shown in FIG. 7B is displayed. A my character tab 181*a* and a rental tab 181*b* are provided on the nurtured character list screen 180. In addition, a nurtured character list display region is provided below the my character tab 181_a_ and the rental tab 181_b_. Nurtured character icons 182 are displayed in the nurtured character list display region.

While the my character tab 181_a_ is selected, the nurtured character icons 182 corresponding to the nurtured characters possessed by the player himself/herself are displayed, as shown in FIG. 7B. Also, although not shown in the figure, the nurtured character icons 182 corresponding to the representative characters of friends, i.e., nurtured characters that have been nurtured by the friends, are displayed while the rental tab 181_b_ is selected. When a nurtured character icon 182 is pressed and held, detailed information concerning the nurtured character corresponding to the nurtured character icon 182 is displayed.

In addition, when a nurtured character icon 182 is tapped, the nurtured character corresponding to the nurtured character icon 182 is temporarily selected. When the nurtured character icon 182 is tapped, the inheritance character selection screen 170 is also displayed, as shown in FIG. 7C. At this time, for example, if the nurtured character list screen 180 is displayed as a result of the first inheritance character selection region 171_a_ being tapped and a nurtured character icon 182 is tapped on the nurtured character list screen 180, then an image indicating the nurtured character that has been temporarily selected is displayed in the first inheritance character selection region 171_a_. In addition, information concerning the inheritance characters used when a nurtured character was nurtured is stored so as to be tied to the nurtured character. In the first inheritance character selection region 171_a_, information concerning the inheritance characters used when the nurtured character was nurtured is displayed.

In this state, for example, if the nurtured character list screen 180 is displayed as a result of the second inheritance character selection region 171_b_ being tapped and a nurtured character icon 182 is tapped on the nurtured character list screen 180, then an image indicating the nurtured character that has been temporarily selected is displayed in the second inheritance character selection region 171_b_, as shown in FIG. 7D.

When the two nurtured characters are in a temporarily selected state, the next operation section 154 provided on the inheritance character selection screen 170 is enabled. When the enabled next operation section 154 is tapped, the temporarily selected nurtured characters are organized and registered in the deck as inheritance characters, and a support card organization screen 190 described below is displayed.

Note that on the inheritance character selection screen 170, the player needs to select two nurtured characters as inheritance characters. If two inheritance characters are not in a temporarily selected state, the next operation section 154 is grayed out, as shown in FIGS. 7A and 7C, disabling a player operation from being accepted. In addition, the return operation section 153 is provided on the inheritance character selection screen 170, so that when the return operation section 153 is tapped, the main character selection screen 150 is displayed.

<Registration of Support Cards>

Figure 8A:
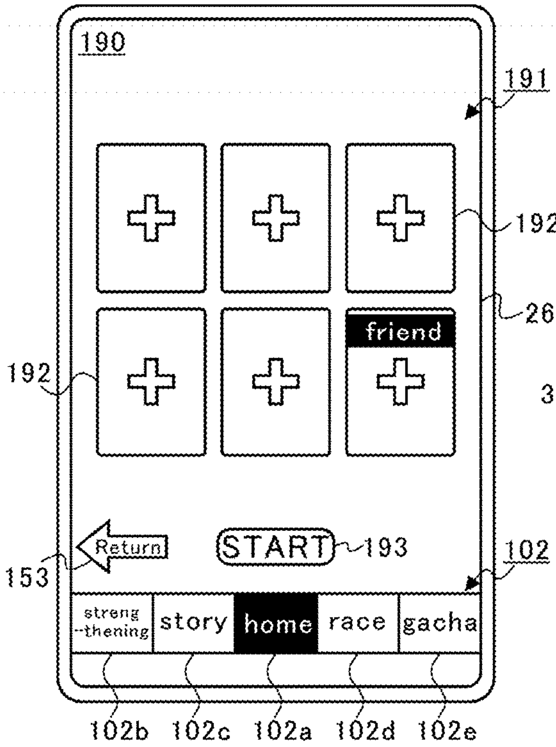
FIG. 8A is a first drawing illustrating a support card organization screen.

FIG. 8A is a first drawing illustrating the support card organization screen 190. When two inheritance characters are registered on the inheritance character selection screen 170, the support card organization screen 190 shown in FIG. 8A is displayed. A support card display region 191 is provided in the center of the support card organization screen 190. The support card display region 191 includes a plurality of support card display frames 192. In addition, the return operation section 153 captioned "Return" and a start operation section 193 captioned "START" are displayed in the lower section of the support card organization screen 190.

The plurality of (six here) support card display frames 192 are displayed in the support card display region 191. The same number of support card display frames 192 as the number of support cards that can be set by the player are displayed. Note that in the initial display of the support card organization screen 190, the support card display frames 192 are displayed blank.

In this embodiment, the player can set six kinds of support cards in the deck. Note that some (e.g., five) of the six kinds of support cards that can be set by the player can be selected from the support cards possessed by the player. In addition, some other (e.g., one) of the six kinds of support cards that can be set by the player can be selected from the support cards that are set as rental cards by other players such as friends.

Figure 8B:
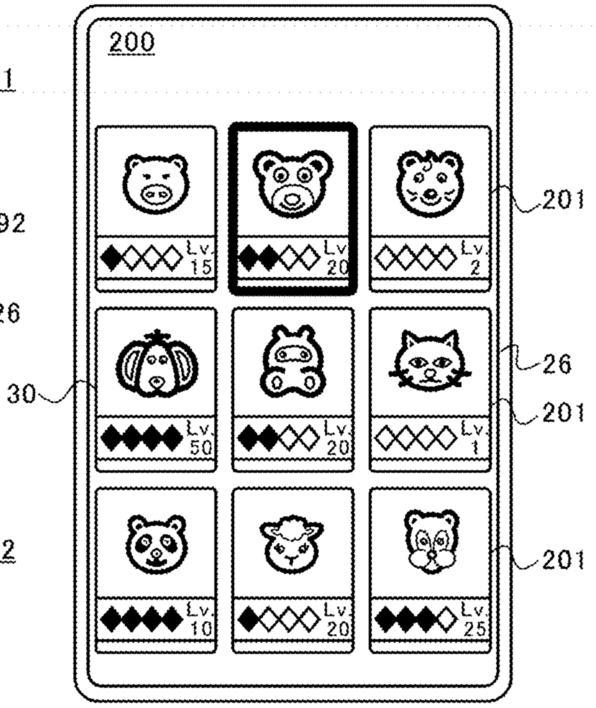
FIG. 8B is a drawing illustrating a support card selection screen.

FIG. 8B is a drawing illustrating a support card selection screen 200. When a support card display frame 192 (excluding the support card display frame 192 shown in the lower right corner) is tapped on the support card organization screen 190 in FIG. 8A, the support card selection screen 200 shown in FIG. 8B is displayed on the display 26. Card icons 201 corresponding to the support cards possessed by the player are listed on the support card selection screen 200. The player can select a support card by tapping a card icon 201 displayed on the support card selection screen 200.

Although not shown in the figure, when the support card display frame 192 displayed in the lower right corner of the support card organization screen 190 is tapped, support cards set as rental cards by friends or players extracted on the basis of a predetermined condition, such as a lottery, are displayed on the support card selection screen 200. At this time, the player can select one of the support cards of the friends by tapping a support card displayed on the support card selection screen 200. Thus, in the nurturing game, the player can use a support card possessed by another player.

FIG. 9A is a drawing illustrating a support card table. As shown in FIG. 9A, the support card table stores the kind of support character (i.e., character ID), rarity, level, and favorite training for each of the support card types (i.e., support card IDs) possessed by the player. There is a one-to-one correspondence between the support characters and the support card types. That is, one character ID is always tied to a support card ID. In other words, one support character is always associated with one support card.

In this embodiment, a rarity is set for each of the support cards. There are three stages of rarity: R (rare), SR (super rare), and SSR (super special rare). Note that the rarity is set so that R is the lowest rarity and SSR is the highest rarity. In this embodiment, support cards with higher rarity tend to have higher support effects, as described below. In addition, in this embodiment, support cards with higher rarity tend to have a larger number of possessed skills and support events described below.

There are 50 levels of support card, from level 1 to level 50. The level of a support card can be increased by the player, and the level increased by the player is stored for each of the support cards. Note that the level of a support card can be increased by using in-game currencies or items. Note that the maximum level of a support card is limited according to rarity.

For example, the maximum level of a support card with rarity R is defined as 20, the maximum level of a support card with rarity SR is defined as 25, and the maximum level of a support card with rarity SSR is defined as 30.

Note that the maximum level of a support card can be increased in a stepwise manner when a predetermined condition is satisfied. For example, it is also acceptable that a support card with rarity R can have the maximum level thereof increased to 40, a support card with rarity SR can have the maximum level thereof increased to 45, and a support card with rarity SSR can have the maximum level thereof increased to 50.

FIG. 9B is a drawing illustrating a support effect table. As shown in FIG. 9B, support effects for each of the support card types possessed by the player are stored in the support effect table.

Support effects work to increase various kinds of statuses in the nurturing main game. A plurality of support effect targets are provided in a support card. Examples of support effect targets include physical strength, speed, stamina, power, spirit, wisdom, etc.

FIG. 9C is a drawing illustrating a possessed skill table. In the possessed skill table, possessed skills are set for each of the support cards possessed by the player, as shown in FIG. 9C. In this embodiment, each of the support cards has possessed skills set therefor, just as the character set as the main character by the player has possessed skills set therefor. The possessed skills set for each of the support cards can be earned by the main character selected by the player or by another character promoted to a team member (described below) when a hint event occurs during the nurturing main game.

FIG. 9D is a drawing illustrating a support event table. As shown in FIG. 9D, support events that can occur for each of the support cards possessed by the player are stored in the support event table. A support event is an event that may occur during the execution of the nurturing main game. When a support event occurs, the values of various kinds of statuses in the nurturing main game may increase or decrease.

For example, a support event that will occur may be decided according to the turn number, or alternatively, a support event that will occur may be decided by a predetermined lottery. In addition, a plurality of support events that will occur may be selected in one turn. In any case, it suffices if a support event that will occur is decided by a predetermined decision method that has been set in advance.

Figure 8C:
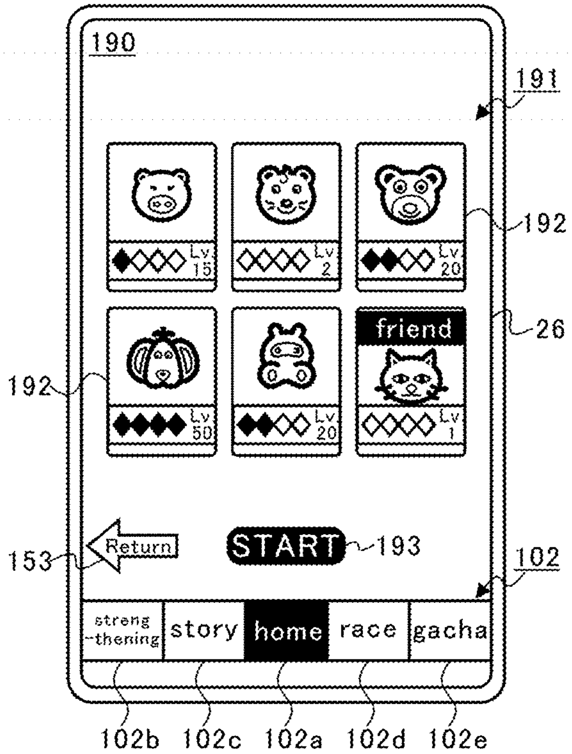
FIG. 8C is a second drawing illustrating the support card organization screen.

FIG. 8C is a second drawing illustrating the support card organization screen 190. In this embodiment, when all six support cards are selected, the start operation section 193 becomes enabled, as shown in FIG. 8C. On the other hand, when not all six support cards have been selected, the start operation section 193 is disabled, as shown in FIG. 8A.

Note that when the return operation section 153 is operated on the support card organization screen 190, the inheritance character selection screen 170 shown in FIG. 7D is displayed on the display 26. Also, as shown in FIG. 8C, when the start operation section 193 is tapped on the support card organization screen 190, the support cards being selected are registered, and a game screen 210 (FIG. 13A) is displayed on the display 26.

<Registration of Special Characters>

Once the main character, inheritance characters, and support cards are registered as described above, special characters are registered next. In this embodiment, four kinds of characters are set as special characters in advance.

FIG. 10 is a first drawing illustrating a character identification information table. FIG. 11 is a second drawing illustrating the character identification information table. FIG. 10 shows a case where “character C” is registered as the main character and “character E”, “character I”, “character L”, “character M”, “character Q”, and “character T” are registered as support characters. FIG. 11 also shows a case where “character F” is registered as the main character and “character E”, “character J”, “character L”, “character M”, “character Q”, and “character T” are registered as support characters.

Note that this embodiment is restricted so that the character type set as the main character and the character type set as a support character are not duplicated when the support cards are registered.

In this embodiment, “character F”, “character J”, “character N”, and “character R” are set as special characters, as shown in FIG. 10. Also, when the player selects a main character from among a plurality of characters, the selected character is registered as a main character in the character identification information table.

Also, when support cards are selected via a player operation, the character identification information table is updated, and the characters corresponding to the selected support cards are registered as support characters.

In addition, when information concerning the main character and the support cards is registered in the character identification information table, information concerning special characters is registered. At this time, as shown in FIGS. 10 and 11, “character F”, “character J”, “character N”, and “character R” are registered as special characters, regardless of the types of the registered main character and support characters.

<Setting of Initial Character Identification Information>

After the main character, inheritance characters, support characters, and special characters are registered as described above, team members and sub-members are registered. Although described below in detail, in the nurturing game, it is necessary to play a competitive game by using characters registered as team members. In addition, when a character registered as a sub-member satisfies a certain condition, the character is registered as a team member.

In this embodiment, the characters registered as the main character, support characters, and special characters in the character identification information table are registered as team members. Namely, in the case of FIG. 10, “character C”, “character E”, “character F”, “character I”, “character J”, “character L”, “character M”, “character N”, “character Q”, “character R”, and “character T” are registered as team members. In addition, in the case of FIG. 11, “character E”, “character F”, “character J”, “character L”, “character M”, “character N”, “character Q”, “character R”, and “character T” are registered as team members.

In addition, among the characters or the support cards (support characters) possessed by the player, characters that are not registered as the team members are registered as sub-members in the character identification information table. Note that among the characters defined in advance, all characters that are not registered as the team members, or some characters selected by lottery, may be registered as the sub-members.

Although it is assumed here that the support characters and the special characters are registered as team members from the beginning of the nurturing main game, it is also acceptable that a support character and a special character are registered as sub-members at the beginning of the nurturing main game and are then registered as team members at a predetermined timing.

In this way, when information concerning the team members and the sub-members (initial character identification information) is stored in the character identification information table, the preparatory-stage process is completed.

<Nurturing-Stage Process>

After the preparatory-stage process is completed, the nurturing-stage process starts. In the nurturing-stage process, the characters registered as the main characters and the team members can be nurtured. Note that for the sake of ease of understanding, the basic flow of the nurturing main game is described below.

FIG. 12 is a drawing illustrating an elective table. Note that here, an elective table is provided for each type of the main character. It should be noted, however, that a common elective table may be provided regardless of the type of the main character. As shown in FIG. 12, the nurturing game consists of turns 1 through 60, and has gameplay in which various kinds of parameters are updated according to the results of selections made by the player in each turn. In addition, according to the elective table, the electives that can be selected by the player are set in advance for each turn.

Figure 13A:
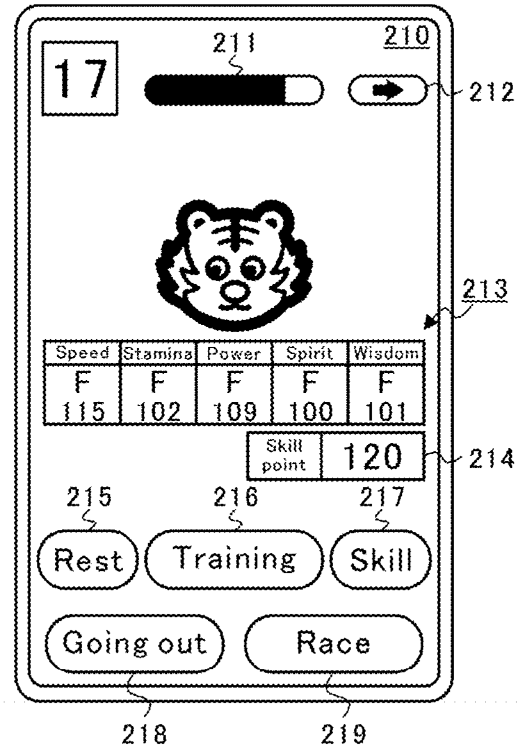
FIG. 13A is a first drawing illustrating a game screen.
Figure 13B:
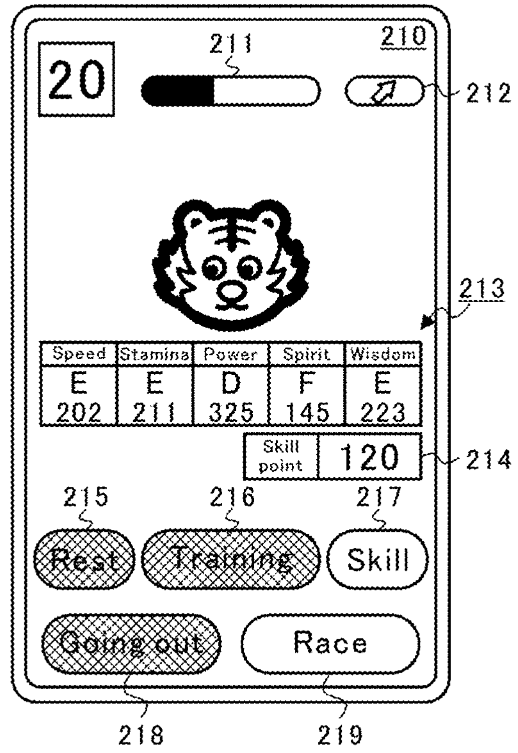
FIG. 13B is a second drawing illustrating the game screen.

FIG. 13A is a first drawing illustrating the game screen 210. FIG. 13B is a second drawing illustrating the game screen 210. Upon transition to the nurturing-stage process, the game screen 210 shown in FIGS. 13A and 13B is displayed on the display 26. In the upper section of the game screen 210, a physical strength display section 211 and a physical condition display section 212 are displayed. The main character has a "physical strength" parameter. The "physical strength" parameter is mainly used to calculate a failure rate, which is the probability of failure in training, as described below. The physical strength display section 211 is displayed so that the current remaining amount of "physical strength" of the main character can be visually grasped with respect to the upper limit of "physical strength".

In addition, the main character also has a "physical condition" parameter. The physical condition display section 212 is displayed so that the current "physical condition" of the main character can be visually grasped at a plurality of stages (five stages: very bad shape, bad shape, normal, good shape, and great shape). The higher the "physical condition" parameter, the more advantageous to the main character the proceeding of the race, and the larger the increase values of ability parameters due to training.

In addition, as shown in FIGS. 13A and 13B, the image of the main character, a status display section 213, and a skill point display section 214 are displayed in the center of the game screen 210. In the status display section 213, the current statuses of the main character are indicated in numerical values and a plurality of ranks (16 ranks: $G^+$, F, $F^+$, E, $E^+$, D, $D^+$, C, $C^+$, B, $B^+$, A, $A^+$, S, SS, $SS^+$). More specifically, the numerical values and ranks of the following ability parameters are displayed in this embodiment: "Speed", "Stamina", "Power", "Spirit", and "Wisdom". In addition, the remaining amount of skill points possessed by the main character in the nurturing game is indicated numerically in the skill point display section 214.

Also, as shown in FIGS. 13A and 13B, in the lower section of the game screen 210, a rest operation section 215 captioned "Rest", a training operation section 216 captioned "Training", a skill operation section 217 captioned "Skill", an outing operation section 218 captioned "Going Out", and an individual race operation section 219 captioned "Race" are displayed. In addition, the current turn number is also displayed in the upper section of the game screen 210.

In addition, the player can select, in each turn, any of the electives including "Rest" (rest operation section 215), "Training" (training operation section 216), "Going Out" (outing operation section 218), and "Race" (individual race operation section 219). At this time, the electives that can be selected in each turn are set in advance, as shown in FIG. 12.

In this embodiment, some turns are set so as not to allow the selection of the electives indicated by the rest operation section 215, training operation section 216, and outing operation section 218, as seen in turn 20, turn 30, turn 35, turn 57, and turn 59 in FIG. 12. In these turns, the rest operation section 215, the training operation section 216, and the outing operation section 218 are grayed out as shown in FIG. 13B, disabling a player operation from being accepted. Therefore, in these turns, the player needs to select the individual race operation section 219.

On the other hand, the skill operation section 217 is always set to be selectable in all turns. Although described below in detail, these turns do not end even if a skill is earned. Note that in this embodiment, a team race is forced after the end of a predetermined turn.

Figure 14A:
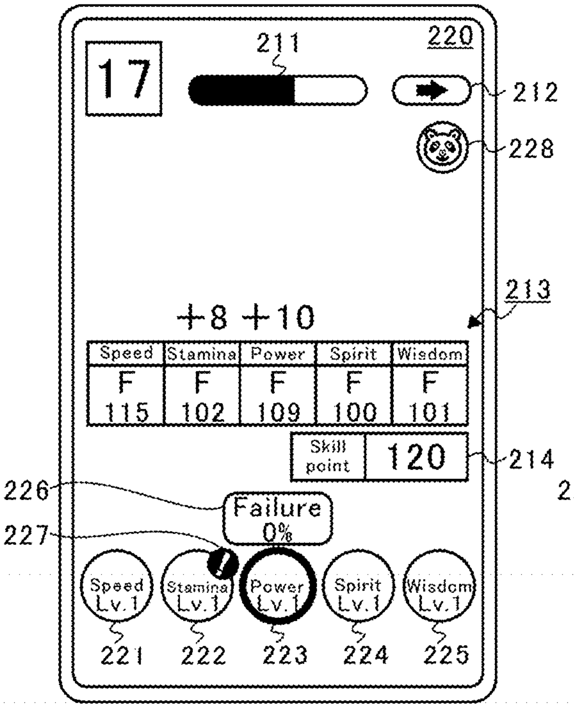
FIG. 14A is a first drawing illustrating a training screen.
Figure 14B:
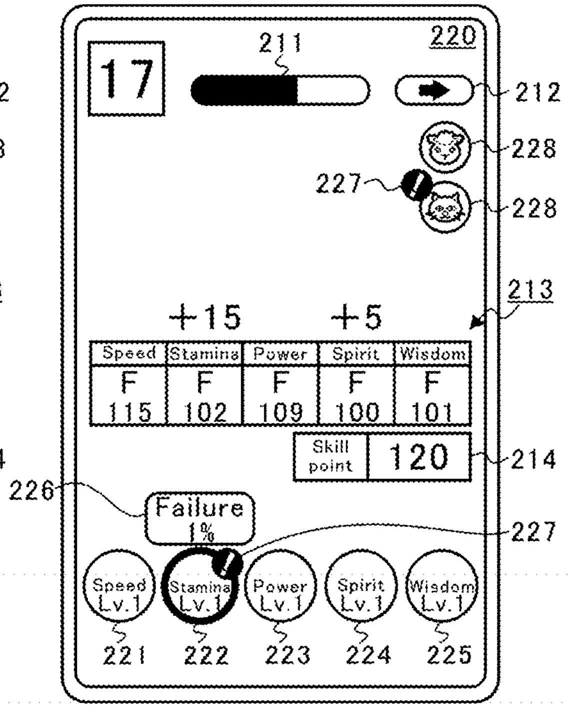
FIG. 14B is a second drawing illustrating the training screen.

FIG. 14A is a first drawing illustrating a training screen 220. FIG. 14B is a second drawing illustrating the training screen 220. When the training operation section 216 on the game screen 210 is operated, the training screen 220 is displayed on the display 26.

As shown in FIG. 14A, training courses are displayed in the lower section of the training screen 220. Here, a speed operation section 221 captioned "Speed", a stamina operation section 222 captioned "Stamina", a power operation section 223 captioned "Power", a spirit operation section 224 captioned "Spirit", and a wisdom operation section 225 captioned "Wisdom" are displayed.

When the player taps one of the operation sections 221 to 225 once, the training course corresponding to the tapped one of the operation sections 221 to 225 is temporarily selected, and the one of the operation sections 221 to 225 corresponding to the temporarily selected training course is highlighted. FIG. 14A shows that the power operation section 223 is temporarily selected. In addition, FIG. 14B shows that the stamina operation section 222 is temporarily selected.

Training levels for the training courses are also displayed on the respective operation sections 221 to 225. A training level is a parameter that increases on the basis of the team ranking, and the higher the training level, the greater the increase values of the ability parameters when the training is executed. A training level is initially set to level 1 and increases to a maximum of level 5.

In addition, a failure rate display section 226 captioned "Failure" appears on the temporarily selected one of the operation sections 221 to 225. The failure rate numerically displayed in the failure rate display section 226 is set to increase inversely proportionally to the remaining amount of physical strength displayed in the physical strength display section 211.

In addition, the status display section 213 displays the values by which the ability parameters are increased when the training corresponding to the temporarily selected one of the operation sections 221 to 225 is successfully executed. For example, in the example shown in FIG. 14A, the power operation section 223 is temporarily selected, and "+8" and "+10" are displayed for "Stamina" and "Power", respectively, in the status display section 213. In addition, in the example shown in FIG. 14B, the stamina operation section 222 is temporarily selected, and "+15" and "+5" are displayed for "Stamina" and "Spirit", respectively, in the status display section 213.

In addition, an event report indicator 227 is displayed in any of the operation sections 221 to 225 corresponding to a training course in which a predetermined event occurs when the training is successfully executed. Note that the event report indicator 227 can be displayed in different manners depending on the event type.

In addition, as shown in FIG. 14B, in the upper right section of the training screen 220, placement character icons 228 of the characters placed in the training are displayed for the training course corresponding to the temporarily selected one of the operation sections 221 to 225. Also, in the case where a predetermined event occurs corresponding to the character displayed on a placement character icon 228 when the training is successful, an event report indicator 227 is displayed on the corresponding placement character icon 228. Note that hereinafter, training in which a character is placed is referred to as joint training.

Figure 14C:
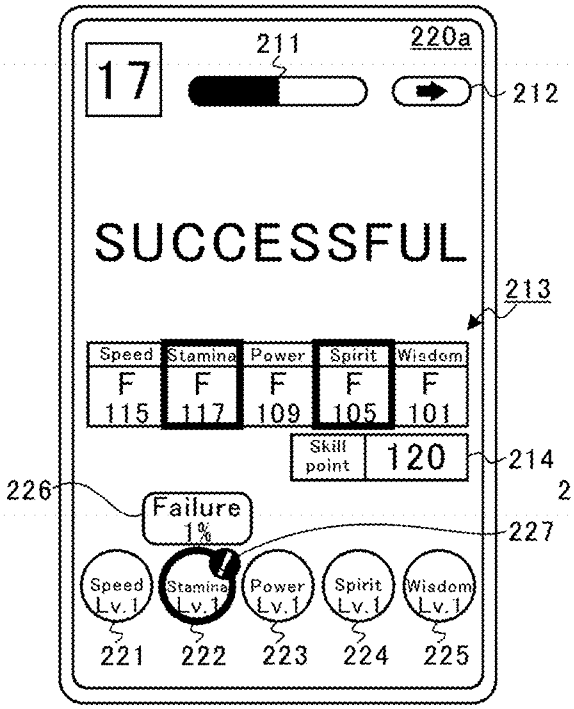
FIG. 14C is a drawing illustrating a training result report screen.

FIG. 14C is a drawing illustrating a training result report screen 220*a*. When any temporarily selected one of the operation sections 221 to 225 is tapped again, the training corresponding to the tapped one of the operation sections 221 to 225 is executed. When the training is executed, the training result report screen 220*a* is displayed on the display 26 to report success or failure in the training. Here, the word "success" is displayed to inform the player of success in the training.

Also at this time, on the basis of the success in the training, the ability parameters in the status display section 213 are updated and displayed. Namely, the ability parameters (ability information) that belong to the main character and that correspond to the training course (nurturing type) selected by the player are updated.

Here, the values of the ability parameters that are displayed in the status display section 213 in FIG. 14A or FIG. 14B and that adds to the ability parameters when the training is successful are added. In addition, the display in the physical strength display section 211 is also updated according to the training course executed. When the speed, stamina, power, or spirit training is successfully executed, the physical strength is decreased. On the other hand, when the wisdom training is successfully executed, the physical strength is recovered.

In addition, if the training fails, a predetermined penalty is given. The specific penalty includes a decrease in physical strength, a decrease in the numerical value of an ability parameter, a decrease in physical condition, etc. For example, a penalty given when the failure rate is high can be more disadvantageous (e.g., a greater decrease in physical strength, a greater decrease in the numerical value of an ability parameter, a greater decrease in the stage of physical condition) than a penalty given when the failure rate is low.

Content of a penalty may also be decided depending on the training course. For example, a failure in speed training may result in a decrease in the value of the speed ability parameter, and a failure in power training may result in a decrease in the value of the power ability parameter. Also, for some of the training courses (e.g., wisdom), no penalty may be given even if the training fails.

Figure 14D:
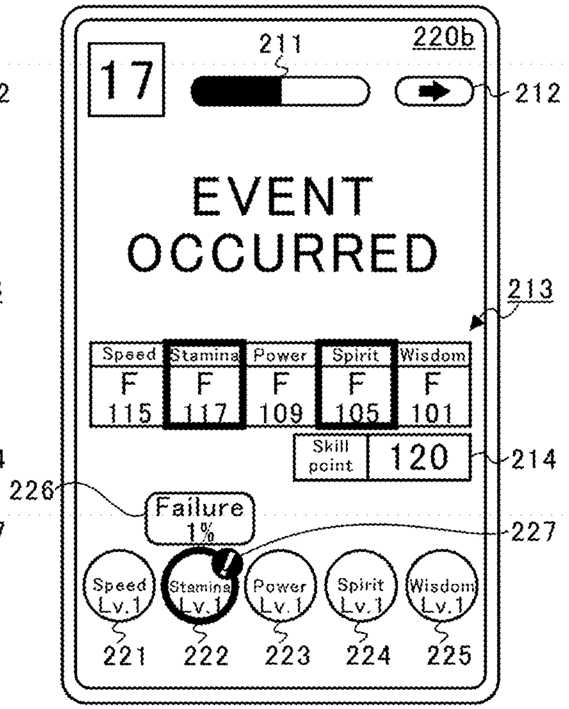
FIG. 14D is a drawing illustrating an event screen.

FIG. 14D is a drawing illustrating an event screen 220*b*. When the display of the training result report screen 220*a* ends, the event screen 220*b* may be displayed on the display 26. Various events are executed on the event screen 220*b*. Note that in some cases, a plurality of events may occur during one turn.

For example, when a hint event occurs, a hint for a skill is obtained. Once a skill is hinted, the player can earn the skill by consuming skill points. A plurality of kinds of skills are provided, and a predetermined ability may be invoked for each of the skills. Each of the skills has an invoking condition and an effect defined therefor, so that when an invoking condition is satisfied, an effect defined in advance is invoked. In some cases, a skill may be invoked during the execution of an individual race and a team race, as described below.

Events include an event for earning a skill, an event for recovering the physical strength, an event for decreasing the physical strength, an event for increasing an ability parameter, an event for decreasing an ability parameter, an event for increasing the physical condition, an event for decreasing the physical condition, etc. Although described below in detail, events include an event that is defined in advance for each turn and an event that occurs when a predetermined lottery is won. In addition, when all events that have occurred are completed, the game screen 210 related to the next turn is displayed.

Figure 15A:
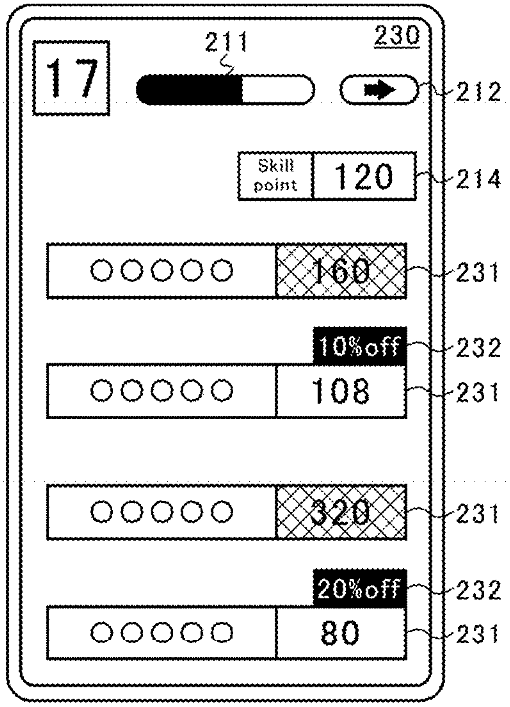
FIG. 15A is a first drawing illustrating a skill screen.
Figure 15B:
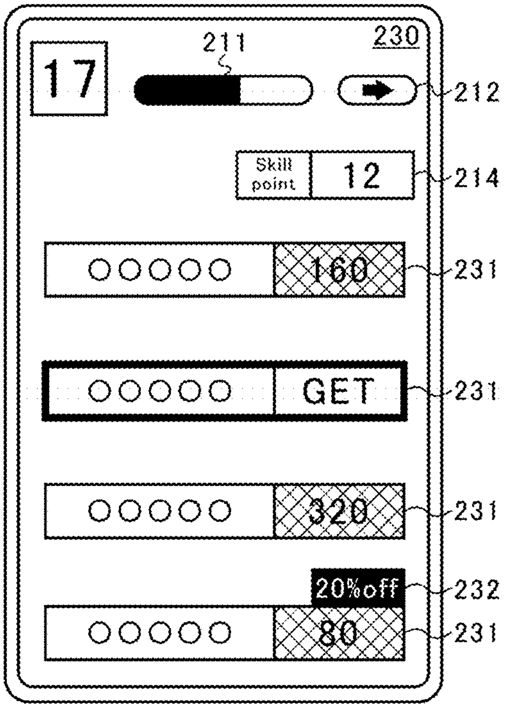
FIG. 15B is a second drawing illustrating the skill screen.

FIG. 15A is a first drawing illustrating a skill screen 230. FIG. 15B is a second drawing illustrating the skill screen 230. When the skill operation section 217 on the game screen 210 is operated, the skill screen 230 shown in FIG. 15A is displayed on the display 26.

Skill display fields 231 are displayed on the skill screen 230. An earned skill, a possessed skill that is set in advance in the main character, a possessed skill that has been possessed due to the occurrence, etc. of various kinds of events, and so on are displayed in the skill display fields 231. In addition, when a hint event occurs for a possessed skill, skill points consumed to earn this skill are discounted. Here, for a possessed skill that has been hinted, the skill points required to earn the possessed skill are displayed in a discounted manner. At this time, a discount rate display icon 232, which indicates the discount rate, is also displayed in the skill display field 231.

In addition, skills displayed on the skill screen 230 are also indicated with the respective skill invoking conditions and the respective effects when the skills are invoked.

In addition, the physical strength display section 211, the physical condition display section 212, and the skill point display section 214 are displayed in the upper section of the skill screen 230. The current turn number is also displayed in the upper section of the skill screen 230.

When a possessed skill is earned by consuming skill points on the basis of a player operation, "GET" is displayed on the earned skill to report that the skill has been earned, as shown in FIG. 15B, thereby causing the display to be updated as a result of the consumed skill points being subtracted from the skill points displayed in the skill point display section 214.

Figure 16A:
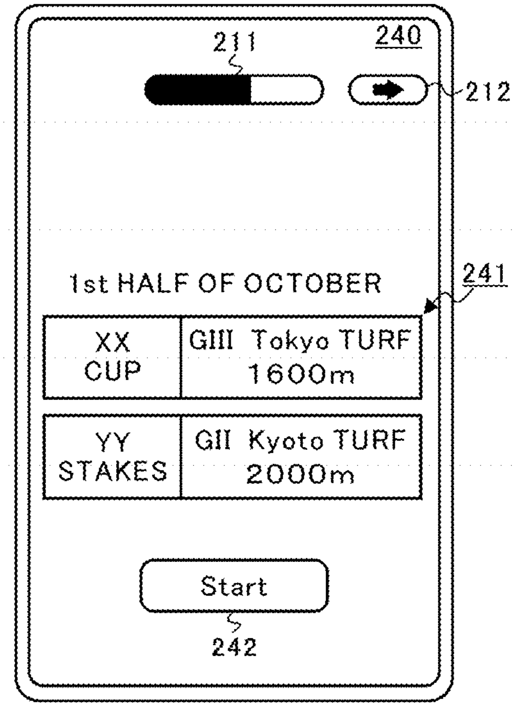
FIG. 16A is a first drawing illustrating an individual race selection screen.

FIG. 16A is a first drawing illustrating an individual race selection screen 240. When the individual race operation section 219 on the game screen 210 is operated, the individual race selection screen 240 shown in FIG. 16A is displayed. An individual race has gameplay in which the main character races against so-called non-player characters (hereinafter, referred to as NPCs).

In the upper section of the individual race selection screen 240, the physical strength display section 211 and the physical condition display section 212 are displayed. Also, an individual race selection operation section 241 for selecting the type of an individual race in which the main character will run is displayed in the center of the individual race selection screen 240. In addition, in the lower section of the individual race selection screen 240, a start operation section 242 captioned "Start" is displayed. Note that races that can be selected with the individual race selection operation section 241 on the individual race selection screen 240 are set in advance for each turn. In addition, a condition for running in each race may be set in advance, so that the main character may run in the race when the condition is satisfied.

Figure 16B:
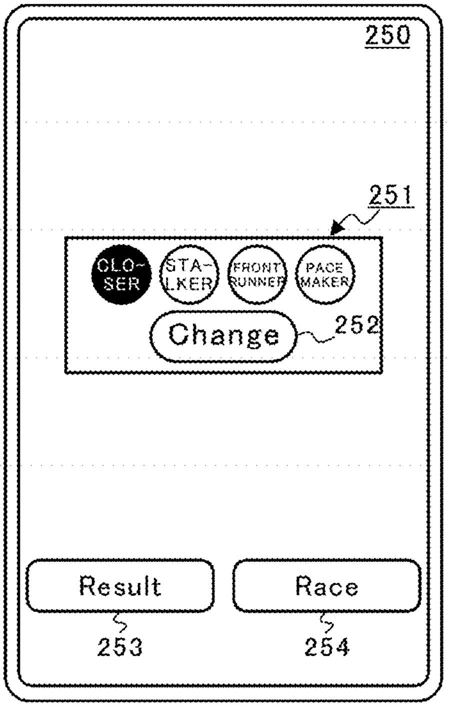
FIG. 16B is a drawing illustrating an individual race start screen.

FIG. 16B is a drawing illustrating an individual race start screen 250. When the start operation section 242 is operated while the type of individual race in which the main character will run is selected in the individual race selection operation section 241, the individual race start screen 250 shown in FIG. 16B is displayed. A strategy display section 251 is displayed in the center of the individual race start screen 250. In the strategy display section 251, not only is the currently selected strategy (closer, stalker, front runner, or pace maker) highlighted but also a change operation section 252 captioned "Change" is displayed. When the change operation section 252 is operated, a strategy change screen (not shown in the figure) is displayed on the display 26. The player can change the strategy in the individual race to any strategy via an operation on the strategy change screen.

A result operation section 253 captioned "Result" and a race operation section 254 captioned "Race" are also displayed in the lower section of the individual race start screen 250.

When the race operation section 254 is operated, a race screen (not shown in the figure) is displayed on the display 26. On the display 26, a video showing the proceeding of the race (hereinafter, also referred to as a race video) appears.

Figure 16C:
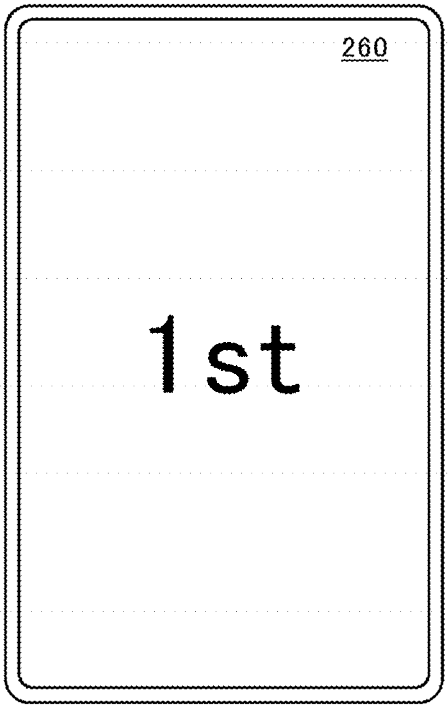
FIG. 16C is a drawing illustrating an individual race result screen.

FIG. 16C is a drawing illustrating an individual race result screen 260. When playback of the aforementioned race video is completed and when the result operation section 253 is operated, the individual race result screen 260 is displayed on the display 26. On the individual race result screen 260, the finish place in the individual race is displayed.

Figure 17A:
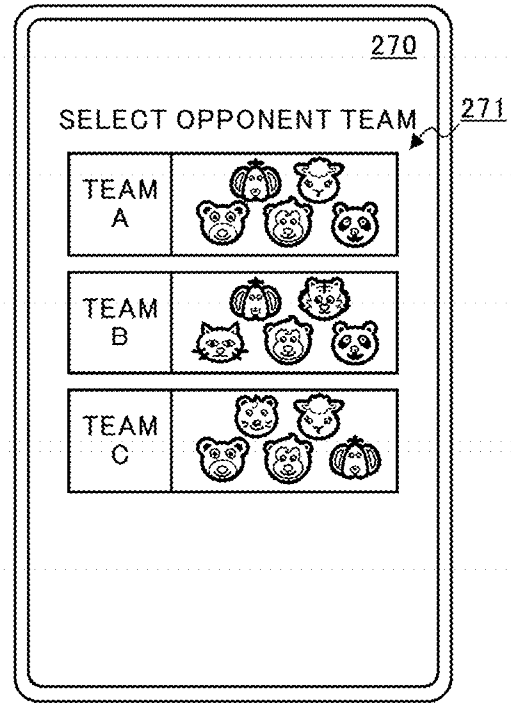
FIG. 17A is a drawing illustrating a team race selection screen.

FIG. 17A is a drawing illustrating a team race selection screen 270. As described above, in this embodiment, a team race is forcibly started when a predetermined turn is completed. When the team race is started, the team race selection screen 270 shown in FIG. 17A is displayed. An opponent team selection operation section 271 for selecting an opponent team to participate in the team race is displayed in the center of the team race selection screen 270. Note that the opponents can be NPCs. In addition, the opponent team can also be a team of another player, and is not limited to NPCs. In this case, a competition is held with the team of the other player through communication.

Note that the characters to run in the team race need only be selectable from the team members and do not necessarily need to include the main character. Also, one team member may be allowed to run in a plurality of races in the team race.

Figure 17B:
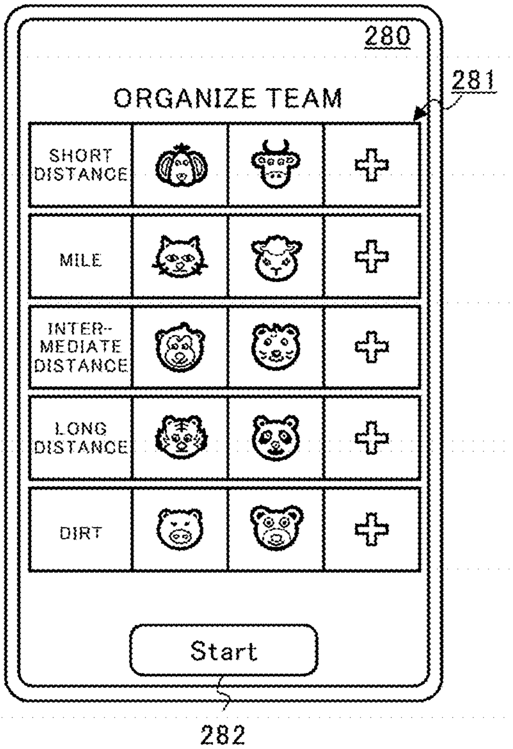
FIG. 17B is a drawing illustrating a team race organization screen.

FIG. 17B is a drawing illustrating a team organization screen 280. When the opponent team selection operation section 271 is operated, the team organization screen 280 is displayed on the display 26. A team organization operation section 281 is displayed on the team organization screen 280. By operating the team organization operation section 281, the player can organize characters in the team race by using characters registered as the team members. In this embodiment, five races are executed in the team race: "short distance", "mile", "intermediate distance", "long distance", and "dirt track". Also, the team race has gameplay in which whether the team race is totally won or lost is decided on the basis of the win or loss of each of the five races.

More specifically, the player wins overall in the team race if the number of races won by the player's team among the five races is greater than the number of races won by the opponent's team. On the other hand, the player is defeated overall in the team race if the number of races won by the player's team among the five races is smaller than the number of races won by the opponent's team. Also, if the number of races won by the player's team is equal to the number of races won by the opponent's team, a tie is declared.

Note that the player can organize up to three kinds of characters for each race from among the team members. Also, here, no two races can have the same type of character organized therein. Also, a start operation section 282 captioned "Start" is displayed in the lower section of the team organization screen 280.

Figure 17C:
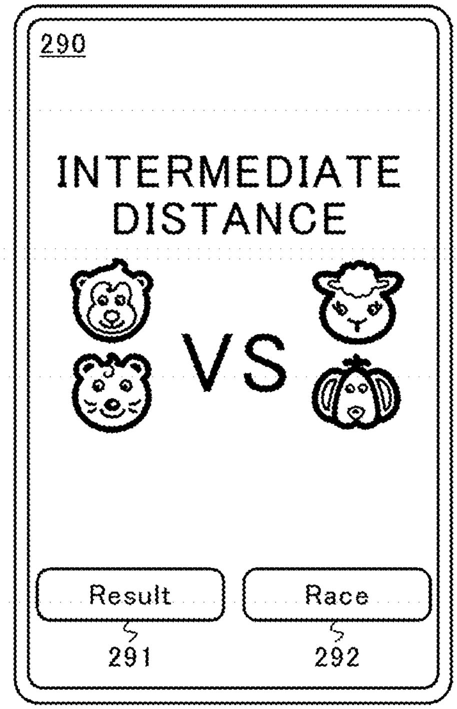
FIG. 17C is a drawing illustrating a team race start screen.

FIG. 17C is a drawing illustrating a team race start screen 290. When the start operation section 282 on the team organization screen 280 is operated, the team race start screen 290 shown in FIG. 17C is displayed. In this embodiment, five races are executed in the team race, and the order in which the five races are executed may be defined in advance or decided at random.

As shown in FIG. 17C, in the center of the team race start screen 290, the characters of the team organized by the player and the characters of the opponent's team are displayed for the race to be executed. Here, a case is shown where the player has organized two characters and two characters of the opponent's team are organized for the "intermediate distance" race.

In addition, as shown in FIG. 17C, a result operation section 291 captioned "Result" and a race operation section 292 captioned "Race" are displayed in the lower section of the team race start screen 290. When the race operation section 292 is operated, a race video (not shown in the figure) is displayed.

Figure 17D:
FIG. 17D is a drawing illustrating a team race intermediate result screen.

FIG. 17D is a drawing illustrating a team race intermediate result screen 300. When playback of the aforementioned race video is completed, and when the result operation section 291 on the team race start screen 290 is operated, the team race intermediate result screen 300 is displayed on the display 26. On the team race intermediate result screen 300, win or loss in the relevant race ("intermediate distance" race in this case) is displayed. Note that the method of deciding the win or loss of each of the five races in the team race is not particularly limited. For example, the team to which the character winning the first place belongs may be declared the winner. Alternatively, points may be granted for each finish place and the team with the most points may win.

Also, when the display of the team race intermediate result screen 300 in FIG. 17D is completed, the team race start screen 290 related to the next race (e.g., the "short distance" race) is displayed. Thereafter, in the same manner as described above, the team race start screen 290 and the team race intermediate result screen 300 are sequentially displayed until all the five types of races are completed.

Figure 18A:
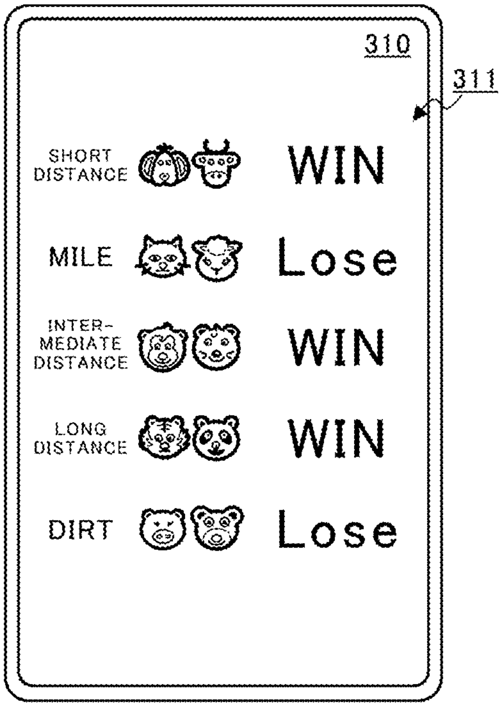
FIG. 18A is a first drawing illustrating a team race detailed result screen.

FIG. 18A is a first drawing illustrating a team race detailed result screen 310. When the team race start screen 290 and the team race intermediate result screen 300 related to all the five types of races are displayed as described above, the team race detailed result screen 310 is displayed on the display 26. In the center of the team race detailed result screen 310, a win/loss result display section 311 is displayed. In the win/loss result display section 311, the win/loss result in each of the races is reported to the player. Here, a case where there are three wins and two losses in the races is displayed, as shown in FIG. 18A.

Figure 18B:
FIG. 18B is a first drawing illustrating a team race total result screen.

FIG. 18B is a first drawing illustrating a team race total result screen 320. When display of the win/loss result display section 311 is completed, the team race total result screen 320 is displayed on the display 26. The team race total result screen 320 informs the player of the total win/loss result in the team race. As shown in FIG. 18A, if there are three wins and two losses in the races, the team race total result screen 320 will report that the team race has been won.

In addition, the team race total result screen 320 will also display the team ranking. In this embodiment, the team ranking changes on the basis of the win/loss result in the team race. For example, the team ranking increases when the team race is won.

In addition, on the team race total result screen 320 reporting winning of the team race, a next operation section 321 captioned "NEXT" is displayed. When the next operation section 321 on the team race total result screen 320 is operated, the game screen 210 related to the next turn is displayed.

Figure 18C:
FIG. 18C is a second drawing illustrating the team race detailed result screen.
Figure 18D:
FIG. 18D is a second drawing illustrating the team race total result screen.

FIG. 18C is a second drawing illustrating the team race detailed result screen 310. Here, a case where there are two wins and three losses in the races is displayed, as shown in FIG. 18C. FIG. 18D is a second drawing illustrating the team race total result screen 320. As shown in FIG. 18C, if there are two wins and three losses in the races, the team race total result screen 320 will report that the team race has been lost.

Note that if the team is defeated in the team race, the team ranking decreases. It should be noted, however, that because the nurturing main game continues regardless of whether the team race is won or lost, the next turn will start when the next operation section 321 is tapped.

Thus, a team race is executed every predetermined turns in the nurturing main game. When the player wins the team race, the player is granted a special gift, such as an increase in an ability parameter of the main character. Also, in the nurturing main game, sub-members are promoted to team members in a predetermined turn. Here, a predetermined number of sub-members are promoted to team members in the turn following the execution of a team race. In this manner, the gameplay of the nurturing game is to win team races while gradually increasing the number of team members.

Figure 19:
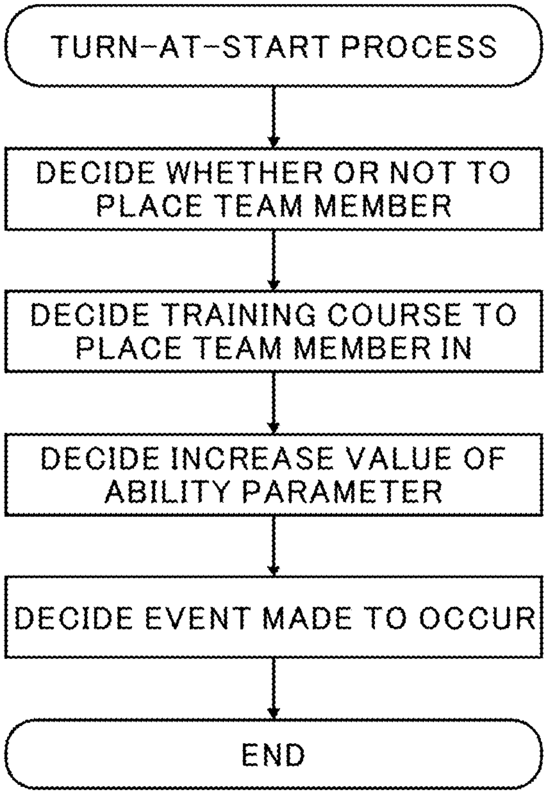
FIG. 19 is a drawing illustrating a general flow of a turn-at-start process.

FIG. 19 is a drawing illustrating the general flow of a turn-at-start process. The nurturing-stage process includes the turn-at-start process, which is executed at the start of each turn of the nurturing game. Details of the turn-at-start process are described below. Here, the general flow of the turn-at-start process will be described instead.

In the turn-at-start process, a "process for deciding whether or not to place a team member", a "process for deciding a training course in which a team member is placed", a "process for deciding an increase value of ability parameter", and a "process for deciding an event to occur" are executed, as shown in FIG. 19. These processes are described below in order.

<Process for Deciding Whether or not to Place Team Member>

FIG. 20 is a drawing illustrating a placement probability table. As shown in FIG. 20, the selection ratio of whether or not to place ("place" or "not place") each character according to the character identification information of the character is set in the placement probability table. In this embodiment, whether or not to place each of the team members is decided on the basis of the placement probability table shown in FIG. 20, with reference to the character identification information table shown in FIG. 10 or FIG. 11 above.

More specifically, in this embodiment, "place" is selected with a probability of 80% for team members registered both as a "support character" and as a "special character" in the character identification information, as shown in FIG. 20. In addition, "place" is selected with a probability of 60% for team members registered as a "special character" but not as a "support character" in the character identification information.

Also, "place" is selected with a probability of 40% for team members registered as a "support character" but not as a "special character" in the character identification information. Furthermore, "place" is selected with a probability of 10% for team members registered neither as a "support character" nor as a "special character" in the character identification information.

Thus, a team member who is registered as a support character is more likely to be placed in training than a team member who is not registered as a support character. Also, a team member who is registered as a special character is more likely to be placed in training than a team member who is not registered as a special character.

<Process for Deciding Training Course in which Team Member is Placed>

Next, for the team members who have been decided to be placed as described above, it is decided in which training course among "Speed", "Stamina", "Power", "Spirit", and "Wisdom" to place those team members.

The method for deciding a training course in which a team member is placed is not particularly limited. For example, a lottery may be drawn so that the training courses have an equal chance of winning. Alternatively, it is also acceptable to place each character in a training course that is set for the character in advance, without drawing a lottery. Alternatively, for example, a lottery may be drawn so that a character is more likely to be placed in his/her favorite training (see FIG. 9A). When a lottery is to be drawn, a lottery table in which a selection ratio for the lottery is defined may be pre-stored, or alternatively, a lottery table may be generated each time a lottery is drawn.

<Process for Deciding Increase Value of Ability Parameter>

FIG. 21A is a drawing illustrating a training level table. As shown in FIG. 21A, the training levels are set to increase as the team ranking increases. More specifically, if the team ranking is 100th or lower, the training levels related to "Speed", "Stamina", "Power", "Spirit", and "Wisdom" are set to "level 1", if the team ranking is 99th to 60th, the training levels are set to "level 2", if the team ranking is 59th to 30th, the training levels are set to "level 3", if the team ranking is 29th to 10th, the training levels are set to "level 4", and if the team ranking is 9th or higher, the training levels are set to "level 5".

Although this embodiment has been described by way of an example where the training levels increase as a result of the team ranking increasing, the present invention is not limited to this example. For example, favorite training of team members may be counted, classified by training course, and each training level may be increased according to the counted value (count value). It is assumed here that the training levels of all training courses are the same for a team ranking, but the training levels in the same team ranking may differ for each training course.

In this embodiment, when the training selected by the player is successfully executed, the values of predetermined ability parameters are increased according to the executed training course.

More specifically, in this embodiment, when "Speed" training is successfully executed, the values of the "Speed" and "Power" ability parameters are increased.

In addition, when “Stamina” training is successfully executed, the values of the “Stamina” and “Spirit” ability parameters are increased.

Furthermore, when “Power” training is successfully executed, the values of the “Stamina” and “Power” ability parameters are increased.

Also, when “Spirit” training is successfully executed, the values of the “Speed”, “Power”, and “Spirit” ability parameters are increased.

In addition, when “Wisdom” training is successfully executed, the values of the “Speed” and “Wisdom” ability parameters are increased.

In this embodiment, the value of an ability parameter that increases when training is successful is calculated by adding, to an increase-fixed value that is decided in accordance with the executed training course and the training level, a value obtained by multiplying the increase-fixed value by a bonus addition rate described below.

FIG. 21B is a drawing illustrating an increase-fixed value (speed) table. In addition, FIG. 21C is a drawing illustrating an increase-fixed value table (power). Namely, FIG. 21B shows increase-fixed values in the case where the training course is “Speed”. In addition, FIG. 21C shows increase-fixed values in the case where the training course is “Power”.

As shown in FIG. 21B and FIG. 21C, increase-fixed values decided corresponding to the executed training course and training level are stored in the increase-fixed value tables. In addition, in this embodiment, the higher the training level, the greater the increases in the ability parameters, as shown in FIG. 21B and FIG. 21C.

Although not described here, there are also increase-fixed value tables used when “Stamina”, “Spirit”, and “Wisdom” are selected as training courses.

In addition to the aforementioned increase-fixed values, bonus addition rates are decided on the basis of the characters placed for each training course and the aforementioned character identification information table shown in FIG. 10 or FIG. 11.

FIG. 21D is a drawing illustrating a bonus addition rate table. In this embodiment, the bonus addition rate is decided on the basis of the character identification information of the character decided to be placed for each training course.

More specifically, the selection ratio among the bonus addition rates of a 0% increase (none), a 10% increase, and a 20% increase is stored in the bonus addition rate table, as shown in FIG. 21D, such that the selection ratio is defined for each character according to the character identification information of the character.

If a character is registered both as a “support character” and as a “special character” in the character identification information, “none” is selected with a probability of 50%, and a “20% increase” is selected with a probability of 50%.

In addition, if a character is registered only as a “support character” in the character identification information, “none” is selected with a probability of 50%, and a “10% increase” is selected with a probability of 50%.

Also, if a character is registered only as a “special character” in the character identification information, “none” is selected with a probability of 50%, and a “10% increase” is selected with a probability of 50%.

Furthermore, if a character is registered neither as a “support character” nor as a “special character” in the character identification information, “none” is selected with a probability of 80%, and a “10% increase” is selected with a probability of 20%.

Also, a bonus addition value is derived by multiplying the increase-fixed value decided on the basis of the increase-fixed value table by the bonus addition rate. The value obtained by adding the bonus addition value to the increase-fixed value is decided to be the amount of increase in the value of the corresponding ability parameter in the case of successful training. Note that for training in which a plurality of characters are placed, the bonus addition values for the respective placed characters are added to the increase-fixed value. In this way, the amounts of increase in ability parameters of the main character in the case of successful training are decided for all training types.

<Process for Deciding Event to Occur>

FIG. 22 is a drawing illustrating event types and event classifications. During the nurturing main game, a process for deciding whether or not to cause an event to occur is executed in each turn. Events are roughly classified into four types: a scenario event, the aforementioned dedicated event 162*a* provided for each of the main characters, a support event, and a team member event. Note that a scenario event, a dedicated event 162*a*, a support event, and a team member event that can occur during the nurturing main game are defined in advance for each scenario.

A scenario event is an event set for each scenario of the nurturing main game. In this embodiment, a plurality of scenarios are provided, and the player can select a scenario. A scenario event occurs for each scenario selected by the player. In other words, scenario events that occur in the nurturing main game are decided on the basis of the scenario selected by the player.

Note that scenario events may include a scenario-specific event and a scenario-common event. A scenario-specific event is an event that is tied to only one scenario. For example, a scenario-specific event tied to the first scenario will only occur if the first scenario is selected, and will not occur if any other scenario is selected.

Also, a scenario-common event is an event that commonly occurs in a plurality of scenarios. Therefore, a scenario-common event occurs both when the first scenario is selected and when the second scenario is selected.

Here, it is assumed that there are two types of scenario events: a scenario-specific event and a scenario-common event. It should be noted, however, that only one of the scenario-specific event and the scenario-common event may be provided.

A dedicated event 162*a* is an event that is set in advance for each character, as described above. In the nurturing main game, there occurs a dedicated event 162*a* of the character that has been registered by the player as the main character in the setting game, i.e., in the preparatory-stage process.

A support event is an event that is set in advance for each support card, as described above. In the nurturing main game, there occur support events that are tied to the support cards registered by the player in the setting game. In addition to the support events tied to the registered support cards, support events tied to, for example, team members may also occur. It should be noted, however, that the probability that a support event tied to a support card registered by the player in the setting game is decided is higher than the probability that other support events are decided.

A team member event is an event that occurs primarily when training in which a team member is placed, i.e., joint training, is executed. In addition, a team member event may also occur when a predetermined condition is satisfied, regardless of training.

Thus, whether or not a scenario event occurs, etc., is decided on the basis of the scenario. In addition, the occurrence, etc. of a dedicated event 162*a*, a support event, and a team member event is decided on the basis of the main character, support cards, and team members, respectively. That is, an event type is categorized according to information that is referenced when it is decided whether or not an event is made to occur, etc.

In contrast, in this embodiment, each event is categorized into one of the five event classifications according to the content brought about by the occurrence of the event. Here, each event is classified into one of the following event classifications: hint event, ability event, aptitude event, story event, and discipline event.

As described above, a hint event is an event that enables a skill to be possessed or earned. In addition, an ability event is an event that increases or decreases ability parameters of the main character. An aptitude event is an event that increases or decreases aptitude parameters of the main character. A story event is an event that displays the story related to a character appearing in the nurturing game. In addition to displaying a story, some story events change ability parameters or aptitude parameters. A discipline event is an event that increases ability parameters of a team member.

Here, scenario events include a hint event, an ability event, an aptitude event, and a story event. In addition, dedicated events 162*a* and support events include a hint event and an ability event. Also, team member events include a story event and a discipline event. Note that the relationship between event types and event classifications shown in FIG. 22 is merely an example. Therefore, for example, a story event and a discipline event may be included in dedicated events 162*a*.

FIG. 23 is a drawing illustrating the relationship between event types and turn numbers. FIG. 23 shows an example of a case in which a predetermined character is registered as the main character in executing the nurturing main game. The occurrence, etc. of an event is decided on the basis of an event decision table provided for each scenario.

Here, the event decision table includes an event occurrence decision table and an event content decision table. In the event occurrence decision table, information indicating whether or not to cause an event to occur and information indicating the probability, etc. of causing an event to occur are tied to each turn. It is assumed here that information indicating whether or not to cause an event to occur and information indicating the probability, etc. of causing an event to occur are specified for all turns, classified by event type.

In addition, in the event content decision table, an event to be made to occur or an event that can occur are set in advance for each of the turns and for each of the event types.

At the start of a turn, first it is decided whether or not to cause an event to occur for each of the event types with reference to the event occurrence decision table. At this time, depending on the turn number and the event type, the "occurrence" of an event may always be decided. Also, depending on the turn number and the event type, it may be specified that an event is made to occur with a probability of, for example, 50%. In this case, a lottery is drawn in which the "occurrence" of an event is decided with a probability of 50%.

Also, for the event type for which "occurrence" is decided, the content of an event to be made to occur is decided with reference to the event content decision table. For example, according to the event occurrence decision table, it is set that a scenario event is always made to occur in the first turn. In addition, each event is assigned an event ID. Also, in the event content decision table, the scenario event with an event ID=0001 is tied to the first turn as an event that can occur. Therefore, when the nurturing main game is played, the scenario event with an event ID=0001 always occur in the first turn.

Similarly, according to the event decision table (event occurrence decision table and event content decision table), it is decided that scenario events with event IDs=0002, 0003, 0004, 0005, and 0006 are made to occur in turn 4, turn 5, turn 6, turn 7, and turn 10, respectively.

Here, events are roughly classified into fixed events and random events. A fixed event is an event that occurs in a fixed turn, in other words, an event that can occur in a predetermined turn and does not occur in turns other than the predetermined turn. Here, scenario events with event IDs=0001, 0002, 0003, 0004, 0005, and 0006 are all fixed events and are scenario-specific events.

In contrast, a random event is an event that occurs in the case where the occurrence of an event is decided and it is decided as an event that is made to occur. In FIG. 23, a turn captioned "lottery" indicates that whether or not an event is made to occur is decided by lottery, and if "occurrence" of an event is decided, an event selected by lottery from among the random events occurs.

In the event content decision table, the event IDs from which an event ID is selected by lottery are set for turns in which an event selected by lottery is made to occur. For example, it is assumed that random events with event IDs=0010, 0011, and 0012 are provided as scenario events. Also, it is assumed that a scenario event with an event ID=0010 is tied to turn 12 in the event content decision table.

In this case, at the start of turn 12, a lottery is drawn to decide whether or not to cause a scenario event to occur. Then, if the lottery is won, the scenario event with an event ID=0010 occurs, and if the lottery is lost, no scenario events occur.

Also, it is assumed, for example, that the scenario events with event IDs=0010, 0011, and 0012 are tied to turn 15 in the event content decision table. Then, if a lottery deciding whether or not to cause an event to occur is won, a scenario event that is made to occur is decided by lottery from among the events with event IDs=0010, 0011, and 0012, whereby the scenario event selected by lottery occurs.

This embodiment has been described by way of an example where a fixed event and a random event are provided exclusively to each other. It should be noted, however, that when a scenario event to be made to occur is decided by lottery, fixed events, in addition to or instead of random events, may be set as events from which an event is selected by lottery.

In this embodiment, turns 4 through 7 are set as branch turns. A branch turn means a turn in which the content of an event is changed when a predetermined condition is satisfied. Here, a predetermined number of special characters being included in the team members, in other words, a predetermined number of special characters being included in the main character or support characters is set as the predetermined condition.

More specifically, it is determined in turn 4 whether or not four special characters as a predetermined number of special characters are included in the team members. Also, if four special characters are included in the team members, a scenario event is replaced with a team member event. Team member events include a special character event provided for each special character. Here, if the team members include a special character, a scenario event is replaced with a special character event in the branch turn.

Similarly, it is determined in turns 5, 6, and 7 whether or not the team members include predetermined numbers of special characters, where the predetermined numbers are three, two, and one, respectively. Also, if the respective predetermined numbers of special characters are included in the team members, scenario events are replaced with special character events.

More specifically, the scenario events with event IDs=0002, 0003, 0004, and 0005 are story events. In these story events, a story is played back in which team members think of a team name but ultimately the story ends without a team name being proposed. Therefore, if no special characters are included in the team members, no team names are proposed for four consecutive turns.

In contrast, if a special character is included in the team members, the same number of scenario events as the number of special characters are replaced with special character events. A special character event is a story event. In a special character event, a story is played back in which a team name is proposed by the special character. There are four special characters, and different team names are proposed by different special characters. Therefore, if special characters are included in the team members, the same number of team names as the number of special characters are proposed in turns 4 to 7.

Also, the scenario event with an event ID=0006 that occurs in turn 10 is a story event. In this story event, a story is played back in which the player is asked to select a team name. Here, a total of five different kinds of team names are provided, including four team names proposed by the respective four special characters, plus one default team name that is set in advance.

If no special characters are included in the team members and none of the team names are proposed in turns 4 through 7, the team name that can be selected by the player in turn 10 is the default team name only. In this case, the player needs to select the default team name. Also, for example, if two team names are proposed in turns 4 through 7, the player can select one of the total of three kinds of team names including the two proposed team names and one default team name.

The team name selected by the player in turn 10 is registered as an official team name and will be used in various scenes thereafter until the end of the nurturing main game. Note that at a predetermined time before the end of the nurturing main game, the player may be granted a special gift corresponding to the registered team name. Special gifts granted to the player may include, for example, earning of a skill corresponding to the registered team name, increases in an ability parameter and an aptitude parameter, and earning of in-game currencies, etc.

Thus, the scenario events with event IDs=0002, 0003, 0004, 0005, and 0006, and the special character events that are substituted in turns 4 through 7 are all scenario-specific events. Scenario IDs are managed so as to be tied to event IDs that can occur. Therefore, the scenario events and the special character events that can occur in turns 4 through 7 and in turn 10 are tied to only one scenario ID.

Also, according to the event decision table, dedicated events 162*a* with event IDs=1001 and 1002 occur in turns 2 and 8, respectively. In addition, according to the event decision table, whether or not to cause a dedicated event 162*a* to occur and a dedicated event 162*a* to be made to occur are decided by lottery in turns 3 through 7, 9, 11, and 12.

Here, dedicated events 162*a* differ for each character. Also, the relationship between the turn number and the dedicated events 162*a* that will occur is set for each character. Therefore, the turn in which a dedicated event 162*a* occurs and the dedicated event 162*a* that occurs in each turn are different depending on the character registered as the main character.

In addition, the event decision table is set to decide, by lottery, whether or not to cause a support event to occur, as well as the content of a support event that is made to occur, in a predetermined turn, as shown in FIG. 23. Also for support events, the event IDs that can be won by lottery may differ from turn to turn, or may be the same for all turns.

In the lottery for deciding whether or not to cause a support event to occur, the probability that "occurrence" is decided is not affected by the registered support cards. In other words, the probability that the occurrence of a support event is decided in each turn is the same regardless of which support cards are registered. On the other hand, when the "occurrence" of a support event is decided, the content of the support event to occur is decided, and the probability that the content of the support event is decided varies depending on the registered support cards.

More specifically, when "occurrence" of a support event is decided, the event IDs of the support events that can occur in the turn are extracted on the basis of the event content decision table. Then, a lottery table is generated on the basis of the extracted event IDs, and one event ID is decided on the basis of the generated lottery table.

Note that the extracted event IDs may include an event ID of a support event tied to a registered support card and an event ID of a support event not tied to a registered support card. In this case, in the lottery table, the probability of winning the event ID of a support event tied to a registered support card is set higher than the probability of winning the event ID of a support event not tied to a registered support card. This makes a support event tied to a registered support card have a higher probability of occurrence than the other support events.

Thus, in each turn, the probability of the occurrence of a support event is not affected by the registered support cards, but the content of a support event that is made to occur is affected by the registered support cards.

It should be noted, however, that the probability that a support event is made to occur or the content (kind) of a support event that is made to occur may vary depending on the registered support cards. In other words, the number of events that will occur or the probability that an event occurs during the nurturing main game may vary depending on the registered support cards.

In addition, in each turn, the occurrence, etc. of a team member event is decided by lottery. Team member events decided by lottery are limited to discipline events. A discipline event will be described below in detail.

Figure 24A:
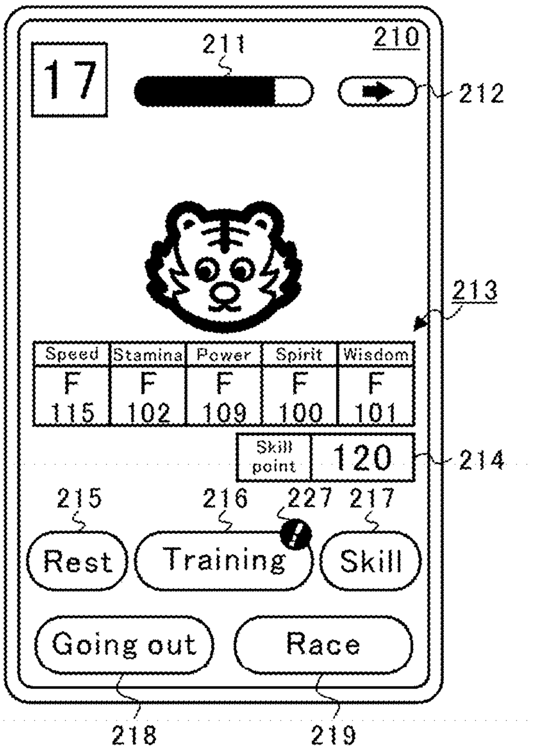
FIG. 24A is a third drawing illustrating the game screen.

FIG. 24A is a third drawing illustrating the game screen 210. FIG. 24A shows a case where a discipline event occurs in the turn. In this case, the event report indicator 227 is displayed in the training operation section 216 on the game screen 210, as shown in FIG. 24A.

Figure 24B:
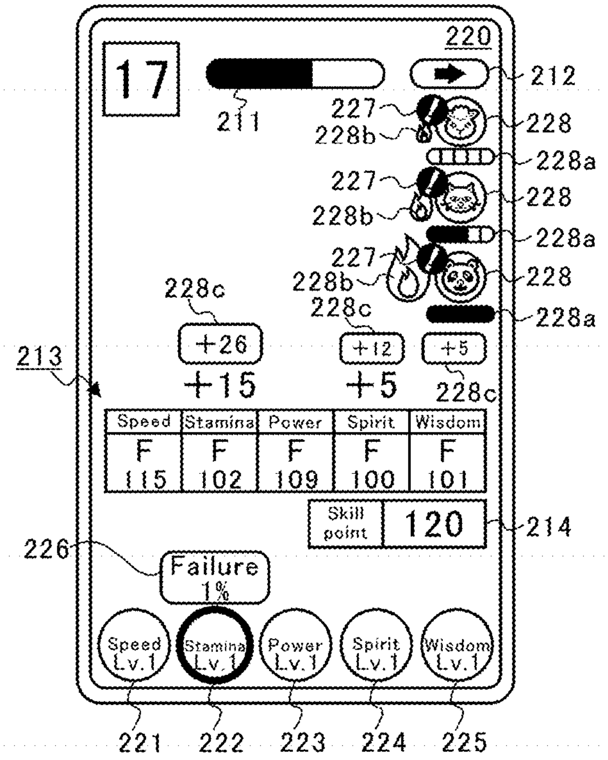
FIG. 24B is a third drawing illustrating the training screen.

FIG. 24B is a third drawing illustrating the training screen 220. When the training operation section 216 on the game screen 210 is operated, the training screen 220 is displayed on the display 26. When a discipline event occurs corresponding to the character displayed on a placement character icon 228 on the training screen 220, an event report indicator 227 is displayed on the placement character icon 228 of the corresponding character.

In addition, as shown in FIG. 24B, a bond gauge 228*a* and a special icon 228*b* are displayed for each of the placement character icons 228 of the characters placed in the training. The bond gauge 228*a* indicates a parameter (hereinafter, referred to as a bond parameter) that increases according to the number of times joint training with the character of the corresponding team member is executed. This bond parameter is initially set to 0 and increases to a maximum of 100. The bond gauge 228*a* visually indicates the value of the bond parameter.

In addition, the special icon 228*b* indicates the number of times a discipline event related to the character of the corresponding team member is executed. Although described below in detail, the special icon 228*b* is displayed in a manner corresponding to the number of times a discipline event is executed on the character of the placement character icon 228 indicated with the special icon 228*b*.

FIG. 25A is a drawing illustrating a discipline event execution decision table. When it is decided that a team member is placed in each training course, whether or not to execute a discipline event is decided by lottery for each of the team members placed in the training course on the basis of the discipline event execution decision table shown in FIG. 25A. Hereinafter, a team member on whom a decision has been made to execute a discipline event is also referred to as a team member serving as a discipline target.

More specifically, as shown in FIG. 25A, a selection probability of whether or not to execute a discipline event is set on the basis of the value of the bond parameter of the team member serving as a discipline target. Here, the selection probability is set such that the larger the value of the bond parameter, the higher the probability that execution of a discipline event is selected. Note that same number of discipline events as the number of team members selected in the lottery can occur. It should be noted, however, that a limit may be set on the number of team members serving as a discipline target who can appear at the same time per training course.

FIG. 25B is a drawing illustrating a special icon decision table. Discipline events include a "success" execution pattern and a "great success" execution pattern. If the fifth discipline event is executed for each team member serving as a discipline target, the discipline event is always executed in the "great success" execution pattern. On the other hand, if a discipline event other than the fifth discipline event is executed for each team member serving as a discipline target, the discipline event is always executed in the "success" execution pattern. Namely, a discipline event can be executed only once in the "great success" execution pattern for one team member serving as a discipline target. Note that the event report indicator 227 may be displayed in a different manner depending on the content of the discipline event to be executed ("success" execution pattern or "great success" execution pattern) and the number of team members on whom a decision has been made to execute a discipline event.

As shown in FIG. 25B, if the number of times a discipline event related to each team member serving as a discipline target has been executed is 0 to 4, i.e., if no discipline events have been executed in the "great success" execution pattern, then the larger the number of times a discipline event has been executed, the larger the display size of the special icon 228*b*.

Note that whether a discipline event is executed in the "great success" pattern or the "success" pattern may be decided by lottery. In this case, the lottery probability may be set so that the larger the number of times a discipline event related to a team member serving as a discipline target has been executed, the higher the probability that the "great success" execution pattern is selected. In this case, the larger the size of the special icon 228*b*, the more likely the "great success" execution pattern is selected, and thus the special icon 228*b* suggests how likely the "great success" execution pattern will be selected.

In addition, after a discipline event has been executed in the "great success" execution pattern, i.e., once the number of times a discipline event related to a team member serving as a discipline target has been executed is five or more, the special icon 228*b* is displayed in a larger size than when the number of times a discipline event related to the team member serving as a discipline target has been executed is 0 to 4. Also, as shown in FIG. 25B, a suggestion indicator a appears to suggest that a discipline event has already been executed in the "great success" execution pattern.

Also, if a discipline event occurs and the discipline event is executed in the "success" execution pattern, ability parameters of the team member serving as a discipline target and ability parameters of the main character are increased within a predetermined range. In addition, if a discipline event is executed in the "great success" execution pattern, ability parameters of the team member serving as a discipline target and ability parameters of the main character are increased beyond the aforementioned predetermined range.

In addition, as shown in FIG. 24B, when a decision is made to execute a discipline event, bonus icons 228*c* are displayed in the status display section 213 on the training screen 220, indicating the values by which ability parameters of the main character are increased with the discipline event.

FIG. 25C is a drawing illustrating a bonus icon decision table. The bonus icon 228*c* is displayed in different sizes depending on the values by which ability parameters of the main character are increased as a result of the discipline event. Here, the bonus icon 228*c* is displayed in a larger size when the values by which ability parameters of the main character are increased as a result of the discipline event are 20 to 39 than when the values are 0 to 19. In addition, the bonus icon 228*c* is displayed in a larger size when the values by which ability parameters of the main character are increased as a result of the discipline event are 40 or more than when the values are 20 to 39.

FIG. 26A is a drawing illustrating a bonus fixed value (main character) table. When the aforementioned discipline event is executed, the values (bonus fixed values) by which ability parameters of the main character are increased as a result of the discipline event are decided according to the number of team members on whom a decision has been made to execute the discipline event. Here, as shown in FIG. 26A, the greater the number of team members on whom a decision has been made to execute a discipline event, the greater the values (bonus fixed values) by which ability parameters of the main character are increased as a result of the discipline event.

FIG. 26B is a drawing illustrating a bonus addition value (main character) table. When a discipline event is executed in the "great success" execution pattern, the values (bonus addition values) by which ability parameters of the main character are increased as a result of the discipline event executed in the "great success" execution pattern are decided, in addition to the aforementioned bonus fixed values. Here, as shown in FIG. 26B, the values (bonus addition values) by which ability parameters of the main character are increased are set according to the favorite training of the team member on whom the discipline event is executed in the "great success" execution pattern. Namely, the values by which ability parameters of the main character are increased as a result of the discipline event are the sum of the aforementioned bonus fixed values and the bonus addition values.

FIG. 27A is a drawing illustrating a fixed increase value (discipline target) table. When the aforementioned discipline event is executed, the values (fixed increase values) by which ability parameters of the team member serving as a discipline target are increased as a result of the discipline event are decided. Here, as shown in FIG. 27A, the ranges of values (fixed increase values) by which ability parameters of the team member serving as a discipline target are increased are set according to the type of training that has been executed. Here, a value within each of the ranges set in FIG. 27A (fixed increase value) is decided by lottery.

FIG. 27B is a drawing illustrating a bonus increase value (discipline target) table. When a discipline event is executed in the "great success" execution pattern, the values (bonus increase values) by which ability parameters of the team member serving as a discipline target are increased as a result of the discipline event are decided, in addition to the aforementioned fixed increase values. Here, as shown in FIG. 27B, the values (bonus increase values) by which ability parameters of the team member serving as a discipline target are increased are set according to the favorite training of the team member serving as a discipline target on whom the discipline event is executed in the "great success" execution pattern.

When a discipline event is executed in the "great success" execution pattern, an increase event may also be executed such that ability parameters of the team member serving as a discipline target and ability parameters of the main character are additionally increased according to the number of discipline events simultaneously executed in the "great success" execution pattern. For example, the greater the number of discipline events simultaneously executed in the "great success" execution pattern, the greater the values by which ability parameters of the team member serving as a discipline target and ability parameters of the main character are additionally increased.

As described above, when a discipline event occurs, ability parameters of the main character and the team member serving as a discipline target are increased. Note that if the main character or the team member serving as a discipline target is a special character, the fixed increase values and the bonus increase values may be multiplied by a predetermined addition rate. That is, if the main character or the team member serving as a discipline target is a special character, ability parameters are increased more than if the main character or the team member is not a special character.

As described above, in the nurturing main game, the player can increase the number of team members as the turn proceeds. In addition, the player can also increase the ability parameters of the main character and team members as the turn proceeds. Ability parameters are increased by successful training or by the occurrence of various events. As described above, in training, if a special character is placed in a training course, bonus addition values are added.

Although a detailed explanation is omitted, if the main character or a support character is a special character, predetermined bonus addition values are added when an ability event occurs. Therefore, the player can proceed with the nurturing main game advantageously by registering a special character as the main character or a support character.

Also, if a special character is included in the team members, a special character event occurs in a branch turn. Therefore, by registering a special character as the main character or a support character, a wider range of options are available to the player in the game, enhancing fun of the game.

In the aforementioned nurturing main game, the nurturing game ends when all turns are completed. Also, if the player fails to achieve a goal set for each character during the nurturing main game, the game will end at that point.

Here, when the nurturing game ends, the main character nurtured in the nurturing game is stored as a nurtured character. More precisely, information concerning the nurtured character who has been nurtured in the nurturing game (hereinafter, referred to as "nurtured character information") is stored so as to be tied to the player ID. Note that the nurtured character information is stored in both the player terminal 1 and the server 1000. Nurtured character information stored so as to be tied to the player ID includes ability parameters, aptitude parameters, earned skills, inheritance information, etc.

In addition, when the nurturing game ends, an evaluation score of the nurtured character that has been nurtured is calculated. Here, the evaluation score is calculated on the basis of the ability parameters, aptitude parameters, earned skills, individual race records, team race records, etc. as of the end of the nurturing game. Note that the method of calculating the evaluation score, in other words, a calculation formula for obtaining the evaluation score, is prepared in advance, and the evaluation score is calculated on the basis of the predetermined calculation formula. The method and calculation formula for calculating the evaluation score are not particularly limited. For example, an evaluation score may be calculated on the basis of only parameters that affect the result of a race in a team competition game or another game when the nurtured character runs in the race, such as ability parameters, aptitude parameters, earned skills, etc. as of the end of the nurturing game.

In addition, a nurturing rank is set for the nurtured character on the basis of the evaluation score. The nurturing rank is an indicator of the strength of the nurtured character, and each nurturing rank is tied to a range of evaluation scores. For example, a nurtured character with an evaluation score between 13000 and 14499 is assigned an "A+" nurturing rank, and a nurtured character with an evaluation score between 14500 and 15499 is assigned an "S" nurturing rank. In this way, it is easier to understand the general strength of a nurtured character as a result of a nurturing rank being assigned on the basis of the evaluation score. Note that the evaluation score and the nurturing rank are also included in the nurtured character information.

Figure 28A:
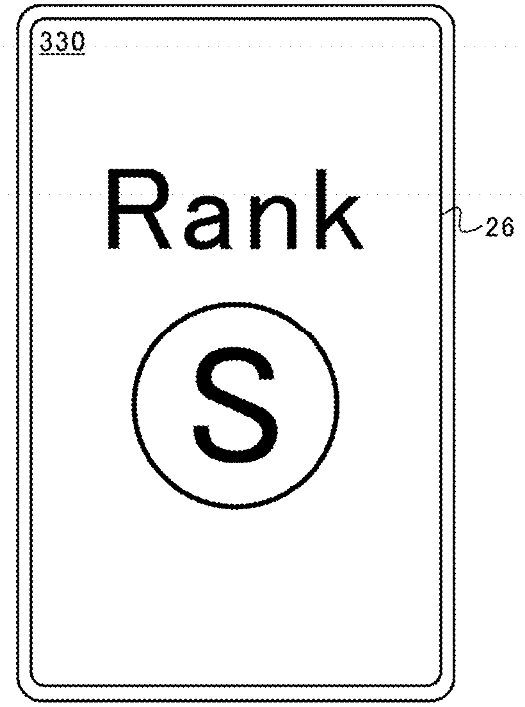
FIG. 28A is a first drawing illustrating a nurturing completion screen.
Figure 28B:
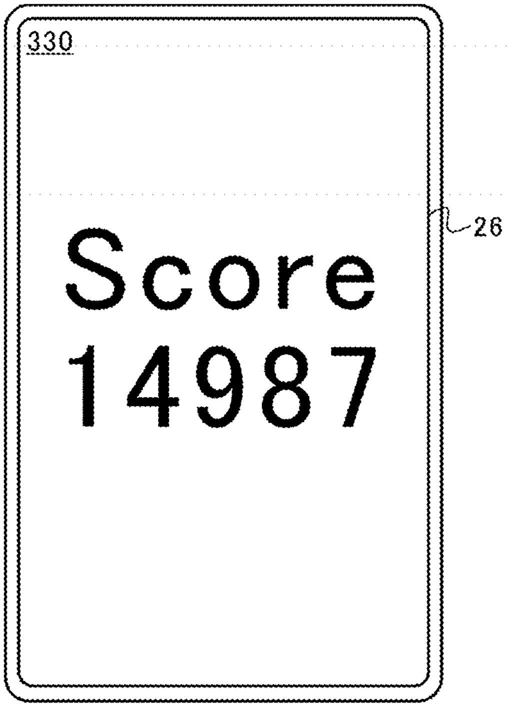
FIG. 28B is a second drawing illustrating the nurturing completion screen.
Figure 28C:
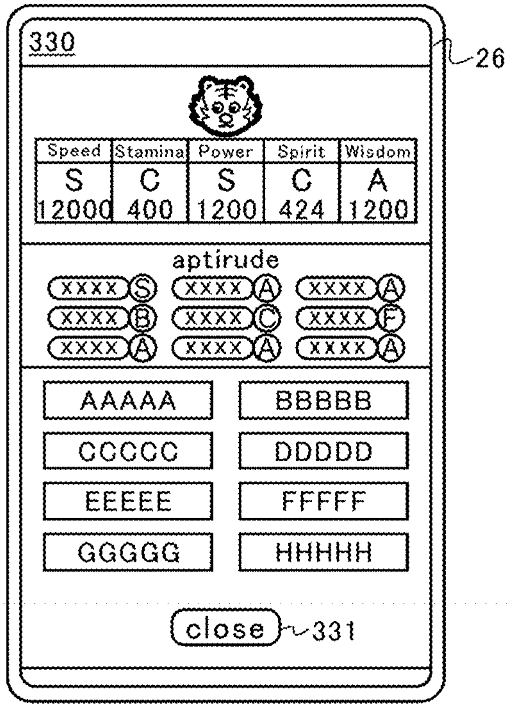
FIG. 28C is a third drawing illustrating the nurturing completion screen.

FIG. 28A is a first drawing illustrating a nurturing completion screen 330. FIG. 28B is a second drawing illustrating the nurturing completion screen 330. FIG. 28C is a third drawing illustrating the nurturing completion screen 330. When the nurturing game is completed, the nurturing completion screen 330 is displayed on the display 26, as shown in FIG. 28A. On the nurturing completion screen 330, the nurturing rank of the nurtured character who has been nurtured is first displayed, followed by the display of the evaluation score as shown in FIG. 28B. In addition, a predetermined amount of time after the display of the evaluation score, the ability parameters, aptitude parameters, and earned skills of the nurtured character are displayed on the nurturing completion screen 330, as shown in FIG. 28C. At this time, a close operation section 331 is provided on the nurturing completion screen 330. When the close operation section 331 is tapped, the nurturing completion screen 330 is hidden, and the home screen 100 is displayed on the display 26.

Here, in this embodiment, a special event is held over a predetermined period of time. The special event is intended for the aforementioned nurturing game. While the special event is being held, the player can select an event mode and a normal mode to play the aforementioned nurturing game. When the normal mode is selected, the nurturing game is executed as described above. On the other hand, when the event mode is selected, the content of the nurturing game is partially changed from the normal mode. It should be noted, however, that the basic content of the nurturing game, especially the nurturing main game, does not change between the normal mode and the event mode. A special event is described in detail below.

FIG. 29A is a drawing illustrating the overview of a special event. FIG. 29B is a drawing illustrating the correspondence relationship between test points and grades. In a special event, seven test subjects assigned respective test numbers from No. 1 to No. 7 are provided. The player can play the nurturing game after selecting any one of the seven test subjects. When the nurturing game is completed, an evaluation score is calculated in the same way as in the normal mode. The method of calculating an evaluation score is the same in both the normal mode and the event mode. It should be noted, however, that the method of calculating an evaluation score may differ between the normal mode and the event mode.

In addition, when a nurturing game is played with the event mode selected, test points are calculated separately from an evaluation score. These test points are calculated by adding bonus points set for each test subject to the calculated evaluation score. Bonus points are calculated according to bonus granting conditions. Bonus granting conditions are set for each test subject and include a bonus granting condition common to all test subjects (hereinafter, referred to as a "common bonus granting condition") and bonus granting conditions that differ for each test subject (individual bonus granting conditions).

The common bonus granting condition includes, for example, running in a particular individual race in the nurturing game or winning a predetermined place in a particular individual race. Also, for example, as the common bonus granting condition, bonus points are granted according to the number of times a discipline event is executed in the "great success" execution pattern.

In contrast, as an individual bonus granting condition, for example, bonus points are granted according to the value of a predetermined ability parameter. Also, for example, as an individual bonus granting condition, bonus points are granted if an earned skill that is set in advance is possessed.

Here, as shown in FIG. 29A, a test aptitude is set for each test subject. In this embodiment, a test aptitude indicates a race category suitable for earning higher test points. Namely, an individual bonus granting condition corresponding to the test aptitude (i.e., race category) is set for each test subject. Here, a short distance race, a mile race, an intermediate distance race, a long distance race, and a dirt race are set as test aptitudes for tests with test numbers from No. 1 to No. 5.

For example, in the test subject in which the test aptitude is a short distance race, bonus points are granted according to the value of the "Speed" parameter among the ability parameters. On the other hand, in the test subject in which the test aptitude is a long distance race, bonus points are granted according to the value of the "Stamina" parameter among the ability parameters.

Also, for example, in the test subject in which the test aptitude is a short distance race, bonus points are granted when an earned skill that mainly increases speed is possessed. On the other hand, in the test subject in which the test aptitude is a long distance race, bonus points are granted when an earned skill that increases stamina is possessed.

Thus, a test aptitude is set for each test subject, and an individual bonus granting condition corresponding to the test aptitude is set. Therefore, for example, when the test subject with test number No. 1 is selected, the more suitable for a short distance race the nurtured character is, the higher the test points will be, and when the test subject with test number No. 4 is selected, the more suitable for a long distance race the nurtured character is, the higher the test points will be.

That is, the test subjects with test numbers from No. 1 to No. 5 are set to have test themes for nurturing nurtured characters suitable for a short distance race, a mile race, an intermediate distance race, a long distance race, and a dirt race, respectively. Note that the test subjects with test numbers No. 6 and No. 7 are set to have an "extra" test aptitude and a "free" test aptitude, respectively. In these test subjects, individual bonus granting conditions are set without being biased toward a particular distance aptitude or a racetrack aptitude. Note that the method of calculating test points, such as the bonus granting conditions, is merely an example and can be redesigned as necessary.

Also, when the nurturing game is completed, a passing/failure determination is made for the tests. Each test subject has a passing score set therefor, and the player passes the test subject when the earned test points are equal to or greater than the passing score. In addition, when the player passes a test, the player is assigned a grade according to the earned test points. Here, there are three categories: excellent, good, and fair, and if the player passes a test, one of these three categories is assigned to the nurtured character as a grade.

Here, as shown in FIG. 29B, not only is a passing/failure determination is made for each test but also a grade assigned to the player is decided on the basis of the test points earned in the test. For example, in the test subject with test number No. 1, it is determined that the test is passed if the test points are 3000 or more. That is, the passing score for the test subject with test number No. 1 is set as 3000 points. In addition, in the test subject with test number No. 1, a grade of "fair" is assigned when the test points are 3000 (inclusive) to 4000 (exclusive), a grade of "good" is assigned when the test points are 4000 (inclusive) to 5000 (exclusive), and a grade of "excellent" is assigned when the test points are 5000 or more. As is obvious from FIG. 29B, the passing scores and the ranges of test points corresponding to each grade are different for each test subject.

In addition, in this embodiment, at the beginning of a special event, the player can select only the test subject with test number No. 1. That is, at the beginning of a special event, the player cannot select the test subjects with test numbers from No. 2 to No. 7. Release conditions are set for the respective test subjects with test numbers from No. 2 to No. 7, and the player can select test subjects that have satisfied the respective release conditions.

Here, as a release condition for each of the test subjects with test number=n (n is an integer from 2 to 7), earning a grade of "fair" or higher in the test subject with test number=n−1 is set. Therefore, in the special event, the player needs to pass the test subjects sequentially, starting with the test subject with test number No. 1 toward the test subject with test number No. 7. In this case, the later the test subject in the release order, the higher the passing score, thus making it gradually difficult to pass the test as the test number increases. Therefore, one goal of the special event is to pass all test subjects.

Figure 30A:
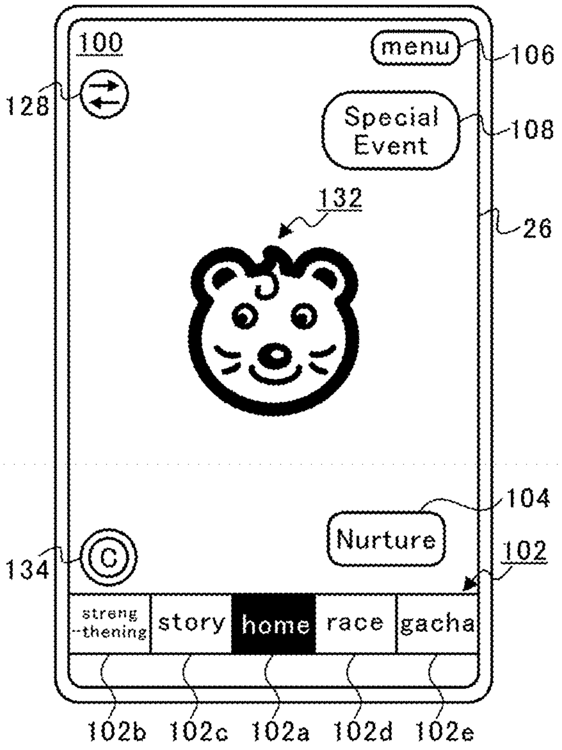
FIG. 30A is a drawing illustrating the home screen while a special event is being held.
Figure 30B:
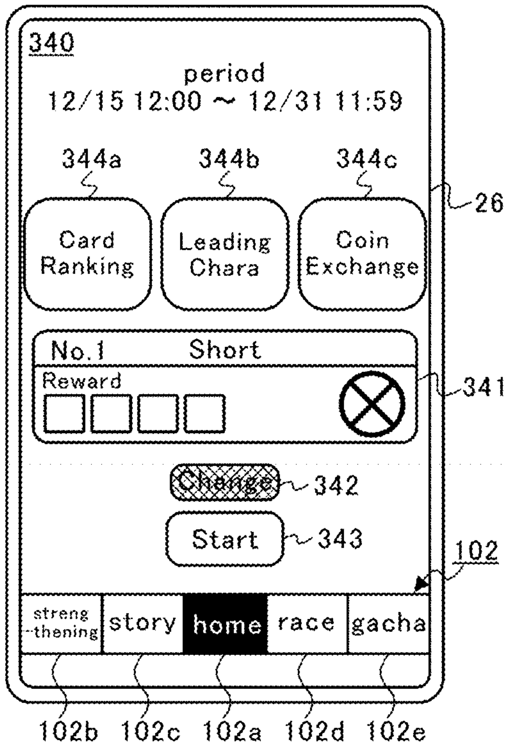
FIG. 30B is a drawing illustrating a special event top screen.

FIG. 30A is a drawing illustrating the home screen 100 while a special event is being held. FIG. 30B is a drawing illustrating a special event top screen 340. As shown in FIG. 30A, an event icon 108 is displayed on the home screen 100 while a special event is being held. When the event icon 108 is tapped, the special event top screen 340 shown in FIG. 30B is displayed.

Note that when the nurturing game operation section 104 is operated on the home screen 100, a mode selection screen (not shown in the figure) that allows selection of the normal mode or the event mode is displayed. When the event mode is selected on the mode selection screen, the special event top screen 340 is also displayed.

The time period in which the special event is held is displayed in the upper section of the special event top screen 340. The special event top screen 340 is also provided with a test-subject-in-selection display field 341, a test subject change operation section 342, a start operation section 343, a card ranking operation section 344*a*, a nurtured character ranking operation section 344*b*, and a coin exchange operation section 344*c*.

When the coin exchange operation section 344*c* is tapped on the special event top screen 340, a coin exchange screen (not shown in the figure) is displayed. When the player plays the nurturing game in the event mode while the special event is being held, coins, which are in-game currencies, are granted to the player. On the coin exchange screen, the player can earn various kinds of items by consuming possessed coins.

The currently selected test subject is identifiably displayed in the test-subject-in-selection display field 341. In addition, in the test-subject-in-selection display field 341, a reward to be granted to the player when this test is passed and the highest grade earned in the past for the test are also displayed. Note that FIG. 30B shows that the test subject with test number No. 1 is selected and also that this test subject has not yet been passed. If the currently selected test subject has been passed, a stamp indicating the highest grade earned in the past for the currently selected test subject among the “excellent”, “good”, and “fair” grades is displayed on the right side of the test-subject-in-selection display field 341. If the currently selected test subject has not been passed, a stamp marked with an X is displayed, as shown in FIG. 30B.

The test subject change operation section 342 is an operation section for changing the currently selected test subject. As described above, in the beginning while the special event is being held, the release conditions for the test subjects with test numbers from No. 2 to No. 7 are not satisfied, allowing the player to select only the test subject with test number No. 1. Therefore, in this case, as shown in FIG. 30B, the test subject change operation section 342 is grayed out, preventing acceptance of a player operation.

On the other hand, if at least one of the release conditions for the test subjects with test numbers from No. 2 to No. 7 is satisfied, the player can select any one of the two or more test subjects. Thus, in a state in which the player can select one of the two or more test subjects, the test subject change operation section 342 is enabled. When the enabled test subject change operation section 342 is tapped, a test subject list screen (not shown in the figure) is displayed. Test subjects that have satisfied the release conditions are displayed on this test subject list screen. On the test subject list screen, the player can select one of the test subjects that have satisfied the release conditions.

When a test subject is selected on the test subject list screen, the special event top screen 340 is displayed again. At this time, if the test subject is changed, the substituted test subject is stored as the currently selected test subject, and the display of the test-subject-in-selection display field 341 is switched. When the start operation section 343 is tapped, the nurturing game is started assuming that the currently selected test subject is tested.

When the card ranking operation section 344*a* is tapped on the special event top screen 340, a support card ranking screen 350 is displayed on the display 26.

Figure 30C:
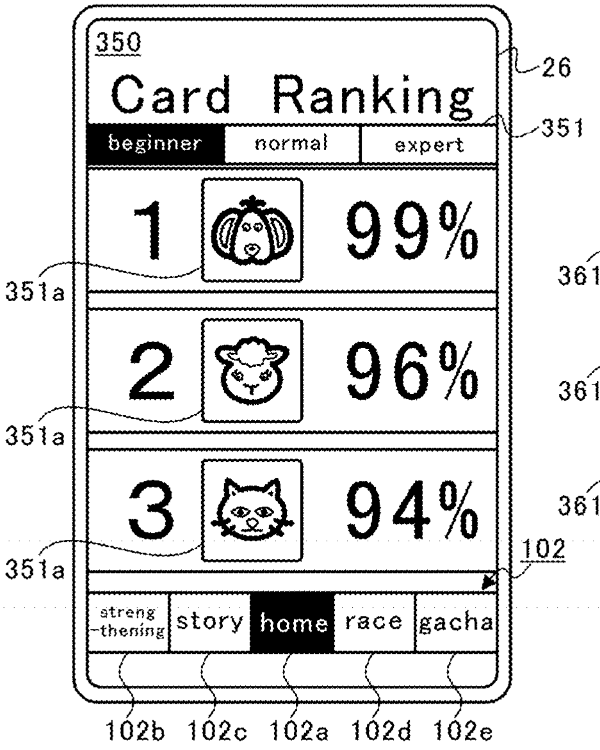
FIG. 30C is a drawing illustrating a support card ranking screen.

FIG. 30C is a drawing illustrating the support card ranking screen 350. While the special event is being held, the player is informed of the support card rankings. The support card rankings are rankings of support card usage rate for all players. During an aggregation period, when the nurturing of the nurtured character is completed, the number of times of use of each of the support cards organized in the deck is counted. Then, the usage rate is calculated for each of the support card types, with the number of times the nurturing game has been executed (alternatively, the number of nurtured characters who have been nurtured or the number of decks used is also acceptable) as the denominator and the number of times of use as the numerator.

It should be noted, however, that here, players are categorized into one of the three player categories: beginner, normal, and expert. Then, the number of times the nurturing game is executed and the number of times support cards are used are counted separately for each of the player categories. That is, the support card rankings are derived for each of the player categories. In this case, since three player categories are provided, three support card rankings are derived.

Note that a player is categorized into one of the player categories on the basis of the highest of the nurturing ranks of the nurtured characters who have been nurtured by the player in the past. In other words, a player is categorized into one of the player categories on the basis of his/her highest of the nurturing ranks earned in the past.

For example, a player whose highest nurturing rank is lower than D is categorized as a beginner, a player whose highest nurturing rank is D or higher but lower than A is categorized as normal, and a player whose highest nurturing rank is A or higher is categorized as an expert. Therefore, if a player categorized as a beginner completes nurturing, the counters, provided for the beginner category, that count the number of times the nurturing game has been executed and the number of times support cards have been used, respectively, are updated.

It is assumed here that the player category is updated on the basis of the highest nurturing rank of the player at the time nurturing is completed. It is assumed, for example, that a player whose highest nurturing rank earned to date is “B” has nurtured a nurtured character with the nurturing rank “S”. In this case, when the nurturing of the present nurtured character is completed, the player category of the player is categorized as an expert. Therefore, the number of support cards used to nurture characters with the nurturing rank “S” and the number of times the nurturing game is executed at this time are recorded in the counters provided for the expert.

It should be noted, however, that the player category of the player may be changed at a predetermined update timing, rather than at the time nurturing is completed. For example, each player may be categorized into one of the player categories at 4:59 a.m. each day on the basis of the highest nurturing rank that has been earned by the player in the past. In this case, the player category is not changed until 4:59 a.m. on the following day, even if the highest nurturing rank is updated.

Also, information used to decide the player category is not limited to the highest nurturing rank earned in the past. For example, the player category may be decided on the basis of the highest evaluation score or test points earned in the past or within a predetermined period of time, such as while a special event is being held. Alternatively, single support card rankings common to all players may be derived without providing player categories.

Also, here, the number of times the nurturing game is executed and the number of times support cards are used are counted only when the nurturing game is executed with the event mode selected. It should be noted, however, that the number of times the nurturing game is executed and the number of times support cards are used may be counted even when the nurturing game is executed with the normal mode selected.

In addition, support card rankings may also be derived for each test aptitude or test number. For example, support card rankings may be derived by distance aptitude, such as the short distance, mile, intermediate distance, and long distance. Alternatively, support card rankings may be derived by racetrack aptitude, such as the turf track and dirt track. Thus, in the case where support card rankings are derived by test aptitude (test number) or racetrack aptitude, support card rankings may be derived further classified by player category or may be derived for all players in common without providing any player category.

As shown in FIG. 30C, a switching tab 351 is provided on the support card ranking screen 350. The switching tab 351 is provided with a beginner tab, a normal tab, and an expert tab. In the switching tab 351, when the beginner tab is tapped, the support card rankings for the beginner category are displayed, when the normal tab is tapped, the support card rankings for the normal category are displayed, and when the expert tab is tapped, the support card rankings for the expert category are displayed.

In the support card rankings for each of the player categories, for example, the top ten kinds of support cards with the highest usage rate are displayed. It should be noted, however, that the number of support cards displayed on the support card ranking screen 350 may differ for each of the player categories: beginner, normal, and expert.

Also, on the support card ranking screen 350, support card icons 351*a* indicating support cards and the usage rates thereof are displayed. When a support card icon 351*a* is pressed and held, a support card details screen (not shown in the figure) is displayed. On the support card details screen, the player can confirm detailed information concerning the support card. Although three support cards are shown in FIG. 30C, the player can sequentially confirm the top ten support cards in the rankings by inputting a flick operation from bottom to top.

As a result of the support card rankings being displayed in this way, it becomes easier for the player to figure out how to organize a better deck. In particular, since support card rankings are derived for each of the player categories, it becomes further easier for the player to understand how to organize a deck that is suitable for the player himself/herself.

Also, when the nurtured character ranking operation section 344*b* is tapped on the special event top screen 340, a nurtured character ranking screen 360 is displayed on the display 26.

Figure 30D:
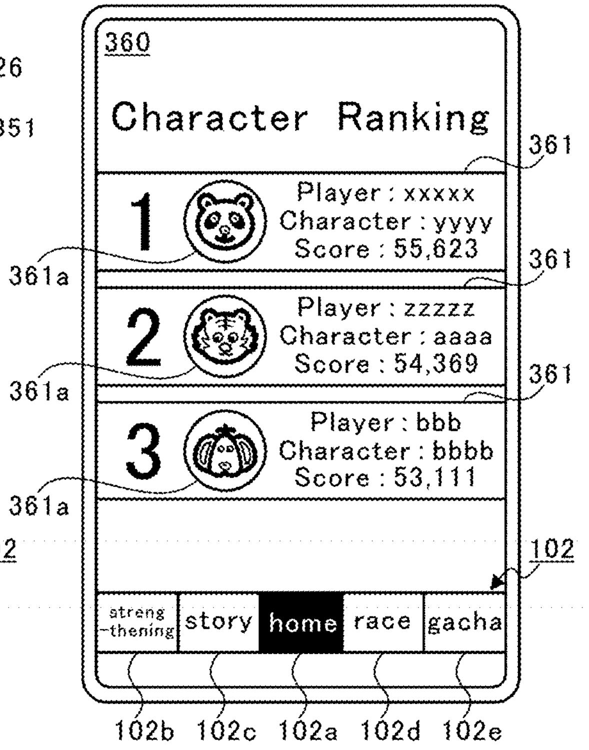
FIG. 30D is a drawing illustrating a nurtured character ranking screen.

FIG. 30D is a drawing illustrating the nurtured character ranking screen 360. While a special event is being held, the player is informed of the nurtured character rankings. Nurtured character rankings are rankings of the nurtured characters for all players. These nurtured character rankings are intended for nurtured characters that have been nurtured in nurturing games with the event mode selected. The nurtured character rankings are derived on the basis of test points of the nurtured characters. For example, the top 30 nurtured characters with the highest test points are displayed on the nurtured character ranking screen 360.

Note that information used to derive nurtured character rankings is not limited to test points. For example, nurtured character rankings may be derived on the basis of evaluation scores. In this case, for example, nurtured characters that have been nurtured with the normal mode selected may be included in the nurtured character rankings.

A plurality of information display fields 361 are displayed on the nurtured character ranking screen 360. In each of the information display fields 361, an icon 361*a* corresponding to the nurtured character, the player name of the player who nurtured the nurtured character, the character name, and test points are displayed. Although three information display fields 361 are shown in FIG. 30D, the player can sequentially confirm the information display fields 361 for up to the 30th nurtured character in the rankings by inputting a flick operation from bottom to the top.

Figure 31:
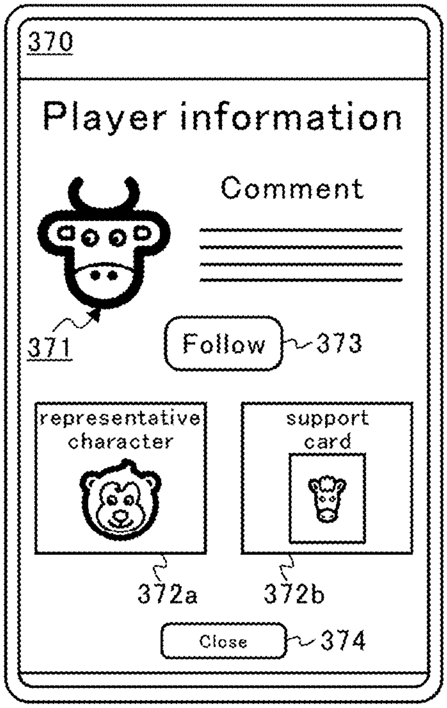
FIG. 31 is a drawing illustrating a player information confirmation screen.

FIG. 31 is a drawing illustrating a player information confirmation screen 370. When an information display field 361 is tapped on the nurtured character ranking screen 360, the player information confirmation screen 370 shown in FIG. 31 is displayed on the display 26. Player information concerning the player (hereinafter, referred to as a nurturing player) who has nurtured the nurtured character displayed in the information display field 361 on the nurtured character ranking screen 360 is displayed on the player information confirmation screen 370.

Here, a profile character image 371 indicating the profile character set by the nurturing player is displayed, and a comment set by the nurturing player is also displayed near the profile character image 371. A representative character display section 372*a* and a rental card display section 372*b* are also displayed on the player information confirmation screen 370. The representative character and the rental card set by the nurturing player are displayed in the representative character display section 372*a* and the rental card display section 372*b*, respectively.

A follow operation section 373 is also provided on the player information confirmation screen 370. The player can follow the nurturing player by tapping the follow operation section 373. By following the nurturing player, the player can register the nurturing player as a friend. By registering the nurturing player as a friend, the player can use the representative character of the nurturing player as an inheritance character in subsequent nurturing games. Also, by registering the nurturing player as a friend, the player can organize, in a deck, the rental card set by the nurturing player in subsequent nurturing games.

Note that a close operation section 374 is provided on the player information confirmation screen 370. When the close operation section 374 is tapped, the player information confirmation screen 370 is closed, and the nurtured character ranking screen 360 shown in FIG. 30D is displayed. In addition, when an icon 361*a* displayed in the information display field 361 is pressed and held on the nurtured character ranking screen 360, a character details dialog 380 is displayed on the display 26.

Figure 32A:
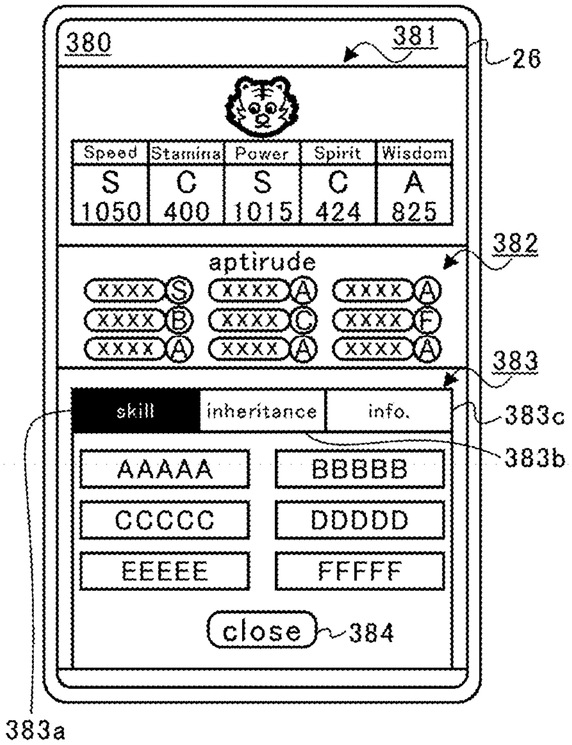
FIG. 32A is a first drawing illustrating a character details dialog.
Figure 32B:
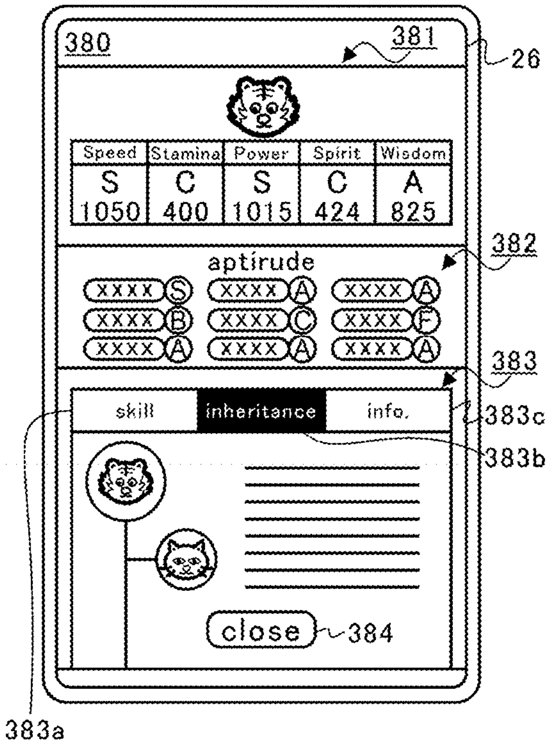
FIG. 32B is a second drawing illustrating the character details dialog.
Figure 32C:
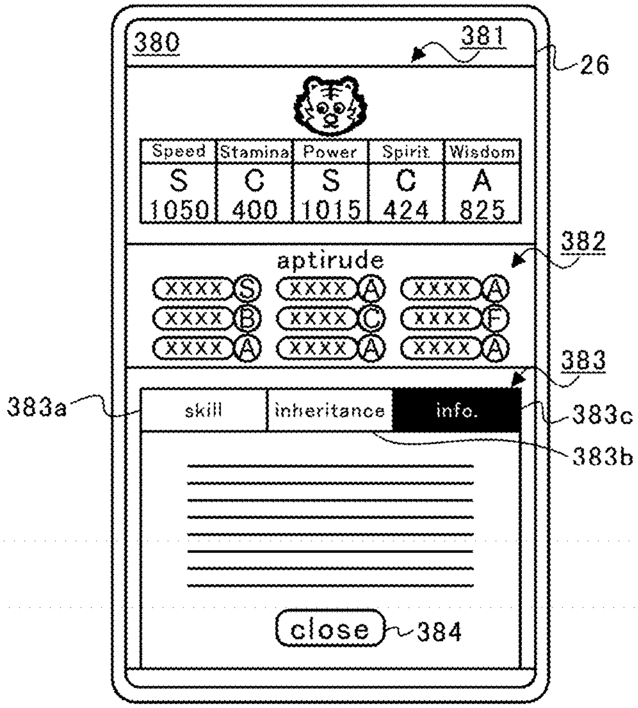
FIG. 32C is a third drawing illustrating the character details dialog.

FIG. 32A is a first drawing illustrating the character details dialog 380. FIG. 32B is a second drawing illustrating the character details dialog 380. FIG. 32C is a third drawing illustrating the character details dialog 380. Detailed information concerning the nurtured character is displayed in the character details dialog 380. An ability parameter display field 381 is displayed in the upper section of the character details dialog 380.

In addition, an aptitude information display field 382 is displayed below the ability parameter display field 381. In the aptitude information display field 382, aptitude parameters related to the racetrack aptitudes (turf and dirt), aptitude parameters related to the distance aptitudes (short distance, mile, intermediate distance, and long distance), and aptitude parameters related to the running style aptitudes (pace maker, front runner, stalker, and closer) are displayed.

A various-kinds-of-information display field 383 is displayed below the aptitude information display field 382. A skill display tab 383*a*, an inheritance information display tab 383*b*, and a nurturing information display tab 383*c* are provided in the various-kinds-of-information display field 383. When the skill display tab 383*a* is tapped, the earned skills of the nurtured character are displayed in the various-kinds-of-information display field 383, as shown in FIG. 32A. In addition, when the inheritance information display tab 383*b* is tapped, inheritance information concerning the nurtured character is displayed, as shown in FIG. 32B. Note that the inheritance information includes information concerning the two inheritance characters set in the setting game of the nurturing game when the present nurtured character is nurtured.

Also, when the nurturing information display tab 383*c* is tapped, nurturing information concerning the nurtured character is displayed, as shown in FIG. 32C. Note that the nurturing information includes the support card types that are set in the setting game of the nurturing game when the present character is nurtured, the individual race records in the nurturing game, and also the evaluation score.

In this way, in the character details dialog 380, the player can confirm various kinds of information concerning the nurtured characters who have won higher places in the nurtured character rankings. This corrects information gap among players and makes it easier for players to know how they should nurture a nurtured character.

Note that a close operation section 384 is provided in the character details dialog 380. When the close operation section 384 is tapped, the character details dialog 380 is closed, and the nurtured character ranking screen 360 is displayed on the display 26.

Figure 33:
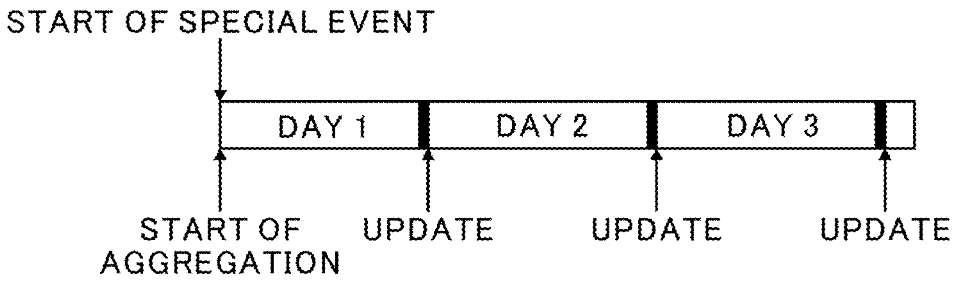
FIG. 33 is a drawing illustrating an example of ranking update timings.

FIG. 33 is a drawing illustrating an example of ranking update timings. The support card rankings and the nurtured character rankings are updated periodically while a special event is being held. For example, with the start of a special event, aggregation of information necessary to calculate the usage rates of support cards and information concerning the nurtured characters nurtured in the event mode is started. Thereafter, rankings are derived on the basis of all information aggregated by, for example, 4:59 a.m. every day while the special event is being held. The derived rankings are distributed at 5:00 a.m. on the same day.

That is, information necessary to derive rankings is aggregated at the time the nurturing game is completed, but the information is not immediately reflected on the rankings at the time the nurturing game is completed. Therefore, for example, the information aggregated during the period from 4:59 a.m. on the second day to 4:59 a.m. on the third day of a special event is reflected on the rankings that are distributed at 5 a.m. on the third day.

For this reason, in this embodiment, the support card rankings and the nurtured character rankings are not derived on the first day of the special event. Therefore, no support card rankings or nurtured character rankings are provided on the first day of the special event. In this case, on the first day of the special event, for example, the card ranking operation section 344*a* and the nurtured character ranking operation section 344*b* are grayed out so as not to accept any player operations. Alternatively, on the first day of the special event, it may be reported on the support card ranking screen 350 and the nurtured character ranking screen 360 that information for deriving rankings is being aggregated.

It is assumed here that the aggregation periods and update timings are the same for the support card rankings and the nurtured character rankings. It should be noted, however, that the aggregation periods and the update timings may be different for both rankings. For example, aggregation of the support card rankings may start before the period of the special event. In this case, the support card rankings may be provided at the start of the special event.

Here, when a nurtured character is to be nurtured using characters and support cards earned by lottery, as in this embodiment, the more powerful characters and support cards the player possesses, the stronger nurtured character the player can nurture. For this reason, there is a risk that players who do not possess powerful characters or support cards, or who possess only a small number of such characters and support cards, may be discouraged from playing the game.

In contrast, this embodiment allows a player to use a nurtured character nurtured by another player as an inheritance character and use a support card set by another player as a rental card, as described above. However, in order to use a nurtured character nurtured by another player or a support card possessed by another player, the player needs to register the other player as a friend.

At this time, the player needs to find other players who have set, as representative characters, nurtured characters desired by the player himself/herself or other players who have set powerful support cards as rental cards. However, the process of searching for the best friend for the player can be a complicated task, and it may be impossible to effectively use the rental function, resulting in a large gap among players.

In this embodiment, when a nurturing game is played with the event mode selected while a special event is being held, the player can organize the top 30 nurtured characters in the rankings in a deck as an inheritance character. This allows the player to organize a powerful inheritance character in a deck without a complicated task, making it possible to reduce the gap among players. Also when playing a nurturing game with the normal mode selected while a special event is being held, the player may be allowed to organize the top 30 characters in the rankings as an inheritance character in a deck. Differences between the event mode and the normal mode in the preparatory stage of a nurturing game will be described below.

Figure 34A:
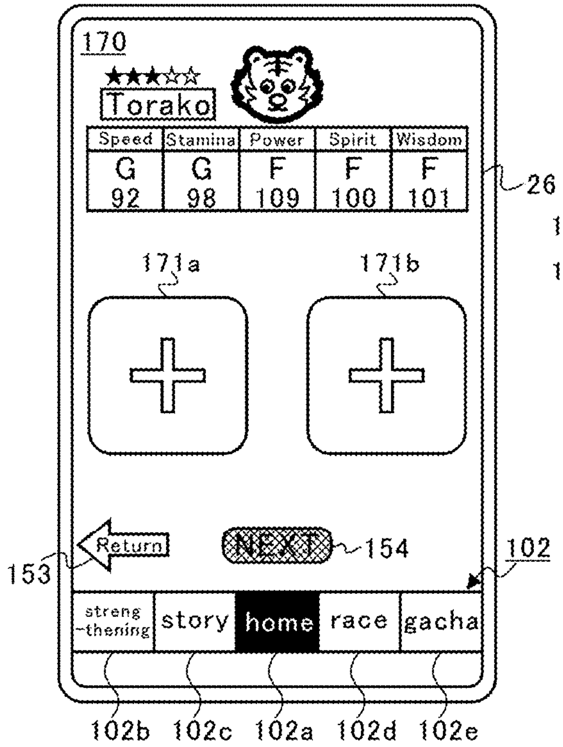
FIG. 34A is a fourth drawing illustrating the inheritance character selection screen.
Figure 34B:
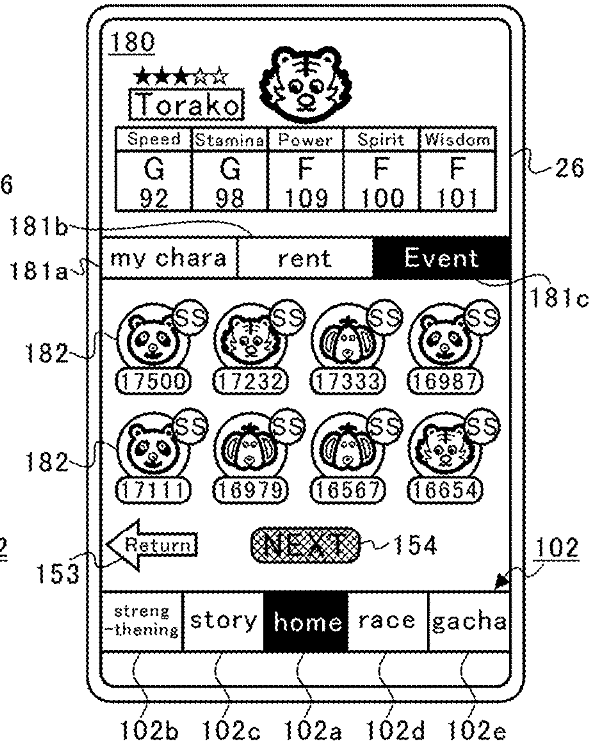
FIG. 34B is a second drawing illustrating the nurtured character list screen.

FIG. 34A is a fourth drawing illustrating the inheritance character selection screen 170. FIG. 34B is a second drawing illustrating the nurtured character list screen 180. When the player starts a nurturing game with the event mode selected and selects a main character, the inheritance character selection screen 170 is displayed on the display 26, as shown in FIG. 34A. The inheritance character selection screen 170 displayed at this time is the same for both normal mode and event mode. Then, when the first inheritance character selection region 171*a* or the second inheritance character selection region 171*b* is tapped on the inheritance character selection screen 170, the nurtured character list screen 180 shown in FIG. 34B is displayed.

As can be seen by comparing FIG. 34B and FIG. 7B, the nurtured character list screen 180 differs between the normal mode and the event mode. More specifically, in the normal mode, the my character tab 181*a* and the rental tab 181*b* are displayed on the nurtured character list screen 180. In contrast, in the event mode, an event tab 181*c* is displayed in addition to the my character tab 181*a* and the rental tab 181*b*.

When the my character tab 181*a* is tapped, the nurtured character icons 182 corresponding to the nurtured characters possessed by the player himself/herself are displayed. In addition, when the rental tab 181*b* is selected, the nurtured character icons 182 corresponding to the representative characters of other players who are extracted on the basis of player information (e.g., player IDs) tied to the player, such as players registered as friends, are displayed.

Also, when the event tab 181*c* is tapped, the nurtured character icons 182 corresponding to the top 30 nurtured characters in the nurtured character rankings are displayed, as shown in FIG. 34B. As described above, when a nurtured character icon 182 is tapped, the nurtured character corresponding to the nurtured character icon 182 is temporarily selected. In addition, when a nurtured character icon 182 is pressed and held, detailed information concerning the nurtured character corresponding to the nurtured character icon 182 is displayed.

Although a detailed explanation is omitted, the nurtured character list screen 180 is provided with an operation button (not shown in the figure). By operating the operation button (not shown in the figure), the player can rearrange or narrow down the nurtured character icons 182 on the basis of the abilities and inheritance information of nurtured characters, or affinity with the main character to be nurtured, etc.

Thus, in this embodiment, the nurtured characters nurtured in the nurturing game are set as ranking objects. Also, while a special event is being held, the nurtured characters tied to players who played nurturing games are arranged in order on the basis of the results of the nurturing games. In addition, a second player, different from a first player whose nurtured character has won a predetermined place (in this case, 30th or higher), can organize the nurtured character tied to the first player in a deck.

In other words, in the event mode, the player can organize, in a deck, a nurtured character extracted on the basis of the places in the nurtured character rankings (hereinafter, referred to as a high-ranking nurtured character) and a nurtured character extracted on the basis of the player information (hereinafter, referred to as an extracted nurtured character). Note that the player can organize, in a deck in one nurturing game, only one high-ranking nurtured character and extracted nurtured character in total.

In addition, organization conditions for organizing characters in a deck are set for the high-ranking nurtured characters and the extracted nurtured characters. Although paying a predetermined cost is set as an organization condition here, the organization conditions differ between the high-ranking nurtured characters and the extracted nurtured characters.

More specifically, the player can consume predetermined in-game currencies as a cost to use a nurtured character nurtured by another player as an inheritance character. Here, high-ranking nurtured characters require lower cost than extracted nurtured characters. In addition, an extracted nurtured character can be organized in a deck as an inheritance character only within a daily usage upper limit. Here, the daily usage upper limit is set to, for example, three, and the player can organize any of the extracted nurtured characters in a deck up to three times per day.

On the other hand, no usage upper limits are set for the high-ranking nurtured characters. Therefore, the player can play nurturing games by organizing his/her favorite high-ranking nurtured characters in a deck as many times as he/she wishes in a day.

Thus, in this embodiment, the organization conditions to be set differ between the high-ranking nurtured characters and the extracted nurtured characters. Here, the organization conditions are set so that a high-ranking nurtured character is easier for the player to use than an extracted nurtured character.

It should be noted, however, that the aforementioned organization conditions are merely one example. For example, the organization conditions may be set so that an extracted nurtured character is easier for the player to use than a high-ranking nurtured character. Also, the same organization conditions may be set for the high-ranking nurtured characters and the extracted nurtured characters. Furthermore, organization conditions may be set only for either the high-ranking nurtured characters or the extracted nurtured characters, but not for both.

Note that as described above, the nurtured character rankings are distributed at 5:00 a.m. every day. For this reason, the high-ranking nurtured characters may be replaced frequently, and the high-ranking nurtured characters are thus more limited than the extracted nurtured characters in terms of the time period during which nurtured characters can be organized in decks. Therefore, it is preferable to set organization conditions for high-ranking nurtured characters so that the player can use high-ranking nurtured characters more easily than extracted nurtured characters.

Also, when the next operation section 154 is tapped on the inheritance character selection screen 170 after two inheritance characters have been selected, the support card organization screen 190 is displayed on the display 26.

Figure 35:
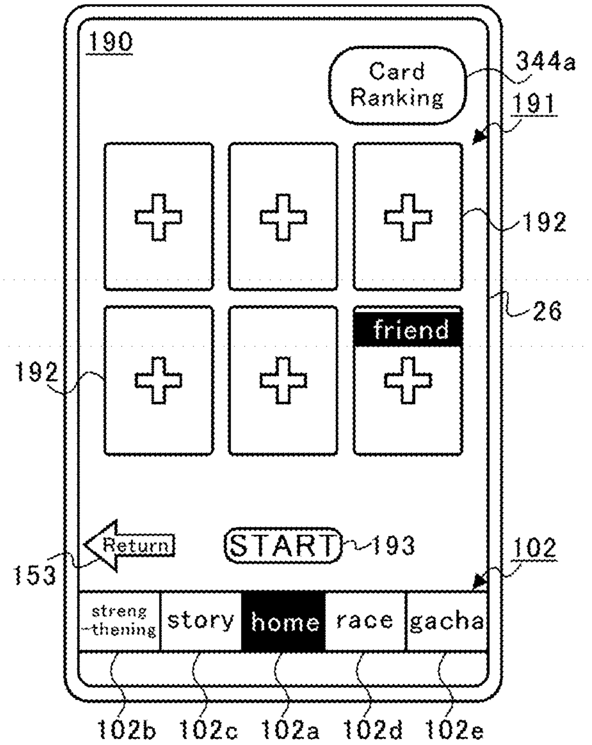
FIG. 35 is a third drawing illustrating the support card organization screen.

FIG. 35 is a third drawing illustrating the support card organization screen 190. In the event mode, the card ranking operation section 344*a* is provided on the support card organization screen 190. When the card ranking operation section 344*a* is tapped, the support card ranking screen 350 shown in FIG. 30C is displayed. Thus, in the event mode, the screen can also transition to the support card ranking screen 350 from the support card organization screen 190. Note that the support card organization screen 190 is the same for the event mode and the normal mode, except that the card ranking operation section 344*a* is provided.

Note that the card ranking operation section 344*a* may also be provided on the support card organization screen 190 when a nurturing game is started with the normal mode selected while a special event is being held, thereby allowing the screen to transition to the support card ranking screen 350.

When the start operation section 193 is tapped on the support card organization screen 190 with six support cards selected, a nurturing main game is started. This nurturing main game has no changes between the normal mode and the event mode. Also, when the nurturing main game ends, the aforementioned nurturing completion screen 330 (see FIG. 28A, FIG. 28B, and FIG. 28C) is displayed. If the event mode is selected, a test result screen 390 is displayed on the display 26 after the display of the nurturing completion screen 330 is completed.

Figure 36A:
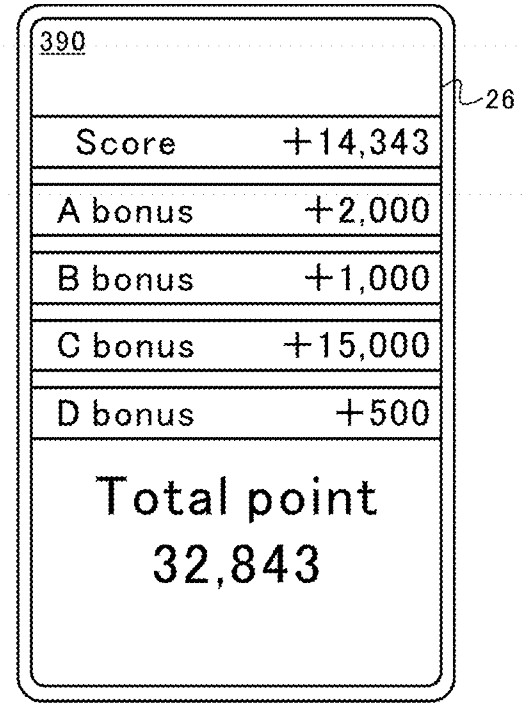
FIG. 36A is a first drawing illustrating a test result screen.
Figure 36B:
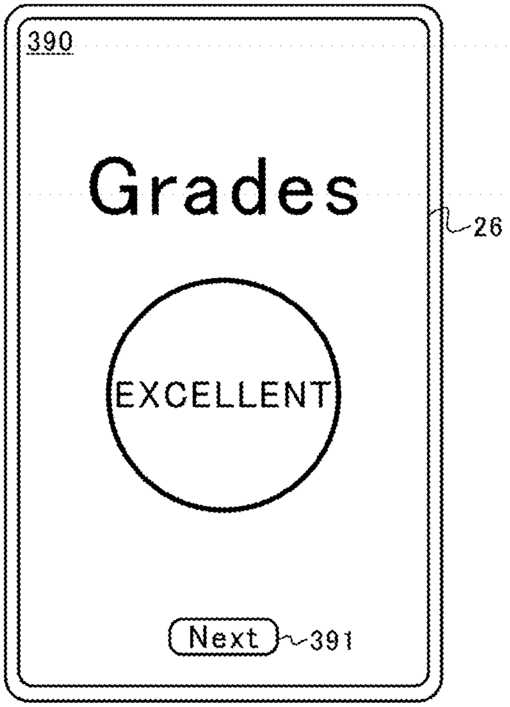
FIG. 36B is a second drawing illustrating the test result screen.
Figure 36C:
FIG. 36C is a third drawing illustrating the test result screen.
Figure 36D:
FIG. 36D is a fourth drawing illustrating the test result screen.

FIG. 36A is a first drawing illustrating the test result screen 390. FIG. 36B is a second drawing illustrating the test result screen 390. FIG. 36C is a third drawing illustrating the test result screen 390. FIG. 36D is a fourth drawing illustrating the test result screen 390. As shown in FIG. 36A, an evaluation score (captioned Score in the figure) is displayed on the top row of the test result screen 390, and bonus points to be added are displayed below the evaluation score. Here, the bonus points to be added are displayed separately for each bonus granting condition. Also, test points obtained by adding all bonus points to the evaluation score are displayed in the lower section of the test result screen 390.

Thereafter, as shown in FIG. 36B, a grade derived on the basis of the test points and a next operation section 391 are displayed. When the next operation section 391 is tapped, rewards granted to the player corresponding to the test subjects are displayed, as shown in FIG. 36C. Furthermore, when the next operation section 391 is tapped, the test result screen 390 is closed, and the home screen 100 is displayed. It should be noted, however, that if a new test subject is released as a result of the release condition being satisfied, the player is informed that a new test subject has been released, as shown in FIG. 36D.

Next, functional configurations of the player terminal 1 and the server 1000 for executing the aforementioned nurturing game will be described, and descriptions of the other configurations will be omitted.

(Functional Configuration of Player Terminal 1)

Figure 37:
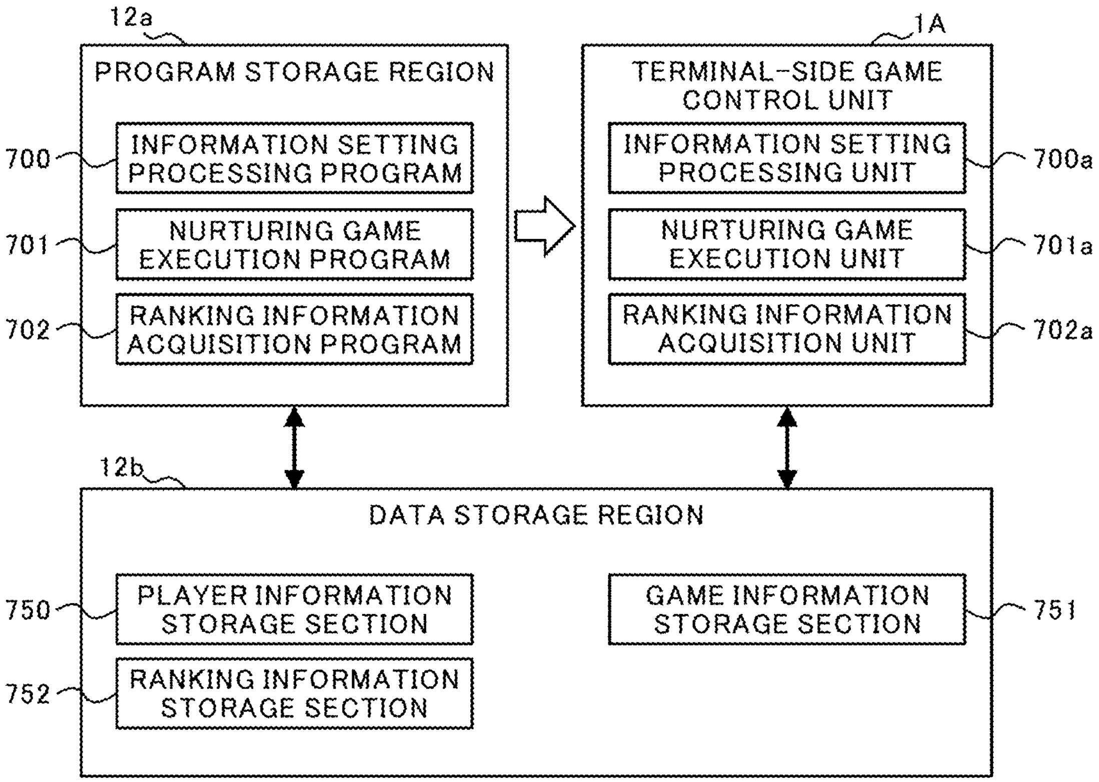
FIG. 37 is a diagram for illustrating the configuration of a memory in the player terminal and functions of the player terminal as a computer.

FIG. 37 is a diagram for illustrating the configuration of the memory 12 in the player terminal 1 and functions of the player terminal 1 as a computer. A program storage region 12*a* and a data storage region 12*b* are provided in the memory 12. When a game is started, the CPU 10 stores terminal-side game control programs (modules) in the program storage region 12*a*.

The terminal-side game control programs include: an information setting processing program 700; a nurturing game execution program 701; and a ranking information acquisition program 702. Note that the programs listed in FIG. 37 are examples, and many other programs are provided as the terminal-side game control programs.

In the data storage region 12*b*, a player information storage section 750, a game information storage section 751, and a ranking information storage section 752 are provided as storage sections for storing data. Note that many other storage sections are provided in the data storage region 12*b*. Here, information directly related to the game (hereinafter, referred to as game information), such as a nurturing game, is stored in the game information storage section 751. Note that various kinds of information while each game, such as a nurturing game, is proceeding are also temporarily stored in the game information storage section 751. In addition, all information other than the game information, such as information concerning the player or other players and setting information of the player terminal 1, is player information. The player information is stored in the player information storage section 750. Note that ranking information is stored in the ranking information storage section 752.

The CPU 10 runs the individual programs stored in the program storage region 12*a* and updates the data in the individual storage sections of the data storage region 12*b*. Furthermore, the CPU 10 runs the individual programs stored in the program storage region 12*a*, thereby causing the player terminal 1 (computer) to function as a terminal-side game control unit 1A. The terminal-side game control unit 1A includes: an information setting processing unit 700*a*; a nurturing game execution unit 701*a*; and a ranking information acquisition unit 702*a*.

More specifically, the CPU 10 runs the information setting processing program 700, thereby causing the computer to function as the information setting processing unit 700*a*. Similarly, the CPU 10 runs the nurturing game execution program 701 and the ranking information acquisition program 702, thereby causing the computer to function as the nurturing game execution unit 701*a* and the ranking information acquisition unit 702*a*, respectively.

When various kinds of information settings are made at the player terminal 1, the information setting processing unit 700*a* stores, in the player information storage section 750, information concerning the settings as player information. In addition, when having updated information in the player information storage section 750, the information setting processing unit 700*a* transmits the updated information to the server 1000.

The nurturing game execution unit 701*a* executes all processes related to the nurturing game.

While a special event is being held, the ranking information acquisition unit 702*a* acquires ranking information from the server 1000 and stores the ranking information in the ranking information storage section 752.

(Functional Configuration of Server 1000)

Figure 38:
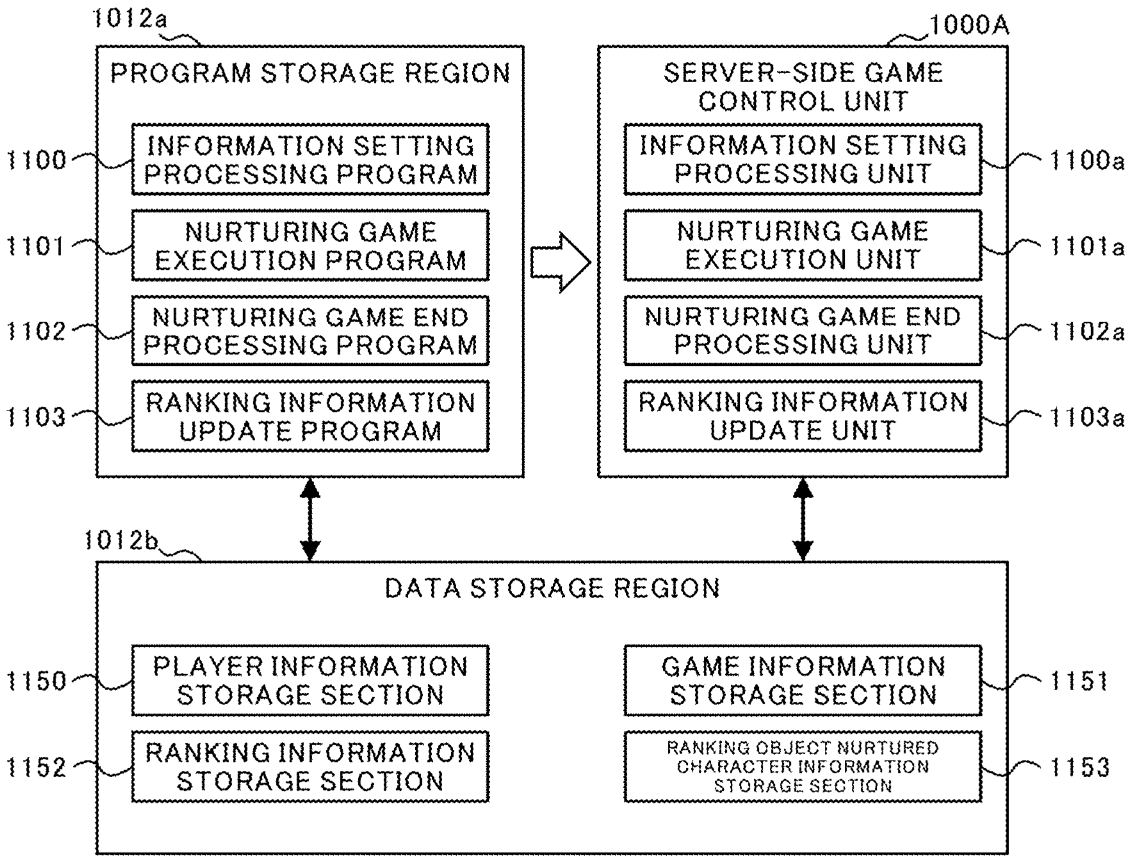
FIG. 38 is a diagram for illustrating the configuration of a memory in the server and functions of the server as a computer.

FIG. 38 is a diagram for illustrating the configuration of the memory 1012 in the server 1000 and functions of the server 1000 as a computer. A program storage region 1012*a* and a data storage region 1012*b* are provided in the memory 1012. When a game is started, the CPU 1010 stores server-side game control programs (modules) in the program storage region 1012*a*.

The server-side game control programs include: an information setting processing program 1100; a nurturing game execution program 1101; a nurturing game end processing program 1102; and a ranking information update program 1103. The programs listed in FIG. 38 are examples, and many other programs are provided as the server-side game control programs.

In the data storage region 1012*b*, a player information storage section 1150, a game information storage section 1151, a ranking information storage section 1152, and a ranking object nurtured character information storage section 1153 are provided as storage sections for storing data. Note that many other storage sections are provided in the data storage region 1012*b*. Here, game information of all players is stored in the game information storage section 1151 so as to be tied to the respective player IDs. In addition, player information of all players is stored in the player information storage section 1150 so as to be tied to the respective player IDs.

The CPU 1010 runs the individual programs stored in the program storage region 1012*a* and updates data in the individual storage sections in the data storage region 1012*b*. Also, the CPU 1010 runs the individual programs stored in the program storage region 1012*a*, thereby causing the server 1000 (computer) to function as a server-side game control unit 1000A. The server-side game control unit 1000A includes: an information setting processing unit 1100*a*; a nurturing game execution unit 1101*a*; a nurturing game end processing unit 1102*a*; and a ranking information update unit 1103*a*.

More specifically, the CPU 1010 runs the information setting processing program 1100, thereby causing the computer to function as the information setting processing unit

1100*a*. Similarly, the CPU 1010 runs the nurturing game execution program 1101, the nurturing game end processing program 1102, and the ranking information update program 1103, thereby causing the computer to function as the nurturing game execution unit 1101*a*, the nurturing game end processing unit 1102*a*, and the ranking information update unit 1103*a*, respectively.

When various kinds of information settings are made at the player terminal 1, the information setting processing unit 1100*a* updates the player information in the player information storage section 1150 on the basis of the updated information received from the player terminal 1.

The nurturing game execution unit 1101*a* executes all processes related to the nurturing game.

When the nurturing game ends, the nurturing game end processing unit 1102*a* derives an evaluation score, a nurturing rank, etc. for the nurtured character who has been nurtured. In addition, the nurturing game end processing unit 1102*a* stores nurtured character information in the game information storage section 1151.

While a special event is being held, the ranking information update unit 1103*a* derives nurtured character rankings and support card rankings.

Although the information setting processing unit 700*a* in the player terminal 1 and the information setting processing unit 1100*a* in the server 1000 are common in that both the units store player information, they differ in specific processing details and the scope of player information to be stored. In addition, although the nurturing game execution unit 701*a* in the player terminal 1 and the nurturing game execution unit 1101*a* in the server 1000 are common in that both the units execute processes related to the nurturing game, they differ in their roles, i.e., the scope of their responsibilities.

Processes to be executed by the individual functional units in the aforementioned player terminal 1 and server 1000 will be described below by using flowcharts. Below, processes related to the nurturing game in the case where the normal mode is selected will be described first, followed by descriptions of processes related to the nurturing game in the case where the event mode is selected.

(Processes of Player Terminal 1 and Server 1000)

<Processes Related to Nurturing Game>

Figure 39:
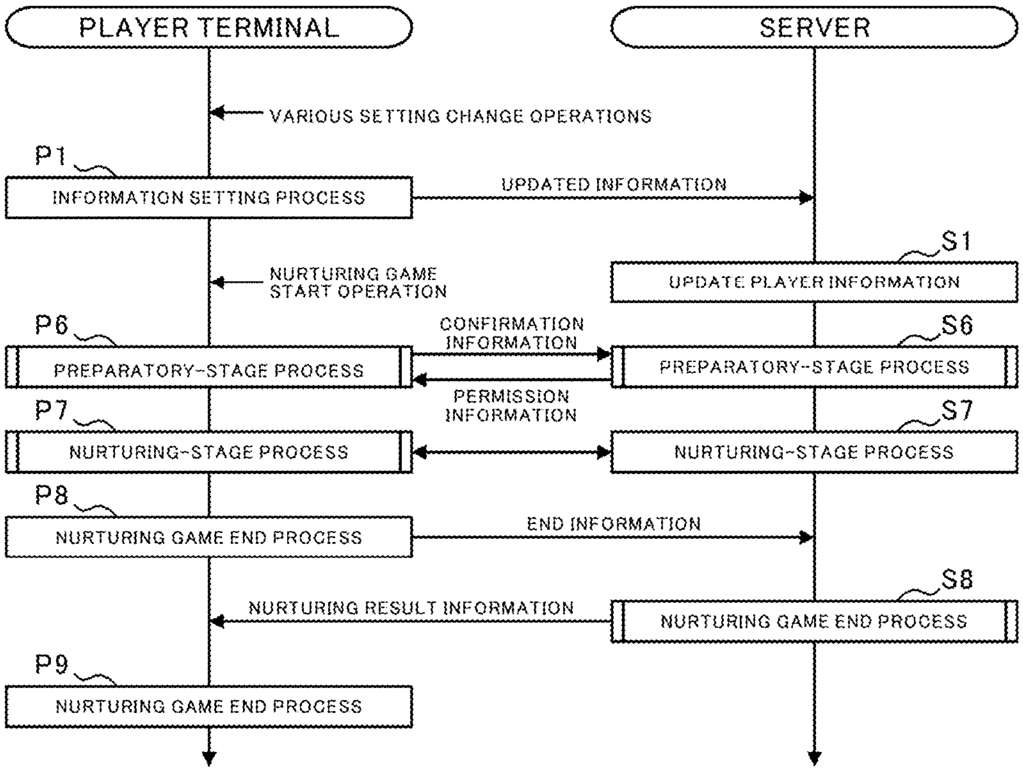
FIG. 39 is a sequence diagram for illustrating processing of the player terminal and the server related to the nurturing game.

FIG. 39 is a sequence diagram for illustrating processes of the player terminal 1 and the server 1000 related to a nurturing game. Note that, in the following description, processes in the player terminal 1 are denoted as Pn (n is any integer). Furthermore, processes in the server 1000 are denoted as Sn (n is any integer).

When the player performs various setting change operations at the player terminal 1, the information setting processing unit 700*a* of the player terminal 1 executes an information setting process (P1) for updating the player information storage section 750 on the basis of the player operation inputs. In this information setting process, the updated information is transmitted to the server 1000. At the server 1000, upon receiving the updated information, the information setting processing unit 1100*a* updates the player information in the player information storage section 1150 (S1).

Note that the player information updated in P1 and S1 includes, for example, profile information that can be set by the player. Also, for example, when an operation for adding another player as a friend or for unregistering a friend is input as a setting change operation, friend information indicating information concerning friends is updated.

When an operation for starting a nurturing game is input at the player terminal 1, the nurturing game execution unit 701*a* executes the preparatory-stage process (P6). In addition, during this preparatory-stage process, communication processes are executed between the player terminal 1 and the server 1000. At the server 1000, on the basis of information received from the player terminal 1, the nurturing game execution unit 1101*a* executes the preparatory-stage process (S6).

Figure 40:
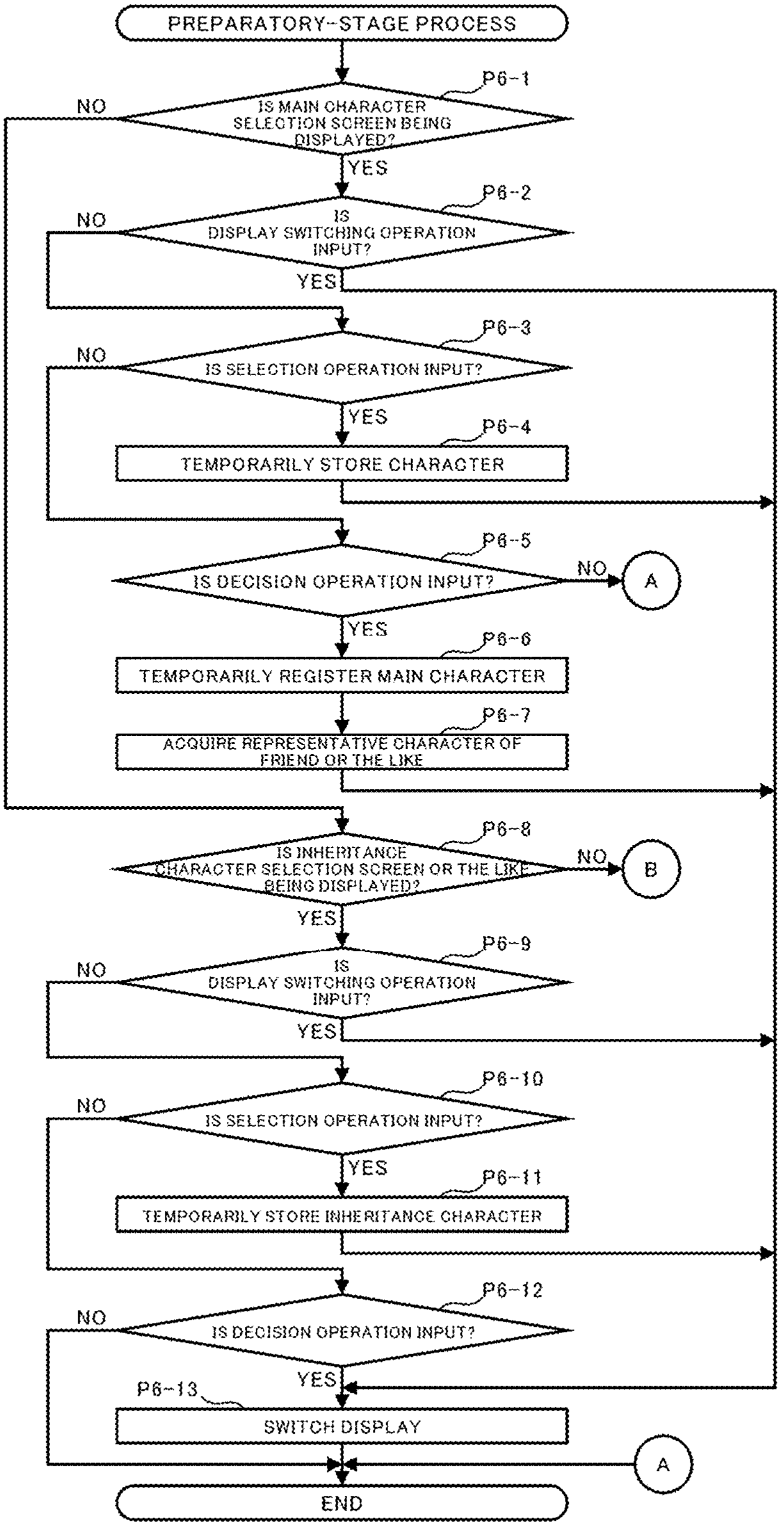
FIG. 40 is a first flowchart for illustrating a preparatory-stage process in the player terminal.
Figure 41:
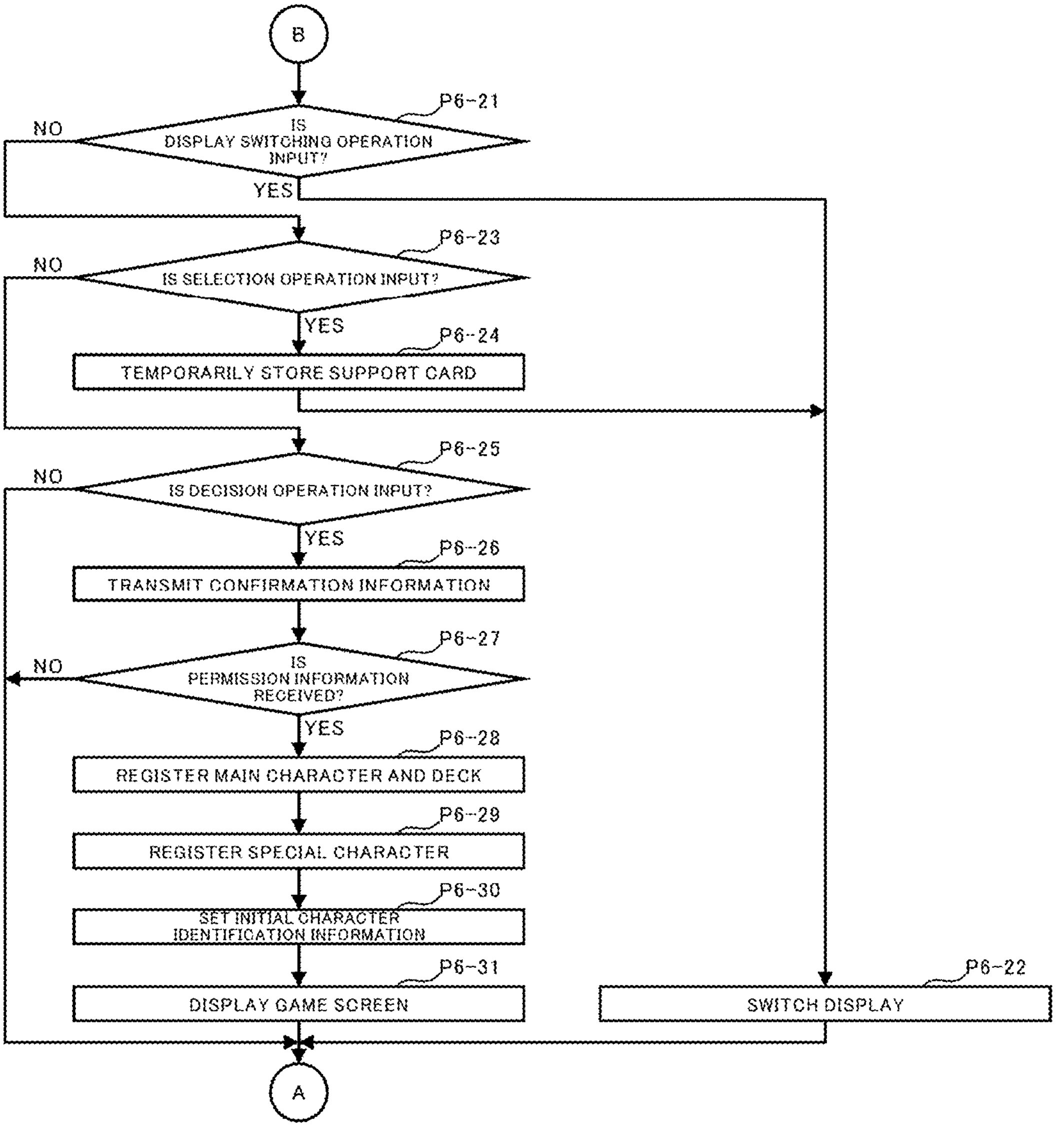
FIG. 41 is a second flowchart for illustrating the preparatory-stage process in the player terminal.

FIG. 40 is a first flowchart for illustrating the preparatory-stage process (P6) in the player terminal 1. FIG. 41 is a second flowchart for illustrating the preparatory-stage process (P6) in the player terminal 1. The nurturing game execution unit 701*a* of the player terminal 1 determines whether or not the main character selection screen 150 is being displayed on the display 26 (P6-1). If the main character selection screen 150 is being displayed (YES in P6-1) and a display switching operation for switching the screen display is input (YES in P6-2), the nurturing game execution unit 701*a* switches the display screen of the display 26 (P6-13).

In addition, when a selection operation (tapping a character icon 151) is input on the main character selection screen 150 (YES in P6-3), the nurturing game execution unit 701*a* temporarily stores the character corresponding to the selected character icon 151 (P6-4) and switches the display screen (P6-13).

In addition, when a decision operation (tapping the next operation section 154) is input on the main character selection screen 150 (YES in P6-5), the nurturing game execution unit 701*a* temporarily registers, as the main character, the character who has been temporarily stored in P6-4 above (P6-6). Also, the nurturing game execution unit 701*a* acquires, from the server 1000, information concerning representative characters extracted according to a predetermined extraction condition, such as the representative characters of the friends (P6-7), and switches the display screen (P6-13).

Also, if the inheritance character selection screen 170 or the nurtured character list screen 180 is being displayed (YES in P6-8) and a display switching operation for switching the screen display is input (YES in P6-9), the nurturing game execution unit 701*a* switches the display screen on the display 26 (P6-13). In addition, when a selection operation (tapping a nurtured character icon 182) is input on the nurtured character list screen 180 (YES in P6-10), the nurturing game execution unit 701*a* temporarily stores the character corresponding to the selected nurtured character icon 182 as an inheritance character (P6-11) and switches the display screen (P6-13).

Also, when a decision operation (tapping the next operation section 154) is input on the inheritance character selection screen 170 (YES in P6-12), the nurturing game execution unit 701*a* displays the support card organization screen 190 on the display 26 (P6-13).

Also, if the support card organization screen 190 or the support card selection screen 200 is being displayed (NO in P6-8) and a display switching operation for switching the screen display is input (YES in P6-21 in FIG. 41), the nurturing game execution unit 701*a* switches the display screen of the display 26 (P6-22). In addition, when a selection operation (tapping the card icon 201 of a support card) is input on the support card selection screen 200 (YES in P6-23), the nurturing game execution unit 701*a* temporarily stores the support card corresponding to the selected card icon 201 (P6-24) and switches the display screen (P6-22).

In addition, when a decision operation (tapping the start operation section 193) is input on the support card organization screen 190 (YES in P6-25), the nurturing game execution unit 701*a* transmits confirmation information to the server 1000 (P6-26). The confirmation information includes information identifying the temporarily registered main character, inheritance characters, and support cards. Upon receiving the confirmation information, the server 1000 determines, in the preparatory-stage process (S6), whether or not to permit execution of a nurturing main game by using the temporarily registered main character, inheritance characters, and support cards.

Figure 42:
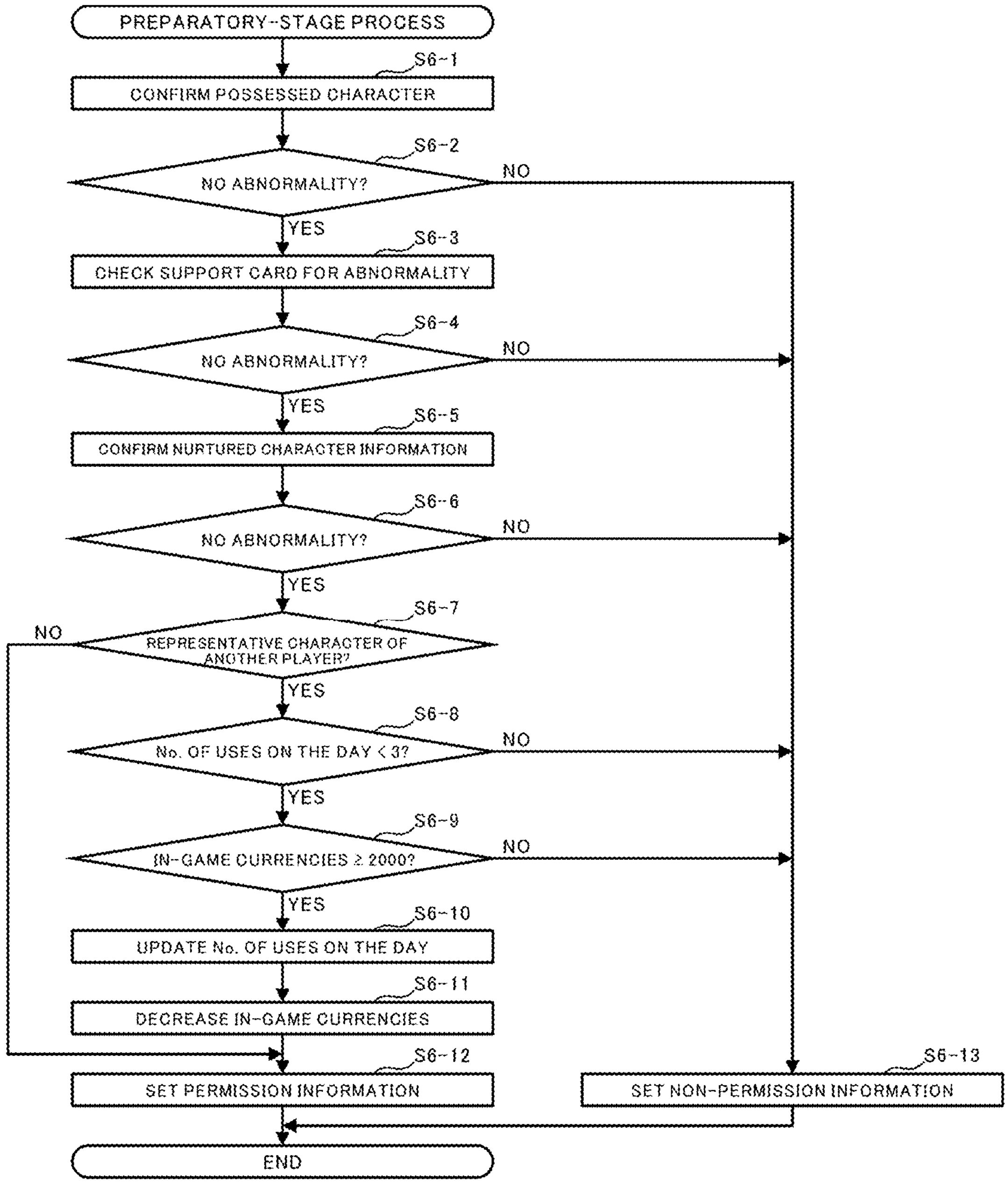
FIG. 42 is a flowchart for illustrating the preparatory-stage process in the server.

FIG. 42 is a flowchart for illustrating the preparatory-stage process (S6) in the server 1000. Upon receiving the confirmation information, the nurturing game execution unit 1101*a* confirms the characters possessed by the player stored in the player information storage section 1150 (S6-1). If the main character selected by the player is included in the possessed characters, the nurturing game execution unit 1101*a* determines that there are no abnormalities (S6-2).

If the main character selected by the player has no abnormalities (YES in S6-2), the nurturing game execution unit 1101*a* confirms whether or not the support cards selected by the player have an abnormality (S6-3). It is determined in S6-3 that there is an abnormality if a support card that is not possessed by the player is selected, if the rental card selected by the player is not tied to the player ID of that player, if a support character overlaps the main character, etc.

If there are no abnormalities in the support cards selected by the player (YES in S6-4), the nurturing game execution unit 1101*a* confirms the nurtured character information stored in the game information storage section 1151 (S6-5). Then, the nurturing game execution unit 1101*a* determines that there are no abnormalities in the inheritance characters if the nurtured character selected by the player as an inheritance character is tied to the player ID of that player, that is, if a nurtured character that is nurtured by the player himself/herself is selected as an inheritance character (YES in S6-6).

If it is determined that there are no abnormalities in the inheritance characters, the nurturing game execution unit 1101*a* determines whether or not the nurtured characters selected by the player as the inheritance characters include the representative character of another player (S6-7). If the representative character of another player is included (YES in S6-7), the nurturing game execution unit 1101*a* determines whether the number of times the representative character is used on the day is less than three (S6-8).

If the number of times the representative character is used on the day is less than three (YES in S6-8), the nurturing game execution unit 1101*a* determines whether the number of predetermined in-game currencies possessed by the player is 2000 or more (S6-9). Namely, it is determined in S6-8 and S6-9 whether or not the organization conditions are satisfied. If the player has 2000 or more in-game currencies (YES in S6-9), the nurturing game execution unit 1101*a* adds "1" to the number of times of use on that day (S6-10). Also, the nurturing game execution unit 1101*a* subtracts 2000 from the number of predetermined in-game currencies possessed by the player that is stored in the player information storage section 1150 (S6-11).

If there are no abnormalities in the main character, inheritance characters, and support cards, and if the organization conditions for using the representative character of another player are satisfied, the nurturing game execution unit 1101*a* sets permission information (S6-12) and causes the player terminal 1 to receive the permission information. On the other hand, if there is an abnormality in the main character, inheritance characters, or support cards, or if the organization conditions for using the representative character of another player are not satisfied, the nurturing game execution unit 1101*a* sets non-permission information (S6-13) and causes the player terminal 1 to receive the non-permission information.

Referring back to FIG. 41, at the player terminal 1, when receiving permission information (YES in P6-27) after transmitting the confirmation information (P6-26), the nurturing game execution unit 701*a* registers the main character temporarily registered in P6-6 above (P6-28). Also, the nurturing game execution unit 701*a* registers, in the deck, the nurtured characters temporarily stored as the inheritance characters in P6-11 above and the support cards temporarily stored in P6-24 above. In addition, the nurturing game execution unit 701*a* registers the character IDs of the characters set as the special characters on the basis of special character information (P6-29). Also, the nurturing game execution unit 701*a* sets initial character identification information (P6-30) and displays the game screen 210 on the display 26 (P6-31).

Referring back to FIG. 39, when the preparatory-stage process (P6) is completed, the nurturing game execution unit 701*a* executes the nurturing-stage process (P7). Also, during this nurturing-stage process, communication processes are executed between the player terminal 1 and the server 1000. At the server 1000, the nurturing game execution unit 1101*a* executes the nurturing-stage process (S7) on the basis of information received from the player terminal 1. In reality, the player terminal 1 and the server 1000 have individual roles assigned thereto for proceeding with the nurturing main game such that the player terminal 1 is in charge of the nurturing-stage process (P7) and the server 1000 is in charge of the nurturing-stage process (S7). For the sake of ease of understanding, however, it is assumed here that all processes are executed in the nurturing-stage process (P7) of the player terminal 1. It should be noted, however, that some or all of the processes described below in the nurturing-stage process (P7) may be executed in the nurturing-stage process (S7) in the server 1000.

Figure 43:
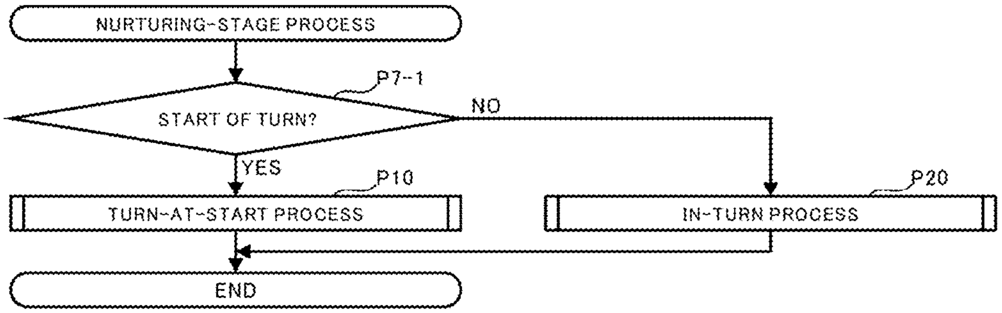
FIG. 43 is a flowchart for illustrating a nurturing-stage process in the player terminal.

FIG. 43 is a flowchart for illustrating the nurturing-stage process in the player terminal 1. The nurturing game execution unit 701*a* of the player terminal 1 executes the turn-at-start process (P10) if the player is at the start of a turn (YES in P7-1) or an in-turn process (P20) if the player is not at the start of a turn.

Figure 44:
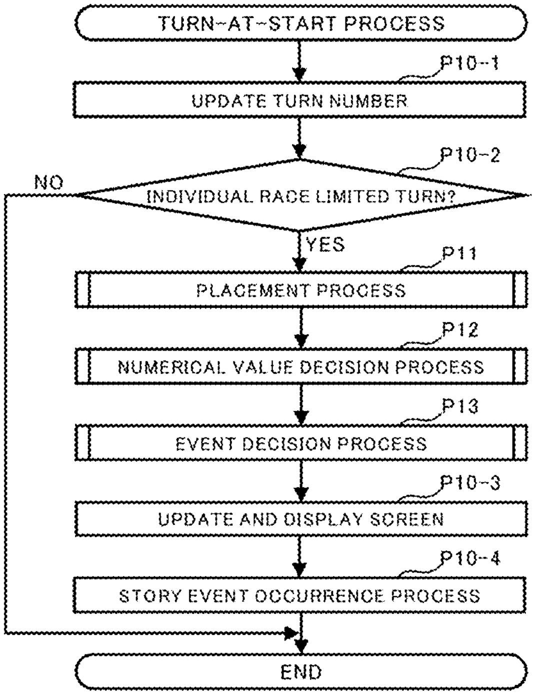
FIG. 44 is a flowchart for illustrating the turn-at-start process in the player terminal.

FIG. 44 is a flowchart for illustrating the turn-at-start process in the player terminal 1. The nurturing game execution unit 701*a* updates the current turn number stored in the game information storage section 751 (P10-1). The nurturing game execution unit 701*a* also determines whether or not the current turn is a turn that allows selection of only an individual race, i.e., a turn that allows selection of only the individual race operation section 219 (individual race limited turn) with reference to the elective table (FIG. 12) stored in the data storage region 12*b* (P10-2). If the current turn is not an individual race limited turn (NO in P10-2), the turn-at-start process ends. If the current turn is an individual race limited turn (YES in P10-2), a placement process (P11), a numerical value decision process (P12), and an event decision process (P13) are executed in order.

It is assumed here that the placement process (P11), the numerical value decision process (P12), and the event decision process (P13) are executed only at the player terminal 1. It should be noted, however, that some or all of the placement process (P11), the numerical value decision process (P12), and the event decision process (P13) may be executed at the server 1000. Also, some of the processes described below in the placement process (P11), the numerical value decision process (P12), and the event decision process (P13) may be executed at the server 1000. If the aforementioned processes are executed at the server 1000, the player terminal 1 executes processes on the basis of information received from the server 1000.

Figure 45:
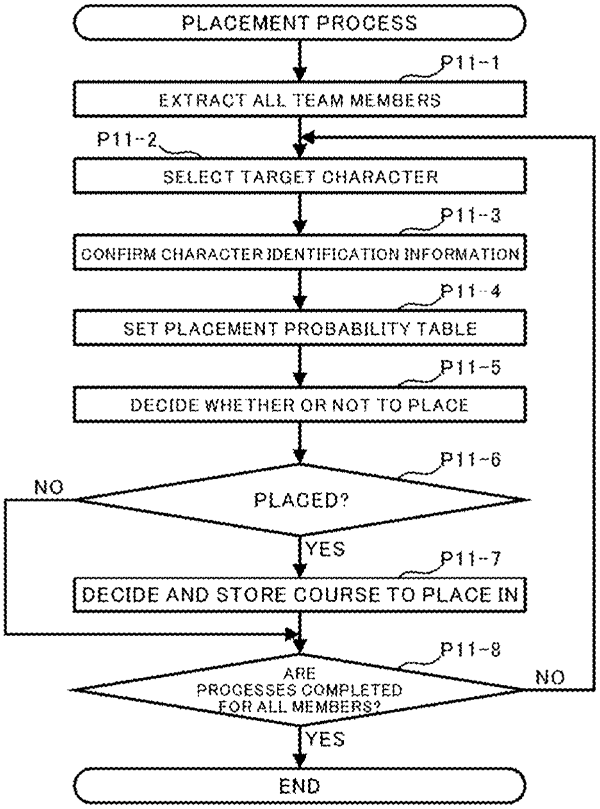
FIG. 45 is a flowchart for illustrating a placement process in the player terminal.

FIG. 45 is a flowchart for illustrating the placement process in the player terminal 1. The nurturing game execution unit 701*a* extracts all characters registered as team members with reference to the character identification information table (FIG. 10 and FIG. 11) (P11-1). Then, the nurturing game execution unit 701*a* selects, from among the team members extracted in P11-1, a character who has not been subjected to the processes in P11-3 to P11-7 described below as a target character to be processed (P11-2).

Also, the nurturing game execution unit 701*a* confirms the character identification information of the target character selected in P11-2 above with reference to the character identification information table (P11-3). Also, the nurturing game execution unit 701*a* sets the placement probability table (FIG. 20) on the basis of the character identification information confirmed in P11-3 above (P11-4). In addition, the nurturing game execution unit 701*a* decides "place" or "not place" by lottery on the basis of the placement probability table set in P11-4 above (P11-5).

Then, if "place" is decided (YES in P11-6), the nurturing game execution unit 701*a* decides and stores a training course in which the target character is placed (P11-7). If the processes have not been completed for all of the team members extracted in P11-1 above (NO in P11-8), the nurturing game execution unit 701*a* repeats the processes from P11-2 until the processes are completed for all team members. On the other hand, when the processes are completed for all team members (YES in P11-8), the nurturing game execution unit 701*a* ends the placement process and executes the numerical value decision process (P12).

Figure 46:
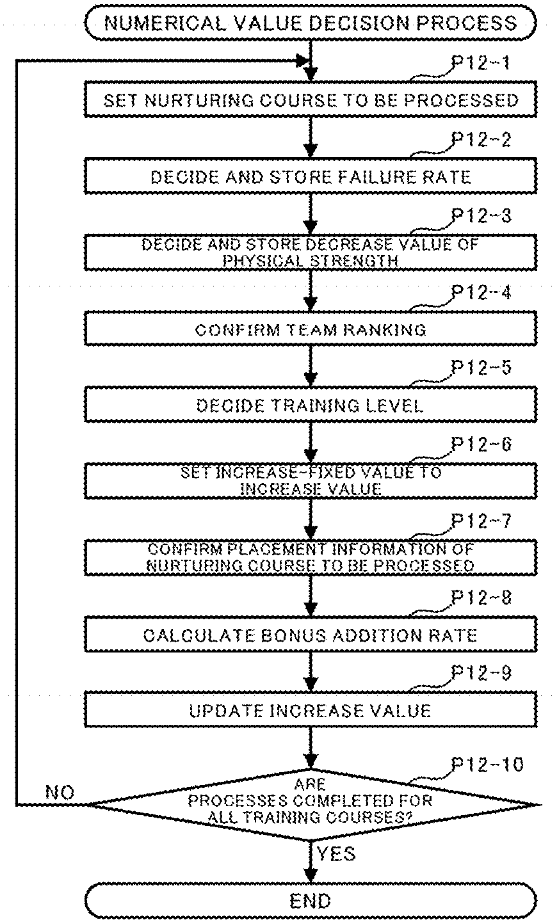
FIG. 46 is a flowchart for illustrating a numerical value decision process in the player terminal.

FIG. 46 is a flowchart for illustrating the numerical value decision process in the player terminal 1. The nurturing game execution unit 701*a* sets, among the training courses including "Speed", "Stamina", "Power", "Spirit", and "Wisdom", a target course to be processed that has not been subjected to the processes in P12-2 to P12-9 (described below) (P12-1).

Also, on the basis of the current physical strength of the main character, the nurturing game execution unit 701*a* decides a failure rate when training for the target course to be processed set in P12-1 is executed and stores the failure rate (P12-2). In addition, the nurturing game execution unit 701*a* decides a decrease value of the physical strength when training for the target course to be processed set in P12-1 is executed and stores the decrease value (P12-3).

In addition, the nurturing game execution unit 701*a* also confirms the current team ranking (P12-4) and, on the basis of the team ranking, decides the training level with reference to the training level table (FIG. 21A) (P12-5).

The nurturing game execution unit 701*a* also decides and sets an increase-fixed value on the basis of the training level decided in P12-5 with reference to the increase-fixed value table (FIG. 21B and FIG. 21C) corresponding to the target course to be processed set in P12-1 (P12-6). In addition, the nurturing game execution unit 701*a* also confirms the information (placement information) concerning the characters whom a decision was made to place in P11 for the training corresponding to the target course to be processed (P12-7).

Then, on the basis of the placement information confirmed in P12-7, the nurturing game execution unit 701*a* calculates a bonus addition rate with reference to the bonus addition rate table (FIG. 21D) (P12-8). In addition, on the basis of the bonus addition rate calculated in P12-8, the nurturing game execution unit 701*a* also updates an increase value for the training corresponding to the target course to be processed (P12-9).

In addition, if the processes in P12-2 to P12-9 have not been completed for all training courses (NO in P12-10), the nurturing game execution unit 701*a* repeats the processes from P12-1. On the other hand, when the processes are completed for all training courses (YES in P12-10), the nurturing game execution unit 701*a* ends the numerical value decision process and executes the event decision process (P13).

Figure 47:
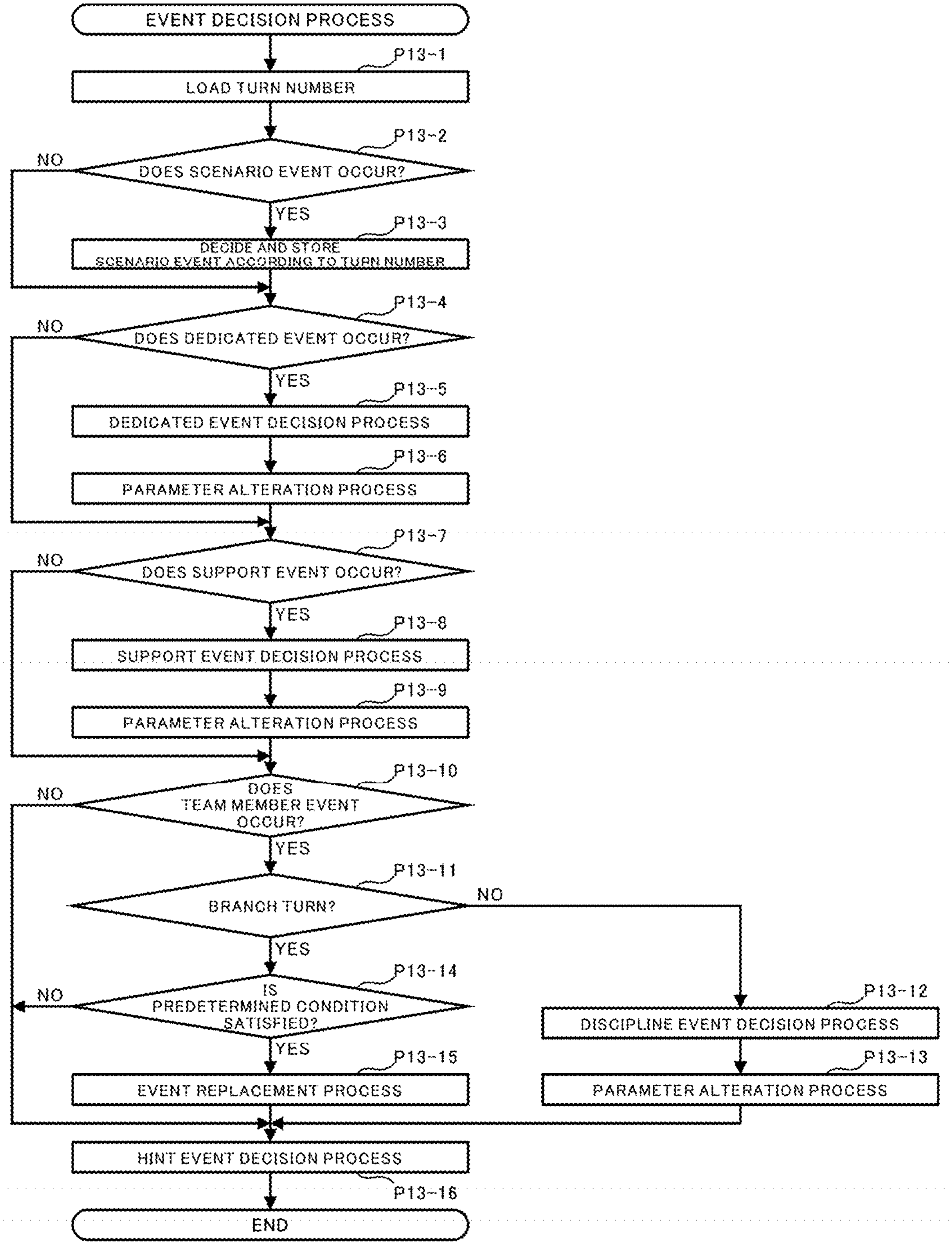
FIG. 47 is a flowchart for illustrating an event decision process in the player terminal.

FIG. 47 is a flowchart for illustrating the event decision process in the player terminal 1. The nurturing game execution unit 701*a* loads the current turn number (P13-1). The nurturing game execution unit 701*a* also decides whether or not to cause a scenario event to occur with reference to the event occurrence decision table stored in the data storage region 12*b* (P13-2). Then, if it is decided to cause a scenario event to occur, i.e., if the current turn is a scenario event occurrence turn (YES in P13-2), the nurturing game execution unit 701*a* decides the content of the scenario event (event ID) on the basis of the event content decision table and stores the decided content (P13-3).

More specifically, on the basis of the event content decision table, the nurturing game execution unit 701*a* generates a lottery table with event IDs of scenario events that can occur. Then, by using the generated lottery table, the nurturing game execution unit 701*a* decides the content, i.e., the event ID, of a scenario event by lottery. Note that if the decided scenario event is an event that changes a parameter, such as an ability event, the value of the change is decided.

Also, the nurturing game execution unit 701*a* decides whether or not to cause a dedicated event 162*a* to occur with reference to the event occurrence decision table (P13-4). Then, if it is decided to cause a dedicated event 162*a* to occur, i.e., if the current turn is a dedicated event occurrence turn (YES in P13-4), the nurturing game execution unit 701*a* decides the content (event ID) of a dedicated event 162*a* on the basis of the event content decision table and stores the decided content (P13-5).

More specifically, on the basis of the event content decision table, the nurturing game execution unit 701*a* generates a lottery table with event IDs of the dedicated events 162*a* that can occur. Then, by using the generated lottery table, the nurturing game execution unit 701*a* decides the content, i.e., the event ID, of a dedicated event 162*a* by lottery. Note that if the decided dedicated event 162*a* is an event that changes a parameter, such as an ability event, the value of the change is decided.

If the main character is a special character, the nurturing game execution unit 701*a* also executes a parameter alteration process (P13-6) for altering the value of change by which a parameter is changed by the dedicated event 162*a*. For example, in the parameter alteration process, a predetermined fixed value is added to or subtracted from the value of change decided in P13-5, or the value of change decided in P13-5 is multiplied by a predetermined factor. Here, the value of change is altered to be advantageous to the player. This means that if the main character is a special character, the parameter is changed more favorably to the player by the dedicated event 162*a*.

The nurturing game execution unit 701*a* also decides whether or not to cause a support event to occur with reference to the event occurrence decision table (P13-7). Then, if it is decided to cause a support event to occur, i.e., if the current turn is a support event occurrence turn (YES in P13-7), the nurturing game execution unit 701*a* decides the content (event ID) of a support event on the basis of the event content decision table and stores the decided content (P13-8).

More specifically, on the basis of the event content decision table, the nurturing game execution unit 701*a* generates a lottery table with event IDs of support events that can occur. At this time, the probability of winning a support event tied to a registered support card is set higher than the probability of winning other support events. Then, by using the generated lottery table, the nurturing game execution unit 701*a* decides the content, i.e., the event ID, of a support event by lottery. Note that if the decided support event is an event that changes a parameter, such as an ability event, the value of the change is decided.

Also, if the main character or the support character tied to the support event is a special character, the nurturing game execution unit 701*a* executes the parameter alteration process (P13-9) for altering the value of change by which a parameter is changed by the support event.

Also, the nurturing game execution unit 701*a* decides whether or not to cause a team member event to occur with reference to the event occurrence decision table (P13-10). Then, if it is decided to cause a team member event to occur, i.e., if the current turn is a team member event occurrence turn (YES in P13-10), the nurturing game execution unit 701*a* determines whether or not the current turn is a branch turn (P13-11).

If the current turn is not a branch turn (NO in P13-11), the nurturing game execution unit 701*a* decides, on the basis of the event content decision table, that a discipline event corresponding to the current turn number is an event that is made to occur and stores the discipline event (P13-12). Here, various increase values related to the discipline event are decided.

In addition, if the main character or the character serving as a discipline target is a special character, the nurturing game execution unit 701*a* executes the parameter alteration process (P13-13) for altering the value of change by which a parameter is changed by the discipline event.

In addition, if the current turn is a branch turn (YES in P13-11), the nurturing game execution unit 701*a* determines whether or not a predetermined condition is satisfied (P13-14). Here, as described above, it is determined whether or not the number of special characters included in the team members is a predetermined number specified for each turn number. Also, if the predetermined condition is satisfied (YES in P13-14), the nurturing game execution unit 701*a* replaces the scenario event stored in P13-3 with a special character event (P13-15). Note that, here, the special character event to be substituted may be decided by lottery, or a special character event that is set in advance for each turn may be decided.

In addition, the nurturing game execution unit 701*a* executes a hint event decision process related to a hint event for each of the characters placed in training (P13-16). Here, whether or not to cause a hint event to occur is decided by lottery for each of the characters placed in training. In addition, if a hint event is made to occur, which hint event is made to occur is decided.

Referring back to FIG. 44, the nurturing game execution unit 701*a* updates the screen displayed on the display 26 (P10-3). In addition, if a story event is to made to occur at the start of the turn, a story event is made to occur among the events decided in P13 (P10-4).

Referring back to FIG. 43, if the player is not at the start of a turn (NO in P7-1), the nurturing game execution unit 701*a* executes the in-turn process (P20).

Figure 48:
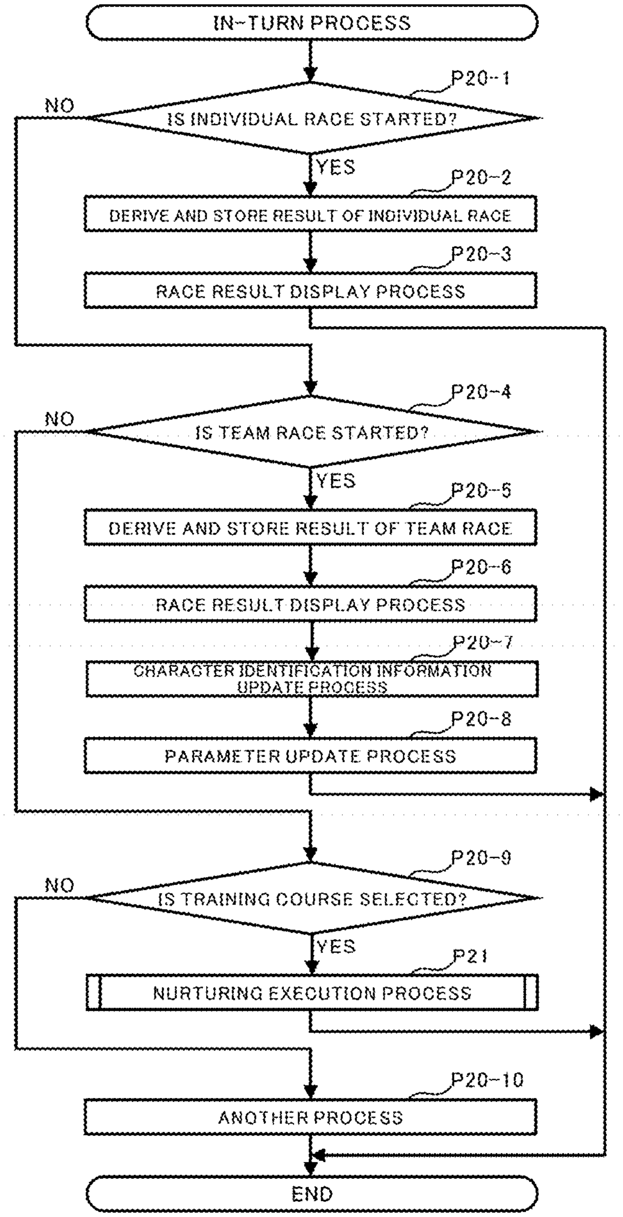
FIG. 48 is a flowchart for illustrating an in-turn process in the player terminal.

FIG. 48 is a flowchart for illustrating the in-turn process in the player terminal 1. The nurturing game execution unit 701*a* determines whether or not an individual race is started as a result of the result operation section 253 or the race operation section 254 on the individual race start screen 250 being operated (P20-1). If an individual race is started (YES in P20-1), the nurturing game execution unit 701*a* derives the results of the individual race and stores the results in the game information storage section 751 (P20-2).

More specifically, for example, calculation expressions in which the ability parameters and earned skills of NPCs and the main character are weighted are set in advance, and the places in the individual race are decided by the result of computation with these calculation expressions. Note that the aforementioned calculation expressions may be set differently for each race. Also, for example, a plurality of patterns of NPC ability parameters may be provided for each race, so that which ability parameters are used may be decided by lottery. Namely, even if the ability parameters and earned skills of the main character, as well as the races in which the main character runs, are exactly same, the race results will not necessarily be the same. It is also possible to have a plurality of patterns of calculation expressions with weighting, etc. for each race, so that the results differ depending on the selected calculation expression.

In this example, it is assumed that results of the individual race are derived at the player terminal 1. It should be noted, however, that results of the individual race may be derived at the server 1000. In this case, information requesting the derivation of results of the individual race and information necessary to derive results of the individual race are transmitted from the player terminal 1 to the server 1000. Then, results of the individual race derived by the server 1000 may be received by the player terminal 1.

Also, on the basis of results of the individual race derived in P20-2, the nurturing game execution unit 701*a* executes a race result display process (P20-3) for displaying the individual race result screen 260 or a race video on the display 26.

The nurturing game execution unit 701*a* also determines whether or not a team race is started as a result of the result operation section 291 or the race operation section 292 on the team race start screen 290 being operated (P20-4). As a result, if a team race is started, the flow proceeds to P20-5, or if the team race is not started, the flow proceeds to P20-9.

The nurturing game execution unit 701*a* derives results of the team race and stores the results in the game information storage section 751 (P20-5). More specifically, for example, calculation expressions in which the ability parameters and earned skills of NPCs, the main character, and other team members are weighted are set in advance, and the places in the team race are decided by the result of computation with these calculation expressions. Note that the aforementioned calculation expressions may be set differently for each race. Also, for example, a plurality of patterns of NPC ability parameters may be provided for each race, so that which ability parameters are used may be decided by lottery. Namely, even if the ability parameters and earned skills of the main character and other team members, as well as the races in which the main character runs, are exactly same, the race results will not necessarily be the same. It is also possible to have a plurality of patterns of calculation expressions with weighting, etc. for each race, so that the results differ depending on the selected calculation expression.

In this example, it is assumed that results of the team race are derived at the player terminal 1. It should be noted, however, that results of the team race may be derived at the server 1000. In this case, information requesting the derivation of results of the team race and information necessary to derive results of the team race are transmitted from the player terminal 1 to the server 1000. Then, results of the team race derived by the server 1000 may be received by the player terminal 1.

Also, on the basis of results of the team race derived in P20-5, the nurturing game execution unit 701*a* executes the race result display process (P20-6) for displaying, on the display 26, the team race intermediate result screen 300, the team race detailed result screen 310, and the team race total result screen 320.

The nurturing game execution unit 701*a* also executes a character identification information update process (P20-7). Here, a predetermined number of characters are extracted according to a predetermined condition from the characters currently registered as sub-members. The character identification information of the extracted characters is then updated to team members. That is, in this embodiment, the number of team members will increase each time a team race is completed.

Also, on the basis of results of the team race derived in P20-5, the nurturing game execution unit 701*a* executes a parameter update process for updating information concerning the team ranking (P20-8).

In addition, if any of the training courses is selected (YES in P20-9), the nurturing game execution unit 701*a* executes a nurturing execution process (P21). In addition, if none of the training courses are selected (NO in P20-9), the nurturing game execution unit 701*a* executes another process, such as earning skills by consuming skill points (P20-10).

Figure 49:
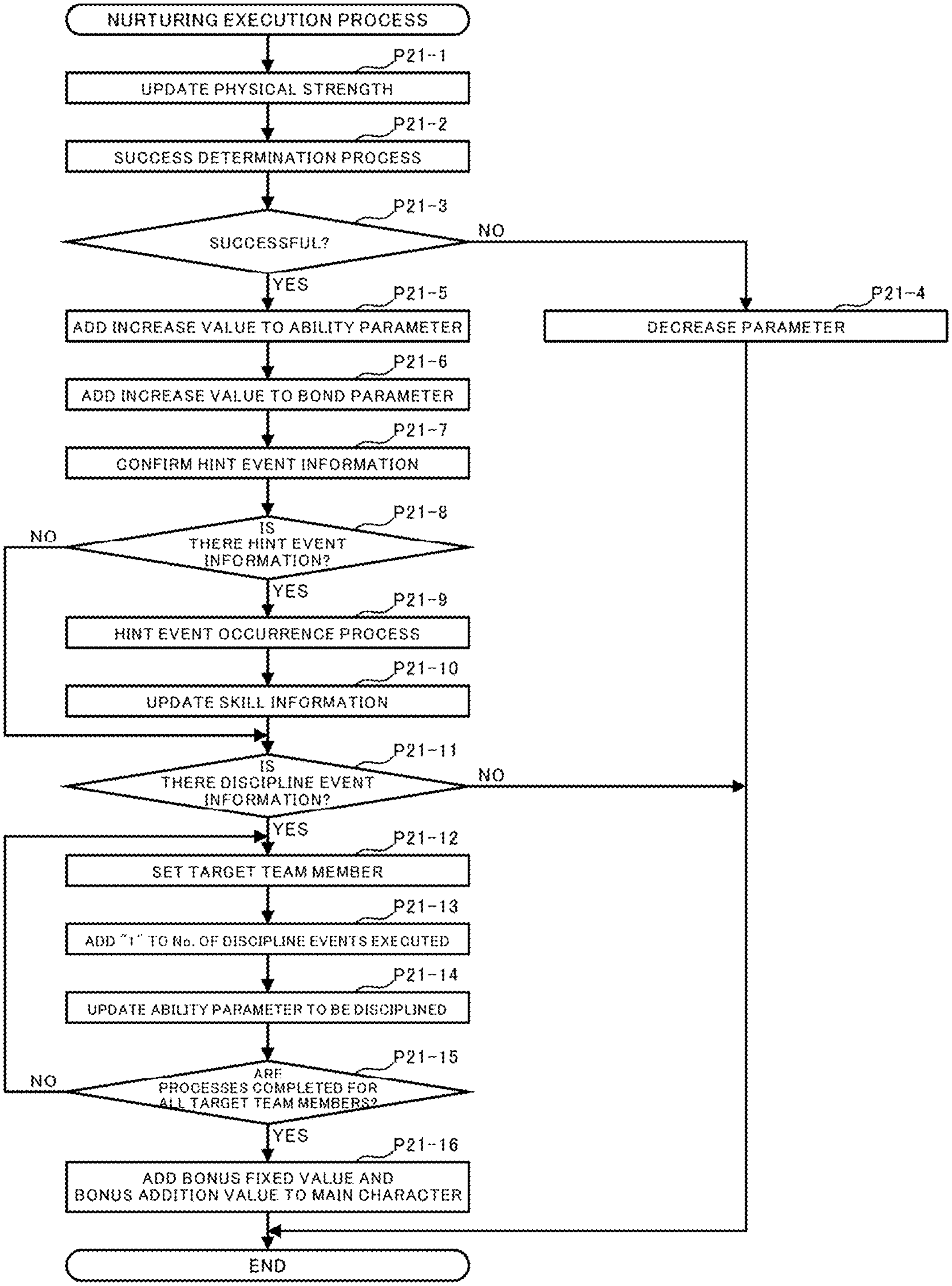
FIG. 49 is a flowchart for illustrating a nurturing execution process in the player terminal.

FIG. 49 is a flowchart for illustrating the nurturing execution process in the player terminal 1. For the selected training course, the nurturing game execution unit 701*a* updates the physical strength of the main character on the basis of the decrease value of the physical strength that has been decided in P12-3 above (P21-1).

For the selected training course, the nurturing game execution unit 701*a* also executes a success determination process for determining whether or not the training is successful on the basis of the failure rate decided in P12-2 above (P21-2). If the training fails (NO in P21-3), the nurturing game execution unit 701*a* decreases an ability parameter, such as degrading the physical condition, on the basis of the failure in training (P21-4).

On the other hand, if the training is successful (YES in P21-3), the nurturing game execution unit 701*a* adds the increase value derived in P12-9 above to the corresponding ability parameter of the main character (P21-5). Also, the nurturing game execution unit 701*a* adds the increase value to the value of the bond parameter decided in P13-12 and P13-13 (P21-6). Also, the nurturing game execution unit 701*a* confirms hint event information stored in the hint event decision process (P21-7).

If hint event information is stored for the selected training course (YES in P21-8), the nurturing game execution unit 701*a* causes a hint event to occur on the basis of the hint event information concerning the selected training course (P21-9). Note that if a plurality of items of hint event information are stored for the selected training course, any one hint event occurs. Also, on the basis of the hint event information concerning the hint event that has been made to occur in P21-9, the nurturing game execution unit 701*a* updates skill information concerning the main character stored in the game information storage section 751 (P21-10).

In addition, if discipline event information is stored for the selected training course (YES in P21-11), the nurturing game execution unit 701*a* sets a team member to be subjected to a discipline event on the basis of the discipline event information concerning the selected training course (P21-12).

The nurturing game execution unit 701*a* also adds “1” to the number of instruction events for the team member to be subjected to a discipline event who has been set in P21-12 above (P21-13). Also, the nurturing game execution unit 701*a* updates the ability parameters to be disciplined (P21-14). When the processes from P21-13 to P21-14 are completed for all team members to be subjected to a discipline event (YES in P21-15), the nurturing game execution unit 701*a* adds bonus addition values to ability parameters of the main character on the basis of the selected training course and the discipline event information (P21-16).

Referring back to FIG. 39, when the aforementioned nurturing-stage process is completed, the nurturing game execution unit 701*a* executes the nurturing game end process (P8) in the player terminal 1. In the nurturing game end process, the nurturing game execution unit 701*a* stores, in the game information storage section 751, information concerning the nurtured character nurtured in the nurturing game. The nurturing game execution unit 701*a* also transmits end information to the server 1000. This end information includes information concerning the nurtured character, etc. At the server 1000, upon receiving the end information, the nurturing game end processing unit 1102*a* executes the nurturing game end process (S8).

Figure 50:
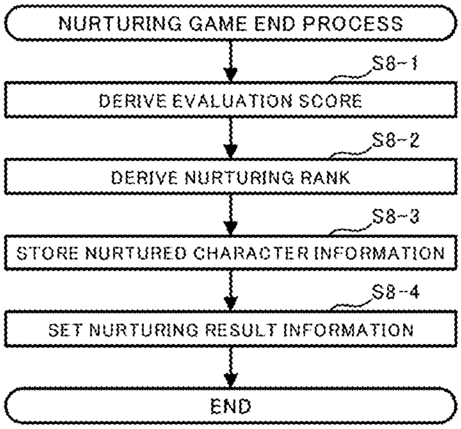
FIG. 50 is a flowchart for illustrating a nurturing game end process in the server.

FIG. 50 is a flowchart for illustrating the nurturing game end process in the server 1000. The nurturing game end processing unit 1102*a* derives an evaluation score on the basis of the end information received from the player terminal 1 (S8-1). The nurturing game end processing unit 1102*a* also derives a nurturing rank on the basis of the derived evaluation score (S8-2). Also, the nurturing game end processing unit 1102*a* stores, in the game information storage section 1151, nurtured character information including the evaluation score, nurturing rank, ability parameters, aptitude parameters, earned skills, inheritance information, etc. such that the nurtured character information is tied to the player ID of the player (S8-3). Also, the nurturing game end processing unit 1102*a* sets nurturing result information and causes the player terminal 1 to receive it (S8-4). Note that it suffices if the nurturing result information includes at least the evaluation score and nurturing rank, and here, the nurturing result information is the same as the nurtured character information stored in S8-3 above.

Referring back to FIG. 39, upon receiving the nurturing result information, the nurturing game execution unit 701*a* executes the nurturing game end process (P9). Here, the nurturing game execution unit 701*a* stores the received nurturing result information in the game information storage section 751. On the basis of the nurturing result information, the nurturing game execution unit 701*a* also displays the nurturing completion screen 330 (see FIG. 28A, FIG. 28B, and FIG. 28C) on the display 26.

The aforementioned nurturing game is realized through the aforementioned processes. In addition, nurtured character information concerning the nurtured character nurtured (created) by the nurturing game is stored so as to be tied to the player ID. Note that the aforementioned processes in the player terminal 1 and the server 1000 are merely an example. Each of the aforementioned processes may be executed only in the player terminal 1 or only in the server 1000.

Next, the processes of the player terminal 1 and the server 1000 while a special event is being held will be described. Note that described below are processes related to a nurturing game with the event mode selected at the player terminal 1 while a special event is being held.

Figure 51:
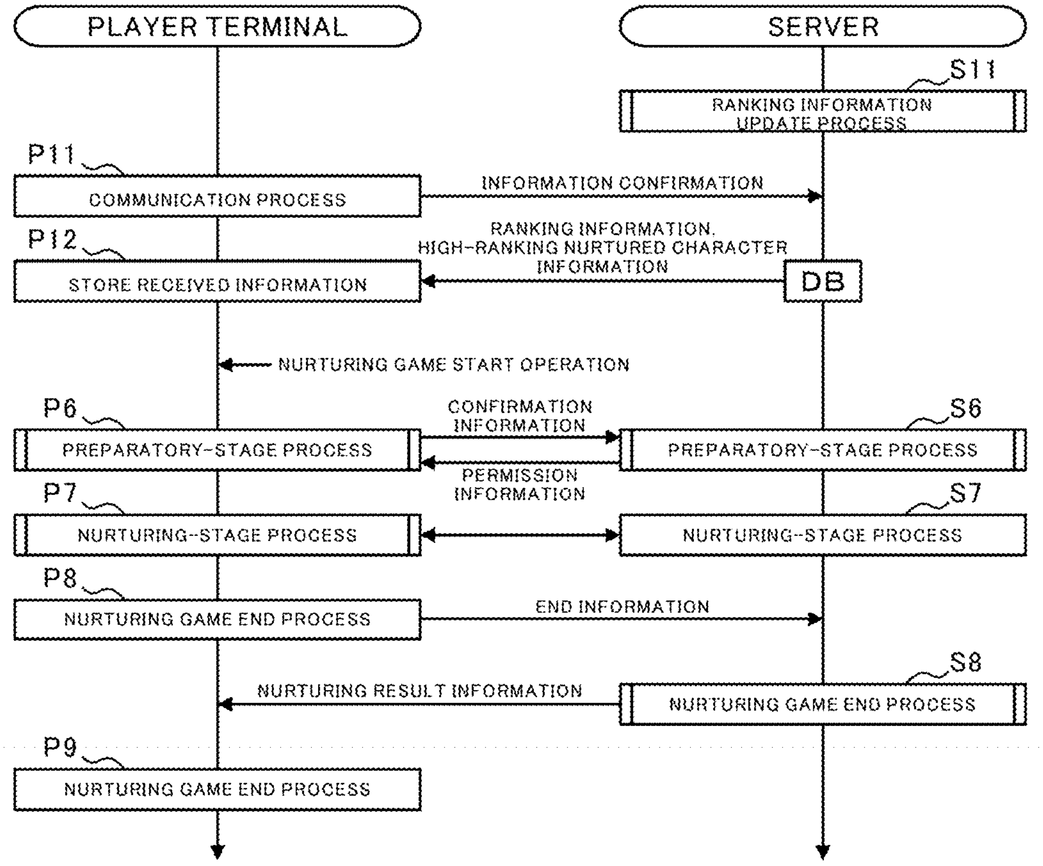
FIG. 51 is a sequence diagram for illustrating processes of the player terminal and the server related to the nurturing game while a special event is being held.

FIG. 51 is a sequence diagram for illustrating processes of the player terminal 1 and the server 1000 related to a nurturing game while a special event is being held. While a special event is being held, a ranking information update process (S11) is executed at the server 1000.

Figure 52:
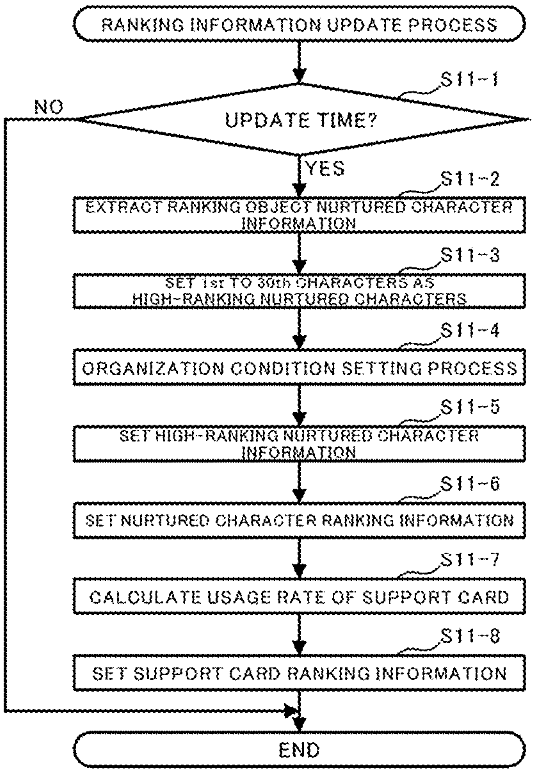
FIG. 52 is a flowchart for illustrating a ranking information update process in the server.

FIG. 52 is a flowchart for illustrating the ranking information update process in the server 1000. The ranking information update unit 1103*a* determines whether or not now is an update time (S11-1). Here, 4:59 a.m. is set as the update time. When the update time is reached, the ranking information update unit 1103*a* extracts ranking object nurtured character information stored in the ranking object nurtured character information storage section 1153 (S11-2).

Note that the ranking object nurtured character information is nurtured character information created by nurturing games executed in the event mode. In the ranking object nurtured character information storage section 1153, the nurtured character information is stored so as to be tied to the player IDs of players who nurtured nurtured characters.

Here, in the ranking object nurtured character information storage section 1153, only one item of ranking object nurtured character information is stored so as to be tied to one player ID. While the special event is being held, only the nurtured character information with the highest test points among the items of ranking object nurtured character information that are tied to one player ID is stored in the ranking object nurtured character information storage section 1153.

It should be noted, however, that the ranking object nurtured character information storage section 1153 may store, for example, the top 100 items of nurtured character information with the highest test points. In this case, when ranking object nurtured character information is generated, the test points of the generated nurtured character information are compared with those of the top 100 items of nurtured character information at that time. If the test points of the newly generated nurtured character information are higher than those of the top 100 items of nurtured character information, the nurtured character information stored in the ranking object nurtured character information storage section 1153 is changed. Note that in this case, a plurality of items of nurtured character information tied to one player ID may be stored in the ranking object nurtured character information storage section 1153.

On the basis of the ranking object nurtured character information extracted in S11-2, the ranking information update unit 1103*a* sets the top 30 nurtured characters as the high-ranking nurtured characters (S11-3). Here, the nurtured character information corresponding to the high-ranking nurtured characters is stored in the ranking information storage section 1152. Note that in the ranking information storage section 1152, the nurtured character information corresponding to the high-ranking nurtured character is stored so as to be tied to the player IDs of the players who generated the nurtured character information.

The ranking information update unit 1103*a* also executes an organization condition setting process (S11-4). Here, an organization condition for another player to organize and use the high-ranking nurtured characters in a deck is set. More specifically, the ranking information update unit 1103*a* sets that consuming "1000" of the predetermined in-game currencies is the organization condition.

Also, the ranking information update unit 1103*a* sets the high-ranking nurtured character information set in S11-3 above (S11-5) and causes the player terminal 1 to receive the information. In addition, the ranking information update unit 1103*a* sets orderly arranged items of nurtured character ranking information to the nurtured character information and the player information (S11-6).

The ranking information update unit 1103*a* also calculates the usage rates of support cards (S11-7). Here, the ranking information update unit 1103*a* calculates the usage rate for each of the support card types, with the number of times the nurturing game has been executed as the denominator and the number of times of use as the numerator. Also here, the ranking information update unit 1103*a* calculates the usage rates of support cards for each of the player categories including beginner, normal, and expert.

The ranking information update unit 1103*a* derives support card rankings on the basis of the usage rates of the support cards calculated in S11-7 above and stores the support card rankings in the ranking information storage section 1152 (S11-8). The ranking information update unit 1103*a* also sets support card ranking information indicating the derived support card rankings and causes the player terminal 1 to receive the information.

Note that the information set in S11-5, S11-6, and S11-8 are all set so that they can be received by the player terminal 1 when a communication process is executed with the player terminal 1 after 5:00 a.m. on that day.

Referring back to FIG. 51, when a communication process for confirming information is executed at the player terminal 1 (P11) after the support card rankings and the nurtured character rankings have been updated in S11, the ranking information acquisition unit 702*a* receives, from the server 1000, the nurtured character ranking information, support card ranking information, and high-ranking nurtured character information (P12). In addition, the ranking information acquisition unit 702*a* stores the received high-ranking nurtured character information in the player information storage section 750 and stores the nurtured character ranking information and support card ranking information in the ranking information storage section 752.

Thereafter, when a nurturing game start operation is input at the player terminal 1, the nurturing game execution unit 701*a* executes the preparatory-stage process (P6). The preparatory-stage process will be described below, focusing on differences between when the event mode is selected and when the normal mode is selected.

Figure 53:
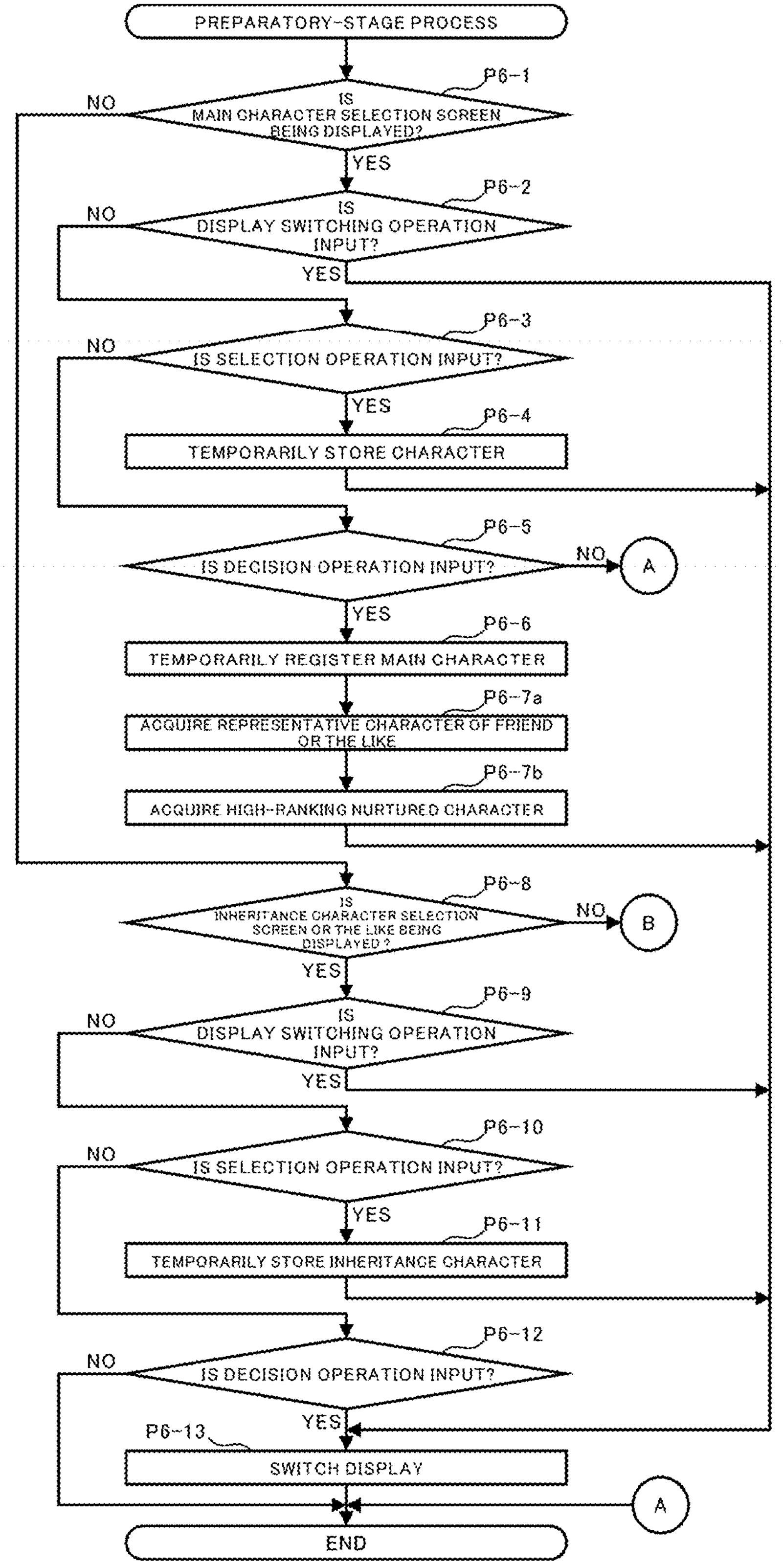
FIG. 53 is a flowchart for illustrating the preparatory-stage process in the player terminal in the case where an event mode is selected.

FIG. 53 is a flowchart for illustrating the preparatory-stage process in the player terminal 1 in the case where the event mode is selected. When the event mode is selected, in the preparatory-stage process (P6) in the player terminal 1, the nurturing game execution unit 701*a* acquires, from the server 1000, information concerning the representative characters extracted according to a predetermined extraction condition, such as the representative characters of the friends (P6-7*a*), and further acquires, from the server 1000, information concerning the high-ranking nurtured characters (P6-7*b*). Note that the information concerning the representative characters and the information concerning the high-ranking nurtured characters are also stored in the game information storage section 751. Therefore, the information concerning the representative characters and the information concerning the high-ranking nurtured characters may also be read from the game information storage section 751.

Then, when displaying the nurtured character list screen 180 (P6-13), the nurturing game execution unit 701*a* displays the my character tab 181*a*, the rental tab 181*b*, and the event tab 181*c* on the nurtured character list screen 180. Also, when the event tab 181*c* is tapped, the acquired high-ranking nurtured characters are temporarily stored as inheritance characters in P6-13.

Note that the preparatory-stage process (P6) in the player terminal 1 differs only in the aforementioned points between the case where the event mode is selected and the case where the normal mode is selected, and the other processes are the same.

Referring back to FIG. 51, when the event mode is selected, confirmation information is also transmitted to the server 1000 in the preparatory-stage process in the player terminal 1. Upon receipt of the confirmation information, the preparatory-stage process (S6) is executed at the server 1000. The preparatory-stage process while a special event is being held will be described below, focusing on differences from the preparatory-stage process outside the time period in which the special event is held.

Figure 54:
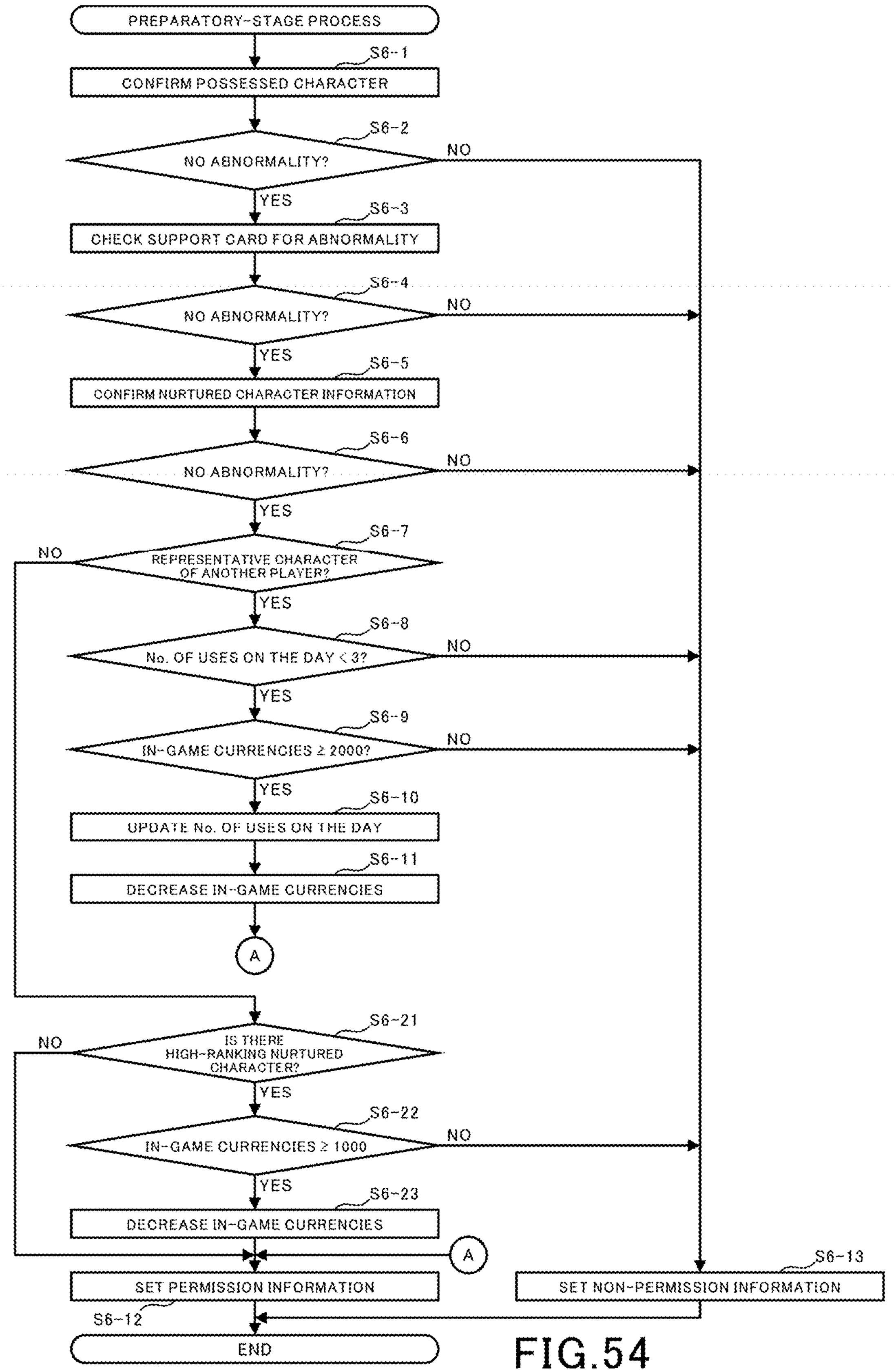
FIG. 54 is a flowchart for illustrating the preparatory-stage process in the server while a special event is being held.

FIG. 54 is a flowchart for illustrating the preparatory-stage process in the server 1000 while a special event is being held. Note that the preparatory-stage process while a special event is being held is same as the preparatory-stage process outside the time period in which the aforementioned special event is held in terms of the processes from S6-1 to S6-13 and differs from the preparatory-stage process outside the time period in which the aforementioned special event is held in that the processes S6-21 through S6-23 are added. Therefore, to avoid duplication, the processes from S6-21 to S6-23 are described here, and descriptions of the other processes are omitted.

If the representative character of another player is not included in the inheritance characters (NO in S6-7), the nurturing game execution unit 1101*a* determines whether or not the nurtured characters selected by the player as the inheritance characters include a high-ranking nurtured character (S6-21). If a high-ranking nurtured character is included (YES in S6-21), the nurturing game execution unit 1101*a* determines whether the number of predetermined in-game currencies possessed by the player is 1000 or more (S6-22). If the player has 1000 or more in-game currencies (YES in S6-22), the nurturing game execution unit 1101*a* subtracts 1000 from the number of predetermined in-game currencies possessed by the player that is stored in the player information storage section 1150 (S6-23) and sets permission information (S6-12).

Thus, the number of in-game currencies required to organize and use a high-ranking nurtured character in a deck is less than the number of in-game currencies required to organize and use the representative character of another player in the deck. In addition, the number of times the player can organize and use the representative character of another player in a deck is limited to three per day, but there is no limit to the number of times the player can organize and use a high-ranking nurtured character in a deck.

Referring back to FIG. 51, when the nurturing game executed with the event mode selected ends, end information is transmitted from the player terminal 1 to the server 1000. Upon receipt of the end information, the nurturing game end process (S8) is executed on the server 1000. The nurturing game end process in the case where the event mode is selected will be described below, focusing on differences from the nurturing game end process in the case where the normal mode is selected.

Figure 55:
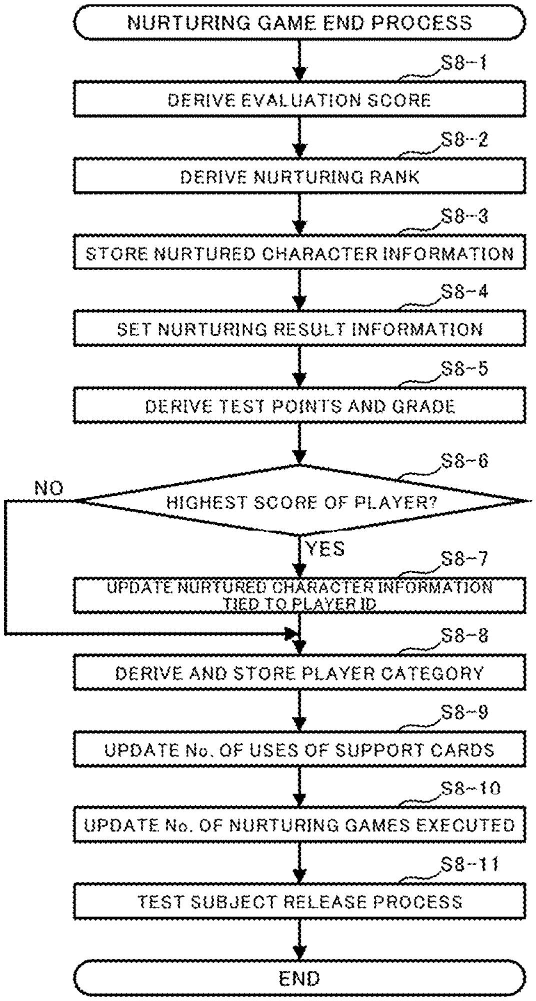
FIG. 55 is a flowchart for illustrating the nurturing game end process in the server in the case where the event mode is selected.

FIG. 55 is a flowchart for illustrating the nurturing game end process in the server 1000 in the case where the event mode is selected. The nurturing game end processing unit 1102*a* derives an evaluation score on the basis of the end information received from the player terminal 1 (S8-1). The nurturing game end processing unit 1102*a* also derives a nurturing rank on the basis of the derived evaluation score (S8-2). Also, the nurturing game end processing unit 1102*a* derives test points on the basis of the derived evaluation score (S8-3). Here, the nurturing game end processing unit 1102*a* derives test points by calculating bonus points on the basis of the bonus granting conditions provided for each of the test subjects and adding the calculated bonus points to the evaluation score. The nurturing game end processing unit 1102*a* also derives a grade on the basis of the test points.

Also, the nurturing game end processing unit 1102*a* stores, in the game information storage section 1151, nurtured character information including the evaluation score, nurturing rank, ability parameters, aptitude parameters, earned skills, inheritance information, etc. such that the nurtured character information is tied to the player ID of the player (S8-4). Also, the nurturing game end processing unit 1102*a* sets nurturing result information and causes the player terminal 1 to receive it (S8-5).

If the test points derived in S8-3 above are the highest score of the player (YES in S8-6), the nurturing game end processing unit 1102*a* updates the nurtured character information that is stored in the ranking object nurtured character information storage section 1153 and that is tied to the player ID of the player with the nurtured character information stored in S8-4 (S8-7).

In addition, the nurturing game end processing unit 1102*a* derives a player category on the basis of the highest nurturing rank earned by the player, and stores the player category in the player information storage section 1150 so as to be tied to the player ID (S8-7). It should be noted, however, that the player category may be derived, for example, on the basis of the highest nurturing rank earned while the special event is being held.

The nurturing game end processing unit 1102*a* adds "1" to the counter value of a usage counter that counts the number of times each of the six support cards included in the deck used in the nurturing game is used (S8-9). Note that the usage counter is provided for each of the support card types and for each of the player categories. Here, the counter value of the usage counter corresponding to the player category stored in the player information storage section 1150 is updated.

The nurturing game end processing unit 1102*a* adds "1" to the counter value of an execution count counter that counts the number of times the nurturing game is executed (S8-10). Note that the execution count counter is provided for each of the player categories. Here, the counter value of the execution count counter corresponding to the player category stored in the player information storage section 1150 is updated.

In S11-7 of the aforementioned ranking information update process, the ranking information update unit 1103*a* calculates the usage rates of the support cards on the basis of the counter values of the usage counters and the execution count counter that are updated in S8-9 and S8-10.

Also, the nurturing game end processing unit 1102*a* performs a test subject release process (S8-11). Here, a process for releasing the next test subject is executed when the current test subject is passed for the first time.

Although an aspect of an embodiment has been described with reference to the accompanying drawings, it goes without saying that the present invention is not limited to the aforementioned embodiment. It would be obvious that a person skilled in the art could conceive of various modifications and amendments within the scope recited in the claims, and it will be understood that those modifications and amendments obviously belong to the technical scope.

The aforementioned embodiment has been described by way of an example where nurtured character rankings are derived, so that another player can organize, in a deck, the nurtured characters who have won predetermined places in the nurtured character rankings. That is, in the aforementioned embodiment, a ranking object and an object that can be organized in a deck by another player are the same nurtured character.

Namely, a predetermined game (nurturing game in the aforementioned embodiment) is executed using a deck, and processes for executing the game using the deck include a process for proceeding with the predetermined game on the basis of player operations and a process for generating a game medium (nurtured character in the aforementioned embodiment) on the basis of the end of proceeding of the predetermined game, wherein the ranking object is the game medium generated in the predetermined game. Also, game media generated in the predetermined game within a predetermined time period (while a special event is being held in the aforementioned embodiment) are arranged in order.

However, the ranking object and the object that can be organized in a deck by another player may be different. For example, rankings of player information, such as player IDs, may be derived on the basis of predetermined game results, so that another player may be able to organize, in a deck, support cards possessed by players who have won predetermined places in the rankings.

In addition, the aforementioned embodiment has been described by way of an example where a game in which ranking objects are arranged in order and a game in which a deck organized with a game medium of another player can be used are the same. It should be noted, however, that a game in which ranking objects are arranged in order and a game in which a deck organized with a game medium of another player can be used may be different.

For example, rankings of players may be derived on the basis of predetermined game results, such as scores derived in a team competition game, so that another player may be able to organize, in a deck of a nurturing game, the representative characters of players who have won predetermined places in the rankings.

In any case, it suffices if the following processes can be executed: a process for orderly arranging, on the basis of predetermined game results (nurturing game in the aforementioned embodiment), ranking objects (nurtured characters in the aforementioned embodiment) that are tied to respective players who have played a predetermined game; a process for allowing a second player to organize, in a deck, a game medium (nurtured character in the aforementioned embodiment) tied to a first player who differs from the second player and whose ranking object has won a predetermined place (1st to 30th places in the aforementioned embodiment); and a process for executing a game (nurturing game in the aforementioned embodiment) by using the deck in which the game medium is organized.

Furthermore, in the aforementioned embodiment, a process is executed in which a player is allowed to organize, in a deck, a game medium (extracted nurtured character in the aforementioned embodiment) extracted on the basis of player information (friend information or player IDs in the aforementioned embodiment) tied to the player, in addition to the game media extracted on the basis of the places of ranking objects (high-ranking nurtured characters in the aforementioned embodiment). It should be noted, however, that the process for allowing a player to organize, in a deck, the representative character of another player, such as a friend, is not essential in the aforementioned embodiment.

In addition, in the aforementioned embodiment, an organization condition for organizing a game medium in a deck is set on at least either the game media extracted on the basis of the places of the ranking objects or the game media extracted on the basis of player information. Also, a game medium extracted on the basis of the place of a ranking object differs from a game medium extracted on the basis of player information tied to a player in terms of whether an organization condition is set (usage upper limit in the aforementioned embodiment) or the organization condition to be set (required in-game currencies). It should be noted, however, that in the aforementioned embodiment, the organization conditions set for the high-ranking nurtured characters and the extracted nurtured characters may be completely the same.

In addition, the aforementioned embodiment has been described by way of an example where one nurtured character ranking and one support card ranking are derived commonly to all test subjects. It should be noted, however, that nurtured character rankings and support card rankings may be derived, classified by test subject.

Although a nurturing game has been described in the aforementioned embodiment, the game genres to which the technical matters related to the aforementioned embodiment are applicable are not limited to nurturing games, but are applicable to all game genres.

Note that the information processing programs for executing the processes in the aforementioned embodiment and various modifications may be stored in a computer-readable, non-transitory storage medium and may be provided as a storage medium. Furthermore, it is also acceptable to provide a game terminal device including this storage medium. In addition, the aforementioned embodiment and various modifications may also be an information processing method that realizes each of the functions and the steps shown in the flowcharts.

What is claimed is:

1. A non-transitory computer readable medium storing a program causing a computer to perform a method comprising:

executing a computer game using a plurality of player terminals associated with a plurality of players,
  wherein the plurality of player terminals operate a plurality of game characters within the computer game,
  wherein the computer game is managed by a server communicating with the plurality of player terminals over a communication network, and
  wherein executing the computer game produces character information regarding the plurality of game characters;

determining a plurality of ranking objects using respective character information of a respective game character among the plurality of game characters based on the character information from executing the computer game;

displaying, on a display device within a player terminal among the plurality of player terminals, a first game screen that presents the plurality of ranking objects and a plurality of operation sections for the computer game, wherein each ranking object among the plurality of ranking objects is arranged in the first game screen according to an order that is determined by the respective character information of the respective game character;

receiving, from an input unit within the player terminal, a first operation input from a first player in response to displaying the first game screen, wherein the first operation input selects a second game screen using an operation section among the plurality of operation sections;

displaying, on the display device within the player terminal and in response to receiving the first operation input, the second game screen that provides a user interface for selecting one or more game characters among the plurality of ranking objects;

receiving, from the input unit within the player terminal, a second operation input from the first player in response to displaying the second game screen, wherein the second operation input selects a game character from among the plurality of ranking objects that is possessed by a second player among the plurality of players;

and executing the computer game by the player terminal using the game character that is selected from among the plurality of ranking objects and possessed by the second player.

2. The non-transitory computer readable medium according to claim 1, wherein each ranking object among the plurality of ranking objects is arranged in the first game screen according to an order based on an organization condition for organizing a game medium in a deck.

3. The non-transitory computer readable medium according to claim 1, wherein the computer game is a game in which a deck is used.

4. The non-transitory computer readable medium according to claim 3, wherein the order of each ranking object is arranged in a predetermined time period.

5. An information processing method comprising:

executing a computer game using a plurality of player terminals associated with a plurality of players, wherein the plurality of player terminals operate a plurality of game characters within the computer game, wherein the computer game is managed by a server communicating with the plurality of player terminals over a communication network, and wherein executing the computer game produces character information regarding the plurality of game characters;

determining a plurality of ranking objects using respective character information of a respective game character among the plurality of game characters based on the character information from executing the computer game;

displaying, on a display device within a player terminal among the plurality of player terminals, a first game screen that presents the plurality of ranking objects and a plurality of operation sections for the computer game, wherein each ranking object among the plurality of ranking objects is arranged in the first game screen according to an order that is determined by the respective character information of the respective game character;

receiving, from an input unit within the player terminal, a first operation input from a first player in response to displaying the first game screen, wherein the first operation input selects a second game screen using an operation section among the plurality of operation sections;

displaying, on the display device within the player terminal and in response to receiving the first operation input, the second game screen that provides a user interface for selecting one or more game characters among the plurality of ranking objects;

receiving, from the input unit within the player terminal, a second operation input from the first player in response to displaying the second game screen, wherein the second operation input selects a game character from among the plurality of ranking objects that is possessed by a second player among the plurality of players; and executing the computer game by the player terminal using the game character that is selected from among the plurality of ranking objects and possessed by the second player.

6. A game device comprising:

a computer processor;

a display device;

an input unit; and a memory connected to the computer processor, wherein the memory comprises a program configured to perform a method comprising:

executing a computer game using a plurality of player terminals associated with a plurality of players, wherein the plurality of player terminals operate a plurality of game characters within the computer game, wherein the computer game is managed by a server communicating with the plurality of player terminals over a communication network, and wherein executing the computer game produces character information regarding the plurality of game characters;

determining a plurality of ranking objects using respective character information of a respective game character among the plurality of game characters based on the character information from executing the computer game;

displaying, on the display device, a first game screen that presents the plurality of ranking objects and a plurality of operation sections for the computer game, wherein each ranking object among the plurality of ranking objects is arranged in the first game screen according to an order that is determined by the respective character information of the respective game character;

receiving, from the input unit, a first operation input from a first player in response to displaying the first game screen, wherein the first operation input selects a second game screen using an operation section among the plurality of operation sections;

displaying, on the display device and in response to receiving the first operation input, the second game screen that provides a user interface for selecting one or more game characters among the plurality of ranking objects;

receiving, from the input unit, a second operation input from the first player in response to displaying the second game screen, wherein the second operation input selects a game character from among the plurality of ranking objects that is possessed by a second player among the plurality of players; and executing the computer game using the game character that is selected from among the plurality of ranking objects and possessed by the second player.

7. An information processing system comprising:

a plurality of player terminals;

a communication network; and a server connected to the plurality of player terminals over the communication network, wherein a player terminal among the plurality of player terminals comprises a computer processor, a memory, a display device, and an input unit, and wherein the player terminal is configured to perform a method comprising:

executing a computer game using the plurality of player terminals associated with a plurality of players, wherein the plurality of player terminals operate a plurality of game characters within the computer game, wherein the computer game is managed by the server communicating with the plurality of player terminals over the communication network, and wherein executing the computer game produces character information regarding the plurality of game characters;

determining a plurality of ranking objects using respective character information of a respective game character among the plurality of game characters based on the character information from executing the computer game;

displaying, on the display device, a first game screen that presents the plurality of ranking objects and a plurality of operation sections for the computer game, wherein each ranking object among the plurality of ranking objects is arranged in the first game screen according to an order that is determined by the respective character information of the respective game character;

receiving, from the input unit, a first operation input from a first player in response to displaying the first game screen, wherein the first operation input selects a second game screen using an operation section among the plurality of operation sections;

displaying, on the display device and in response to receiving the first operation input, the second game screen that provides a user interface for selecting one or more game characters among the plurality of ranking objects;

receiving, from the input unit, a second operation input from the first player in response to displaying the second game screen, wherein the second operation input selects a game character from among the plurality of ranking objects that is possessed by a second player among the plurality of players; and executing the computer game by the player terminal using the game character that is selected from among the plurality of ranking objects and possessed by the second player.

* * * * *